(12) United States Patent
Ekdahl et al.

(10) Patent No.: US 11,943,332 B2
(45) Date of Patent: Mar. 26, 2024

(54) LOW DEPTH AES SBOX ARCHITECTURE FOR AREA-CONSTRAINT HARDWARE

(71) Applicant: TELEFONAKTIEBOLAGET LM ERICSSON (PUBL), Stockholm (SE)

(72) Inventors: Patrik Ekdahl, Dalby (SE); Alexander Maximov, Lund (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 369 days.

(21) Appl. No.: 17/604,210

(22) PCT Filed: Mar. 6, 2020

(86) PCT No.: PCT/EP2020/056065
§ 371 (c)(1),
(2) Date: Oct. 15, 2021

(87) PCT Pub. No.: WO2020/212016
PCT Pub. Date: Oct. 22, 2020

(65) Prior Publication Data
US 2022/0278822 A1 Sep. 1, 2022

Related U.S. Application Data

(60) Provisional application No. 62/834,359, filed on Apr. 15, 2019.

(51) Int. Cl.
*H04L 9/06* (2006.01)
(52) U.S. Cl.
CPC ...... *H04L 9/0631* (2013.01); *H04L 2209/122* (2013.01)
(58) Field of Classification Search
CPC .................................................. H04L 9/0631
See application file for complete search history.

(56) References Cited

U.S. PATENT DOCUMENTS 9,229,682 B2 * 1/2016 Tang .......................... G06F 5/01
9,330,270 B2 * 5/2016 Ochiai .................... G06F 21/44
(Continued)

FOREIGN PATENT DOCUMENTS

CN 101938349 A 1/2011

OTHER PUBLICATIONS

Maximov et al., "New Circuit Minimization Techniques for Smaller and Faster AES SBoxes", IACR Transactions on Cryptographic Hardware and Embedded Systems ISSN 2569-2925, vol. 2019, No. 4, pp. 91-125.

*Primary Examiner* — Viral S Lakhia
(74) *Attorney, Agent, or Firm* — Christopher & Weisberg, P.A.

(57) ABSTRACT

A substitution box, SBox, circuit that performs an SBox computational step when comprised in cryptographic circuitry. The SBox circuit comprises: a first circuit part comprising digital circuitry that generates a 4-bit first output signal (Y) from an 8-bit input signal (U); a second circuit part, configured to operate in parallel with the first circuit part and to generate a 32-bit second output signal (L) from the 8-bit input signal (U), wherein the 32-bit second output signal (L) consists of four 8-bit sub-results; and a third circuit part configured to produce four preliminary 8-bit results (K) by scalar multiplying each of the four 8-bit sub-results by a respective one bit of the 4-bit first output signal (Y), and to produce an 8-bit output signal (R) by summing the four preliminary 8-bit results (K). The first circuit part is configured to generate the 4-bit first output signal (Y) from the input signal (U) by performing a calculation that comprises a first linear matrix operation, a Galois Field (GF) multiplication, and a GF inversion; and the second circuit part is configured to generate the second (Continued)

output signal (L) from the input signal (U) by performing a calculation that comprises a second linear matrix operation.

11 Claims, 9 Drawing Sheets

(56) References Cited

U.S. PATENT DOCUMENTS

| | | | |
|---|---|---|---|
| 10,204,532 B2* | 2/2019 | Christiansen | H04L 9/0631 |
| 10,218,497 B2* | 2/2019 | Suresh | H04L 9/0637 |
| 10,530,588 B2* | 1/2020 | Suresh | H04L 9/3278 |
| 10,673,610 B2* | 6/2020 | Vigilant | H04L 9/0631 |
| 10,680,797 B2* | 6/2020 | Kose | H04L 9/003 |
| 10,891,110 B2* | 1/2021 | Noor | H03M 13/158 |
| 11,121,856 B2* | 9/2021 | Satpathy | G06F 7/00 |
| 11,256,478 B2* | 2/2022 | Vigilant | H04L 9/0618 |
| 11,733,966 B2* | 8/2023 | Guilley | G06F 21/602 |
| | | | 708/490 |
| 2005/0058285 A1 | 3/2005 | Stein et al. | |
| 2006/0093136 A1 | 5/2006 | Zhang et al. | |
| 2017/0373836 A1* | 12/2017 | Rarick | H04L 9/0861 |
| 2020/0313847 A1* | 10/2020 | Plusquellic | H04L 9/0631 |

\* cited by examiner

LOW DEPTH AES SBOX ARCHITECTURE FOR AREA-CONSTRAINT HARDWARE

PRIORITY CLAIM

This application is a national stage application of International Patent Application No. PCT/EP2020/056065, filed Mar. 6, 2020, which claims priority to U.S. Provisional Patent Application No. 62/834,359, filed Apr. 15, 2019, the respective disclosures of which are hereby incorporated in their entirety by reference.

TECHNICAL FIELD

Embodiments presented herein relate to a device, a method therein, a controller, a computer program, and a computer program product. Specifically, they relate to and are associated with the following technical areas/keywords: Advanced Encryption Standard, AES, SBox, hardware implementation, critical path.

BACKGROUND

Technical Background/Existing Technology

Advanced Encryption Standard (AES) is a cryptographic algorithm standardized by National Institute of Standards and Technologies (NIST), and it is one of the most widely used encryption algorithms today. It is used to secure web traffic in the TLS protocol, and also used in 3GPP LTE systems as one of the three air interface encryption methods.

Hardware implementations of AES are also very common, especially in high speed applications such as the LTE network, but also in Datacom the need for hardware accelerated crypto algorithms is essential for high load servers, terminating encrypted network traffic directly in the Network Interface Card (NIC), thereby reducing the load of the main CPU.

The AES encryption algorithm is described in detail in [1], but we will give a very brief introduction to it here. AES is a block cipher that takes two input variables; the plaintext (P) and the key (K), and produces a ciphertext (C) as output. The size of P and C determines the block size of the cipher, and in the case of AES this is 128 bits. So both P and C are of size 128 bits. The sized of the key K can be 128, 192, or 256 bits. The input P is divided into 16 bytes and arranged in a matrix form of 4×4 bytes, called the state matrix. The algorithm consists of a series of operation performed on the state matrix, scrambling the plaintext more and more into the final ciphertext output. The operations are grouped together in so called rounds. Each round in AES performs the following operations: SubBytes, ShiftRows, MixColumns, and AddRoundKey. Depending on the size of K, (128, 192, or 256 bits) the algorithm does 10, 12, or 14 of these rounds. For hardware implementations, the state matrix between each round is typically stored in some kind of registers (flip-flops, or latches). This means that the maximum clock speed by which we can clock the circuit, is determined by the speed by which the signal can move from one register to the next. The speed of a signal is mainly dependent on the number of gates the signal has to traverse between being stored in latches. The number of gates a signal traverses is usually called the depth of the signal, or the path depth. And the critical path for circuit is the longest path (most gates to traverse) for any of the constituent signals in the circuit.

For this disclosure the focus will be on the so called SBox, or substitution box of AES which is the fundamental building block of the SubBytes operation. It is also the operation that has the largest number of gates and the highest depth of the round function. Thus, it makes an interesting and valuable research goal to minimize the number of gates used to implement it, as well as the depth of this circuit. Minimizing the number of gates reduces the area and the power consumption of the circuit and, as explained before, minimizing the critical path increases the possible clock rate of the algorithm making the encryption/decryption faster.

Efficient hardware design of the AES SBox is a well-studied subject. If the absolute maximum speed is desired, a straightforward table-lookup implementation is most-likely used, which naturally leads to a large area.

In many practical situations the physical area of the cryptographic subsystem is limited, and the designer cannot afford to implement table-lookup for the SBoxes involved in an AES round, especially when implemented in an FPGA. For these situations, we need to study how to implement the AES SBox with logical gates only, focusing on both area and maximum clocking speed. The maximum clocking speed of a circuit is determined by the critical path or depth of the circuit; the worst case time it takes to get stable output signals from a change in input signals.

Another aspect when implementing AES is the need for the inverse cipher. Many modes of operation for a block cipher only use the encryption functionality and hence there is no need for the inverse cipher. In case you need both the forward and inverse SBox, it is often beneficial to combine the two circuits. This is because the main operation of the AES SBox is inverting a field element, which naturally is its own inverse, and it is expected that many gates of the two circuits can be shared.

FIG. 1 is a block diagram of an SBox circuit 101 that is advantageously used in an AES circuit for mapping an 8-bit input 103 to an 8-bit output 105.

At a circuit level, the SBox 101 defines 8 Boolean functions, each taking 8 bits as input. From a mathematical perspective, the forward AES SBox is defined as the composition of a non-linear function I(g) and an affine function A(g), such that SBox(g)=A(I(g)). The non-linear function $I(g)=g^{-1}$ is the multiplicative inverse of an element g in the finite field GF (2^8) defined by the irreducible polynomial $x^8+x^4+x^3+x+1$. The circuit for building an inversion over GF(2^8) is very large, and hence it is desirable to minimize it.

The first step towards a small area implementation was described by Rijmen [2]. The idea is that the inverse calculation in GF($2^8$) can be reduced to a much simpler inverse calculation in the subfield GF($2^4$) by doing a base change to GF(($2^4)^2$).

In 2001, Satoh et al [3] took this idea further and reduced the inverse calculation to the subfield GF($2^2$). This method is referred to as the Tower Field construction. In 2005, Canright [4] built on the work of Satoh et al and investigated the importance of the representation of the subfield, testing many different isomorphisms that led to the smallest area design. This construction is perhaps the most cited and used implementation of an area constraint combined AES SBox.

In a series of papers, Boyar, Peralta et al presented some very interesting ideas for both the subfield inverter as well as new heuristics for minimizing the area of logical circuits [8, 9, 10, 11]. They derived an inverter over GF($2^4$) with depth 4 and a gate count of only 17. The construction in [10] is the starting point for this invention.

After Boyar, several other papers followed focusing on low depth implementations e.g., [5]. In 2018 two papers by Reyhani et al [12, 6] presented the best known implementation (up until now) of both the forward SBox as well as the combined SBox.

Comparing Results Theoretically

Firstly, the notations used herein are introduced. Gate names are written in capital letters GATE (examples: AND, OR). The notation mGATEn means m gates of type GATE, each of which has n inputs (example: XOR4, 8XOR4, NAND3, 2AND2). When the number of inputs n is missing then the assumption is that the gate has minimum inputs, usually only 2 (3 for MUX).

1. Standard Method

The basic cell elements that are considered in the standard method are: {XOR, XNOR, AND, NAND, OR, NOR, MUX, NMUX, NOT}.

Negotiation of NOT gates. In some places of the circuit there is a need to use the inverted version of a signal. There are, however, many ways to negotiate the need of using NOT gates. A few of them are listed here.

Method 1. One way to negotiate a NOT gate is to change the previous gate that generates that signal to produce an inverted signal, instead. For example, switch XOR into XNOR, AND into NAND, etc.

Method 2. In various technologies, some gates can produce both the straight signal and its inverted version. For example, XOR gates in many implementations produce both signals simultaneously, and thus the inverted value is available.

Method 3. It is possible to change the following gates after the inverted signal such that the following scheme would produce the correct result given the inverted input.

In view of the above, it is believed that NOT gates may be ignored while evaluating a circuit with the standard method; they can hardly be counted as a full gate in the standard method. However, for completeness, the number of NOT gates are included in the resulting tables. Some of them can further be negotiated though.

In the standard method, the circuit area is calculated by counting the number of basic cells, without any size distinction between them. The NOT-gates are ignored. The depth is counted in terms of the number of basic cells on the circuit path. The overall depth of a circuit is therefore the delay of the critical path. The NOT-gates are ignored.

2. Technology Method

Area. There exist many ASIC technologies (90 nm, 45 nm, 14 nm, etc) from different vendors (Intel, Samsung, etc), with different specifics. In order to develop an ASIC one needs to get a "standard cells library" of a certain technology, and that library usually includes much larger cells than the standard elements listed above, so that the design has a wider choice of building cells.

However, even if a standard cell is considered, for example XOR, then for different technologies that cell has different areas and delays. This makes it harder to compare two circuits of the same logic developed by two groups, when they chose to apply different technologies.

For a fair comparison of circuit area of various solutions in academia, one usually utilizes the term of Gates Equivalence (GE), where 1GE is the size of the smallest NAND gate. The size of a circuit in GE terms is then computed as Area(Circuit)/Area(NAND)→t GE. Knowing the estimated GE values for each standard or technology cell makes it possible to compute an estimated area size of a circuit in terms of GE. Although various technologies have slightly different GEs for standard cells, those GE numbers are still fairly close to each other. For this disclosure, it has been decided to use the GE values given in the data book by the Samsung's STD90/MDL90 0.35 μm 3.3V CMOS technology [7]. The cells to be used are without the speed x-factor.

Depth. Different cells, like XOR and NAND, not only differ in terms of GE but also differ in terms of the maximum delay of the gates.

Normally data books include the delays (e.g., in ns.) tPHL and tPLH for each gate, and for each input-output combinations. The switching characteristics {tPHL,tPLH} are computed as the difference between the time where the input is switched by 50% voltage threshold to the time where the output signal switches from high to low (tPHL) or from low to high (tPLH) by 50% of the voltage. It is proposed here to normalize the delays of all used gates by the delay of the XOR gate. I.e., the worst-case delay of the XOR gate is adopted as 1 unit in the measurements of the critical path. Then each standard cell is looked at and the maximum of the switching characteristics {tPHL,tPLH} is selected for all in-out paths of the cell. These are then divided by the maximum delay of the XOR gate, so that the normalized delay-units are obtained for each of the gates utilized.

For multiplexers (MUX and NMUX), propagation delays for the select bit to are ignored since in most cases, normally, the select bit is the input to the circuit. For example, in the combined SBox the select bit controls whether the forward or the inverse SBox is computed, and that selection is ready and not switching over the circuit signals propagation, so it is a stable signal.

The proposed above method is similar to the idea of GEs, but is adopted for computing the depth of a circuit, normalized in XOR delays. The reason to choose XOR as the base element for delay counting is that the circuits are most likely to have a lot of XOR gates, and thus, it now becomes possible to compare the depths between the standard and the technology methods.

Previous Work

1. Forward SBox

The most widely used design is from 2005 by Canright [4]. After 2005, there have been many attempts to improve the design, both in terms of speed and area of the forward SBox. Boyar et al constructed the previously smallest know implementation in 2012 [10] and Ueno et al from 2015 [5] has the record for the shortest critical path. Recently, Reyhani et al presented new constructions that better balance the area speed trade-off[12]. The previous results are summarized in Table 1.

TABLE 1

Previous results for the forward SBox.

| | Area Size/Gates | | Critical Path/Depth | |
|---|---|---|---|---|
| Reference | Std. gates | Tech. GE | Std. gates | Tech. XORs |
| Canright[4] (most used result) | 80XO + 34ND + 6NR 120 | 226.40 | 19XO + 3ND + 1NR 23 | 20.796 |

TABLE 1-continued

Previous results for the forward SBox.

| Reference | Area Size/Gates | | Critical Path/Depth | |
|---|---|---|---|---|
| | Std. gates | Tech. GE | Std. gates | Tech. XORs |
| Boyar et al.[8] | 94XO + 34AD | | 13XO + 3AD | |
| | 128 | 264.24 | 16 | 14.932 |
| Boyar et al.[9] | 81XO + 32AD | | 21XO + 6AD | |
| Record smallest | 113 | 231.29 | 27 | 24.864 |
| Ueno et al.[5] | 91XO + 38AD + 16OR (+4IV) | | 11XO + 3AD + 1OR | |
| Record fastest | 145 (+4) | 286.53 | 15 | 13.772 |
| Reyhani[12] | 69XO + 43ND + 7NR (+4IV) | | 16XO + 4ND (+1IV) | |
| | 119 (+4) | 213.45 | 20 (+1) | 18.031 |
| Reyhani[12] | 79XO + 43ND + 7NR (+4IV) | | 11XO + 5ND (+1IV) | |
| | 129 (+4) | 236.75 | 16 (+1) | 13.449 |

2. Combined SBox

The most widely used design is from 2005 by Canright [4]. The main drawback of that design is the relatively large critical path (large depth). After 2005, there have been many attempts to improve the design, both in terms of speed and area, but almost everyone has been focusing on implementing the forward SBox only. This has relevance in certain modes of operation, where only the encryption part of the algorithm is used. In 2018, a new result on the combined SBox was published by Reyhani et al.[6]. This improves both the speed and the depth. The previous results are summarized in Table 2.

TABLE 2

| Reference | Area Size/Gates | | Critical Path/Depth | |
|---|---|---|---|---|
| | Std. gates | Tech. GE | Std. gates | Tech. XORs |
| Canright[4] (most used result) | 94XO + 34ND + 6NR + 16MX (+2IV) | | 20XO + 3ND + 2OR + 5NR | |
| | 150(+2) | 297.64 | 30 | 25.644 |
| Reyhani[6] (previous best result) | 81XO + 32ND + 4OR + 16NR + 16MI (+8IV) | | 17XO + 2ND + 3OR + 6NR | |
| | 149(+8) | 290.13 | 28 | 23.608 |

Problems with Existing Solutions

The essence of the technology described herein is that it can do much better in terms of critical path. Hence an implementation using the herein-disclosed optimization can be clocked at a higher frequency than previous implementations, thereby speeding up the encryption and decryption, or implemented using fewer cell in an ASIC or FPGA than e.g., a table look-up. This will become more and more critical as communication speeds increase and Internet of Things (IoT) devices getting smaller and smaller, demanding area-optimized encryption algorithms in hardware.

SUMMARY

When implementing crypto algorithms in hardware, the main parameter that determines the possible clocking speed is the depth (or the critical path) of the design. For the Advanced Encryption Standard (AES)[1] this path is dominated by the SBox sub component. Hence, it is an object to find a Boolean expression for the SBox that gives as low depth as possible. For area-constrained ASICs, it is also important to keep the area of the SBox small.

In accordance with one aspect of the present invention, the foregoing and other objects are achieved in technology (e.g., methods, apparatuses, non-transitory computer readable storage media, program means) that implements SBox functionality, for example when comprised in cryptographic circuitry. In an aspect of some embodiments, an SBox circuit comprises a first circuit part, a second circuit part, and a third circuit part. The first circuit part comprises digital circuitry that generates a 4-bit first output signal (Y) from an 8-bit input signal (U). The second circuit part is configured to operate in parallel with the first circuit part and to generate a 32-bit second output signal (L) from the 8-bit input signal (U), wherein the 32-bit second output signal (L) consists of four 8-bit sub-results. The third circuit part is configured to produce four preliminary 8-bit results (K) by scalar multiplying each of the four 8-bit sub-results by a respective one bit of the 4-bit first output signal (Y), and to produce an 8-bit output signal (R) by summing the four preliminary 8-bit results (K). Furthermore, the first circuit part is configured to generate the 4-bit first output signal (Y) from the input signal (U) by performing a calculation that comprises a first linear matrix operation, a Galois Field (GF) multiplication, and a GF inversion; and the second circuit part is configured to generate the second output signal (L) from the input signal (U) by performing a calculation that comprises a second linear matrix operation.

In an aspect of some but not necessarily all embodiments consistent with the invention, the third circuit part comprises digital circuitry that performs a calculation according to:

$$R = Y_0 \cdot M_0 \cdot U \oplus \ldots \oplus Y_3 \cdot M_3 \cdot U$$

wherein:
 each $M_i$ is an 8×8 matrix representing 8 linear equations on the 8-bit input U,
 $i = 0 \ldots 3$, $$L = M_0 \cdot U \| M_1 \cdot U \| M_2 \cdot U \| M_3 \cdot U$$

$\oplus$ represents an exclusive OR, XOR, operation, and
$\|$ represents concatenation.

In another aspect of some but not necessarily all embodiments consistent with the invention, each of the first, second and third circuit parts is configured from digital circuits selected from any one or more of:
- an XOR gate;
- an XNOR gate;
- an AND gate;
- a NAND gate;
- an OR gate;
- a NOR gate;
- a multiplexor, MUX;
- an NMUX gate;
- a NOT gate;
- an And-Or-Inverter (AOI); and
- an OR-And-Inverter (OAI).

In another aspect of some but not necessarily all embodiments consistent with the invention, the first circuit part and the second circuit part are configured to generate the 4-bit first output signal (Y) and the 32-bit second output signal (L) in accordance with a forward SBox operation.

In another aspect of some but not necessarily all embodiments consistent with the invention, the first circuit part (301, 503) and the second circuit part (303, 505) are configured to generate the 4-bit first output signal (Y) and the 32-bit second output signal (L) in accordance with an inverse SBox operation.

In another aspect of some but not necessarily all embodiments consistent with the invention, the first circuit part and the second circuit to part are configured to generate the 4-bit first output signal (Y) and the 32-bit second output signal (L) in accordance with a forward SBox operation; and the SBox circuitry further comprises a fourth circuit part, a fifth circuit part, and a selection circuit. The fourth circuit part comprises digital circuitry that generates an alternative 4-bit output signal ($Y_{alt}$) from the 8-bit input signal (U) for use in an inverse SBox operation. The fifth circuit part is configured to operate in parallel with the fourth circuit part and to generate an alternative 32-bit second output signal ($L_{alt}$) from the 8-bit input signal (U) for use in the inverse SBox operation, wherein the alternative 32-bit second output signal ($L_{alt}$) consists of four 8-bit sub-results. The selection circuit is controllable to engage the first and second circuit parts when a forward SBox operation is selected, and to engage the fourth and fifth circuit parts when an inverse SBox operation is selected.

As mentioned above, aspects of embodiments consistent with the invention, such as those described above, can alternatively be embodied in other forms such as, but not limited to, methods, non-transitory computer readable storage media, and program means (e.g., computer program product).

BRIEF DESCRIPTION OF THE DRAWINGS

The objects and advantages of the invention will be understood by reading the following detailed description in conjunction with the drawings in which.

DETAILED DESCRIPTION

The embodiments describing methods and apparatus are valid for all technologies having the features and possibilities that are discussed in this disclosure. The embodiments described herein are used as non-limiting examples.

To facilitate a greater understanding of various aspects of the herein-described technology, this Description is divided into three parts. The first part ("Part A") focuses on key aspects, and provides a complete description of these. The second part ("Part B") describes these aspects and also goes beyond them to describe additional aspects of the technology. The third part ("Part C") describes additional embodiments that are consistent with the technological aspects presented in Parts A to and B.

PART A

The classical SBox architecture is built using Tower Field extensions. To build GF($2^8$) using the Tower Field construction, the teachings described in references [4,10] are followed, starting with the basic binary field GF(2) and building extension fields. Let us start with the irreducible polynomial $f(x)=x^2+x+1$ over GF(2). Let W be a root of $f(x)$ such that $f(W)=0$. A normal base is constructed from the conjugates of W, $[W, W^2]$. Now every element k in GF($2^2$) can be expressed as $k=k_0 W + k_1 W^2$, where $k_0$ and $k_1$ are elements in GF(2); i.e., 1 or 0.

Using the same technique, the field GF($2^4$) can be built from GF($2^2$), and from GF($2^4$) the target field GF($2^8$) can finally be built. The irreducible polynomials, roots, and normal bases used are summarized in Table 3.

TABLE 3

Definition of subfields used to construct (GF($2^8$)).

| Target Field | Irreducible Poly. | Root | Coefficients in Field | Normal Base |
|---|---|---|---|---|
| GF($2^2$) | $x^2 + x + 1$ | W | GF(2) | [W, $W^2$] |
| GF($2^4$) | $x^2 + x + W^2$ | Z | GF($2^2$) | [Z, $Z^8$] |
| GF($2^8$) | $x^2 + x + WZ$ | Y | GF($2^4$) | [Y, $Y^{16}$] |

Let $A = a_0 Y + a_1 Y^{16}$ be a general element in GF($2^8$) with coefficients in GF($2^4$). The inverse of A can be written as $$A^{-1} = (AA^{16})^{-1} A^{16}$$
$$= ((a_o Y + a_1 Y^{16})(a_1 Y + a_o Y^{16}))^{-1}(a_1 Y + a_o Y^{16})$$
$$= ((a_o^2 + a_1^2)Y^{17} + a_o a_1(Y^2 + Y^{32}))^{-1}(a_1 Y + a_o Y^{16})$$
$$= ((a_o + a_1)^2 Y^{17} + a_o a_1(Y + Y^{16})^2)^{-1}(a_1 Y + a_o Y^{16})$$
$$= ((a_o + a_1)^2 WZ + a_o a_1)^{-1}(a_1 Y + a_o Y^{16}).$$

And the element inversion in GF($2^8$) can be done in GF($2^4$) as

Figure 1:
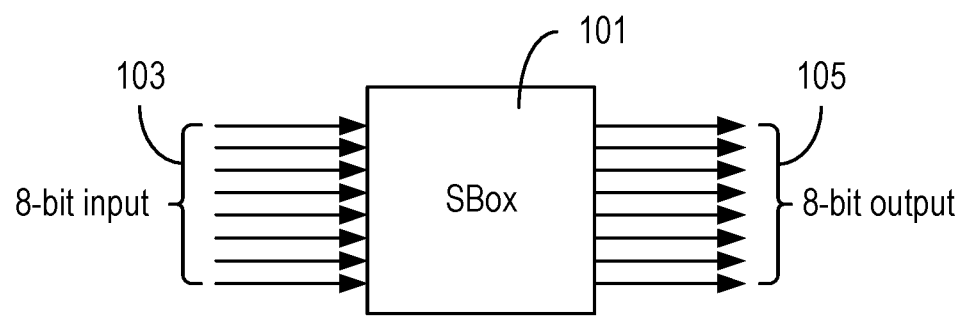
FIG. 1 is a block diagram of an SBox circuit that maps an 8-bit input to an 8-bit output.
Figure 2:
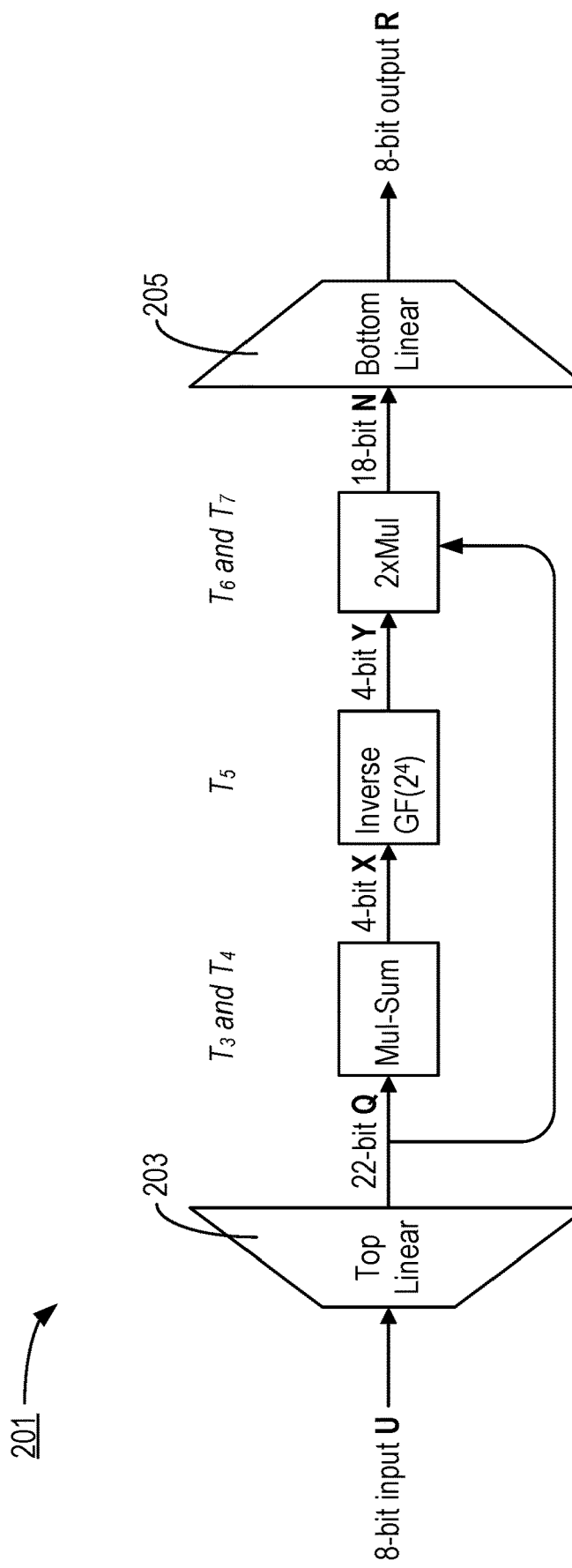
FIG. 2 is a block diagram of a classical architecture of an SBox.

| | | | |
|---|---|---|---|
| $T_1 = (a_0 + a_1)$ | $T_2 = (W\ Z)\ T_1^2$ | $T_3 = a_0 a_1$ | $T_4 = T_2 + T_3$ |
| $T_5 = T_4^{-1}$ | $T_6 = T_5 a_1$ | $T_7 = T_5 a_0$, | | where the result is obtained as $A^{-1} = T_6 Y + T_7 Y^{16}$. In these equations several operations are utilized (addition, multiplication, scaling, and squaring) but only two of them are non-linear over GF (2): multiplication and inversion. Furthermore, the standard multiplication operation also contains some linear operations. If all the linear operations are separated from the non-linear ones and bundled together with the linear equations needed to do the base change for the AES SBox input, which is represented in polynomial base using the AES SBox irreducible polynomial $x^8 + x^4 + x^3 + x + 1$, one ends up with a classical architecture (herein denoted "A") of the SBox 201 as shown in FIG. 2. The Top Linear layer 203 of the circuitry performs base conversion and generates the linear parts of the inversion. The Bottom Linear layer 205 performs base back-conversion and affine transformation of the AES SBox.

Important Aspects of the Invention: "Architecture D"

The new architecture (herein referred to as "D" for Depth) is a new architecture in which the bottom matrix found in earlier designs has been removed, and as a result the depth of the circuit has been reduced as much as possible. The idea behind this is that the bottom matrix only depends on the set of multiplications of the 4-bit signal Y and some linear combinations of the 8-bit input U. Thus, the result R can be achieved as follows:

$$R = Y_0 \cdot M_0 \cdot U \oplus \ldots \oplus Y_3 \cdot M_3 \cdot U$$

where each $M_i$ is an 8×8 matrix representing 8 linear equations on the 8-bit input U, to be scalar multiplied by the $Y_i$-bit. Those 4×8 linear circuits can be computed as a 32-bit signal L in parallel with the circuit for the 4-bits of Y. The result R is achieved by summing up four 8-bit sub-results. Therefore, in architecture D one gets the depth 3 after the inversion step (critical path: MULL and 8XOR4 blocks, see FIG. 5), instead of the depth 5-6 in the architecture A (see FIG. 4).

The new architecture D requires a few more gates, since the assembling bottom circuit needs 56 gates: 32NAND2+ 8XOR4. The reward is the lower depth.

Figure 3A:
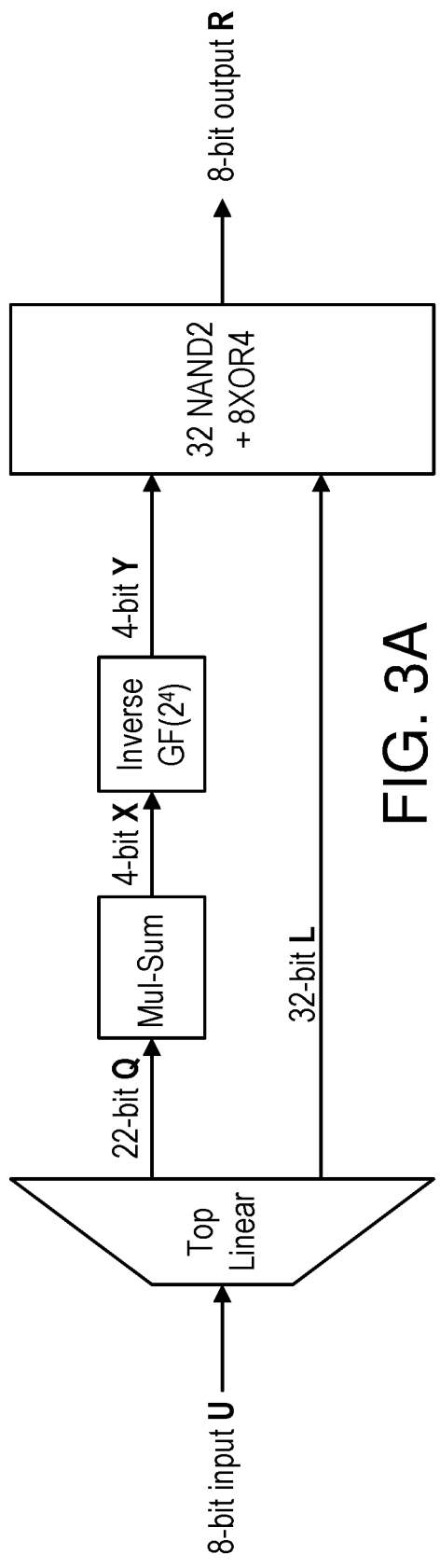
FIGS. 3A and 3B are block diagrams depicting, respectively, first and second alternative embodiments of an SBox in accordance with the to invention.
Figure 3B:
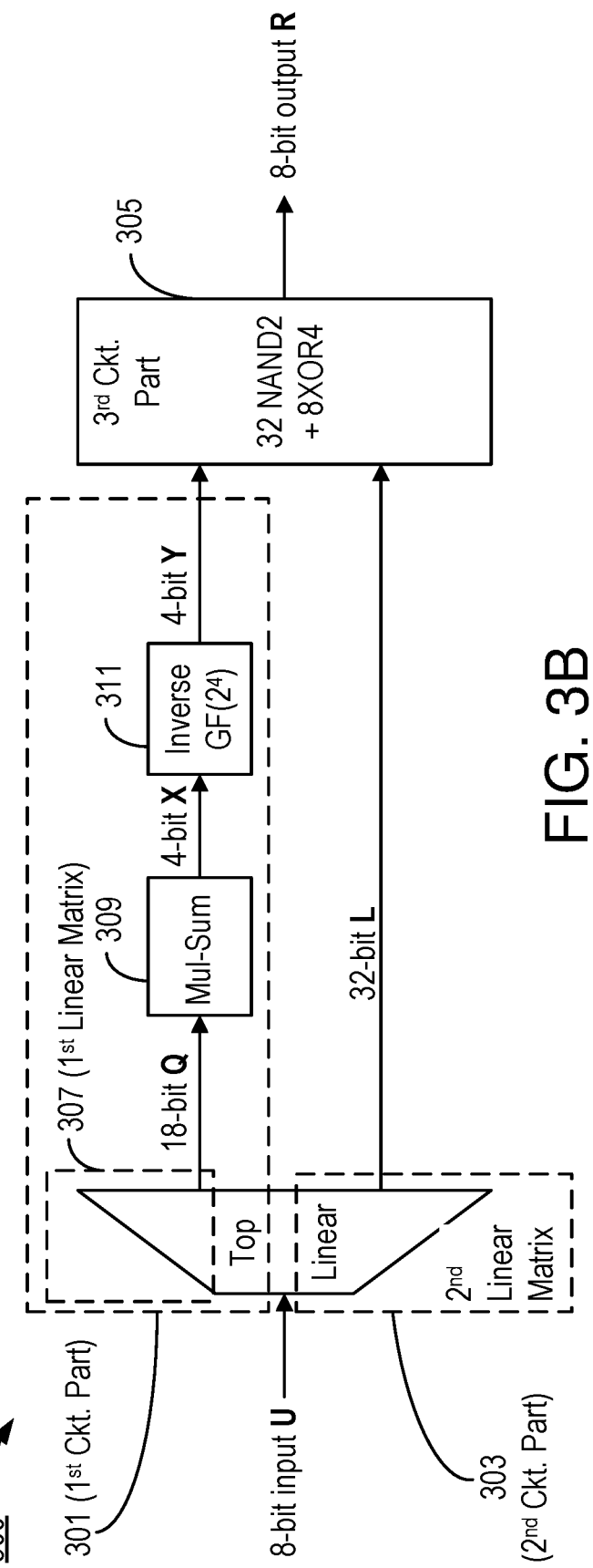

A block diagram of one exemplary embodiment of the architecture D is depicted in FIG. 3A, and an alternative exemplary embodiment of the architecture D is depicted in FIG. 3B. The difference between the two embodiments is that, by using further techniques described later in this document, it was possible to reduce the signal Q from 22 bits down to 18 bits. In all other respects, the two embodiments are identical, and for this reason and for the sake of efficiency, the description will focus on the embodiment illustrated in FIG. 3B, with the understanding that the discussion is equally applicable to the embodiment of FIG. 3A.

As shown in FIG. 3B, an Sbox circuit 300 is arranged to perform an SBox computational step when comprised in cryptographic circuitry. The exemplary SBox circuit (300) comprises a first circuit part 301, a second circuit part 303, and a third circuit part 305. The first circuit part 301 comprises digital circuitry that generates a 4-bit first output signal (Y) from an 8-bit input signal (U).

The second circuit part 303 is configured to operate in parallel with the first circuit part 301 and to generate a 32-bit second output signal (L) from the 8-bit input signal (U), wherein the 32-bit second output signal (L) consists of four 8-bit sub-results.

The third circuit part 305 is configured to produce four preliminary 8-bit results (K) by scalar multiplying each of the four 8-bit sub-results (L) by a respective one bit of the 4-bit first output signal (Y), and to produce an 8-bit output signal (R) by summing the four preliminary 8-bit results (K).

Further in accordance with the exemplary embodiment, the first circuit part 301 is configured to generate the 4-bit first output signal (Y) from the input signal (U) by supplying the 8-bit input U to a first linear matrix circuit 307 that generates an output Q (22-bits in the embodiment of FIG. 3A, and 18 bits in the embodiment of FIG. 3B). The output Q is supplied to multiplication/summing circuitry 309 that performs a Galois Field (GF) multiplication 309 to generate a 4-bit signal, X, which is then supplied to an inverse Galois Field circuit (311), that performs a GF inversion to generate the 4-bit signal Y.

Also in accordance with the exemplary embodiment, the second circuit part 303 is configured to generate the second output signal L from the input signal U by performing a calculation that comprises a second linear matrix operation.

Figure 4:
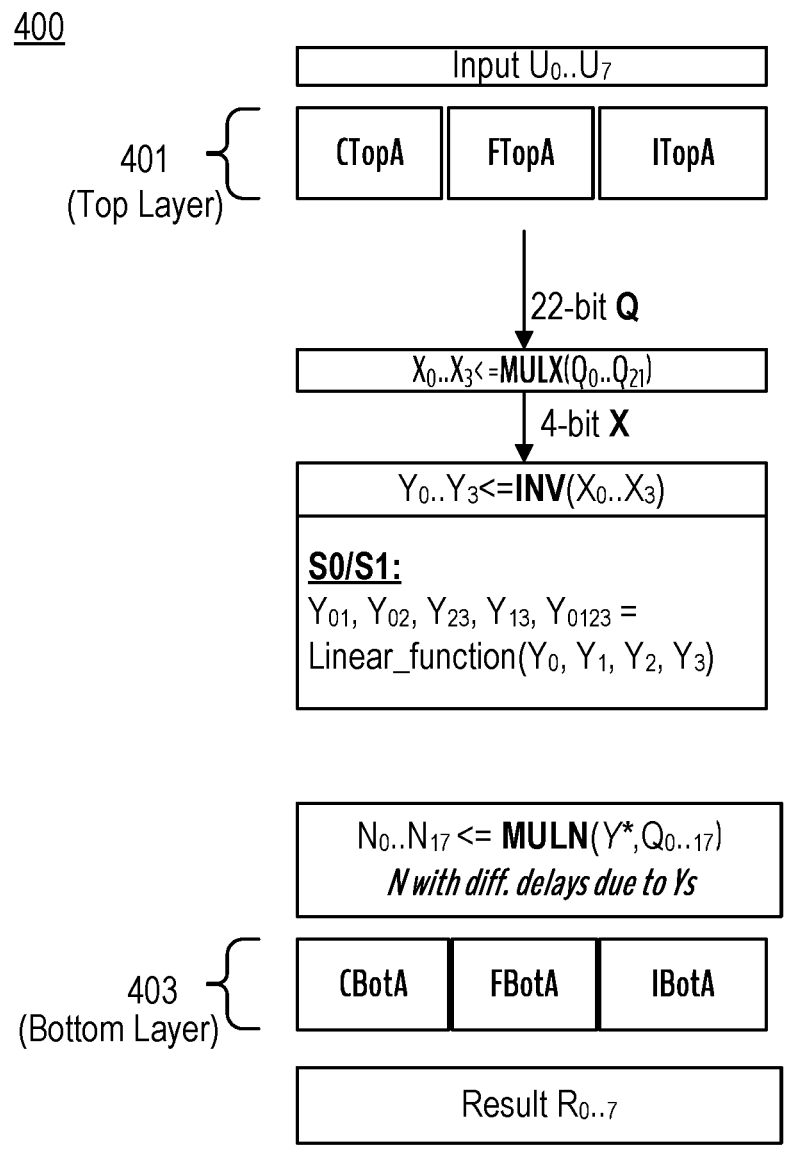
FIG. 4 is a block diagram of a conventional SBox architecture.

In order to facilitate a comparison between the conventional architecture, A, and the new architecture, D, a more detailed description and implementation size of the different blocks are shown in FIG. 4 (conventional architecture, A) and 5 (new architecture, D).

Looking first at FIG. 4, it is seen that the conventional SBox architecture 400 includes a top layer 401 that is alternatively configured either as a Forward SBox (FTopA), an Inverse SBox (ITopA), or as a Combined SBox (CTopA) that enables selection between forward and inverse computations). But a notable aspect is that the conventional SBox architecture 400 also includes a bottom layer 403 that is alternatively configured either for forward operation (FBotA), inverse operation (IBotA), or a combination that enables selection between forward and inverse operation (CBotA)).

The inventors have recognized that the bottom layer 403 of the conventional SBox architecture A 400 can be eliminated, and depth reduced, by redistributing many functional aspects of the bottom layer into upper layers. A result is the Architecture D 500, shown in FIG. 5.

Figure 5:
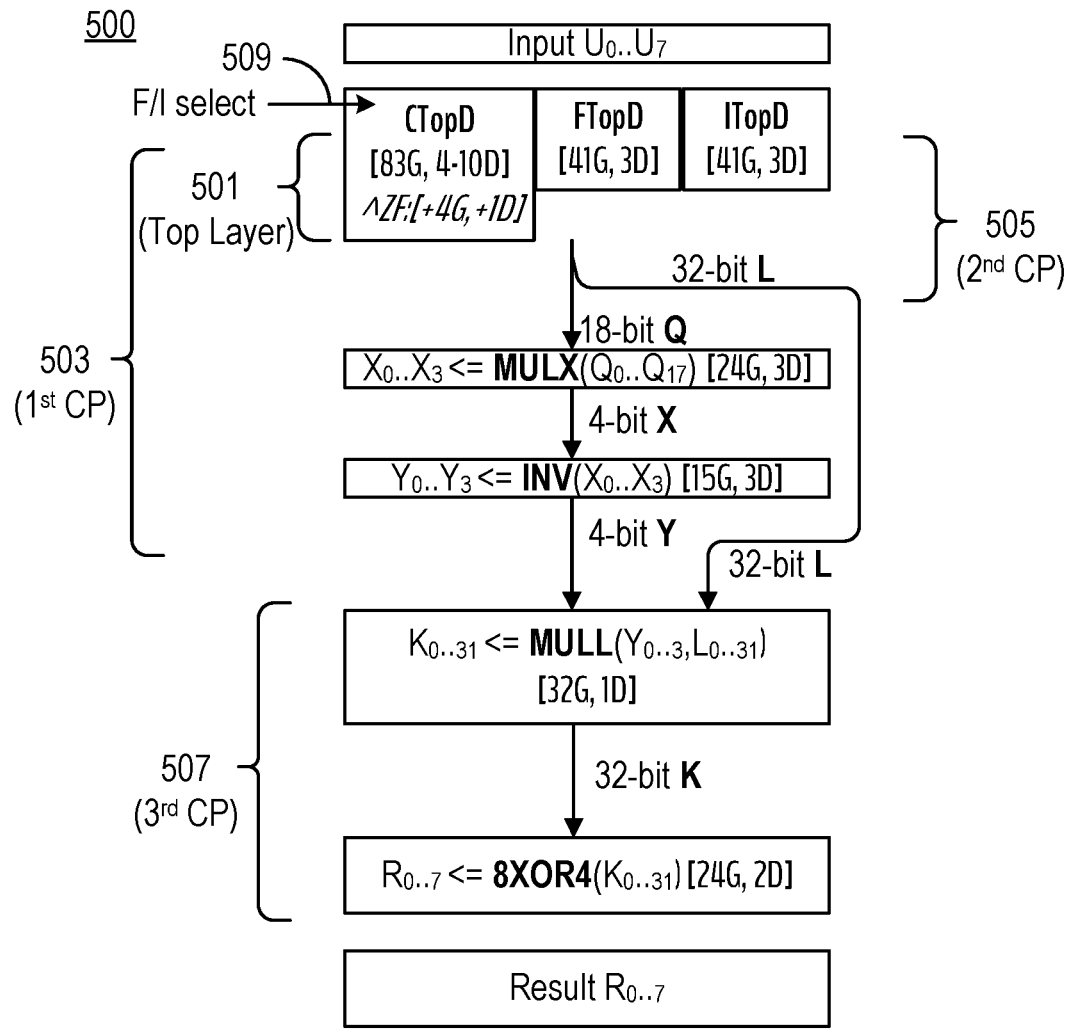
FIG. 5 is a block diagram of an SBox architecture that is consistent with the invention.

The Architecture D 500 depicted in FIG. 5 has an organization that is equivalent to that shown in FIG. 3. Notably, it includes a top layer 501 that is alternatively configured either as a Forward SBox (FTopD), an Inverse SBox (ITopD), or as a Combined SBox (CTopD) that enables selection between forward and inverse computations. In the case of the Combined SBox (CTopD), selection between forward and inverse computations is in dependence on a received forward/inverse A notable feature is that some functional aspects of the conventional bottom layer (see, e.g., bottom layer 403 in FIG. 4) have been redistributed into upper layers of the new architecture 500, so it now has a first circuit part 503 that operates in parallel with a second circuit part 505. The first circuit part 503 generates a 4-bit first output signal (Y) from the 8-bit input signal (U), and the second circuit part 505 generates a 32-bit second output signal (L) from the 8-bit input signal (U), wherein the 32-bit second output signal (L) consists of four 8-bit sub-results.

The output Y from the first circuit part 503 and the output L from the second circuit part 505 are processed together by a third circuit part 509 that is configured to produce four preliminary 8-bit results (K) by scalar multiplying each of the four 8-bit sub-results by a respective one bit of the 4-bit first output signal (Y), and to produce an 8-bit output signal (R) by summing the four preliminary 8-bit results (K).

Details of an exemplary gate configuration of the new SBox Architecture 500 are presented in the following.

Preliminaries

In the listings presented below, specifications for six circuits for the forward, inverse, and combined SBoxes in two architectures A (small) and D (fast) are described. The symbols used in the following listings are as follows, and have the indicated meanings:

comment—a comment line

@filename—means that the code from another file called 'filename' should be included, the listing of which is then given in this section as well.

a^b—is the usual XOR gate; other gates are explicitly denoted and taken from the set of {XNOR, AND, NAND, OR, NOR, MUX, NMUX, NOT}

(a op b)—where the order of execution (the order of gates connections) is important we specify it by brackets.

The inputs to all SBoxes are the 8 signals {U0 . . . U7} and the outputs are the 8 signals {R0 . . . R7}. The input and output bits are represented in Big Endian bit order. For combined SBoxes the input has additional signals ZF and ZI where ZF=1 if we perform the forward SBox and ZF=0 if inverse, otherwise; the signal ZI is the compliment of ZF. We have tested all the proposed circuits and verified their correctness.

The circuits are divided into sub-programs that correspond, respectively, to the functions/layers shown in FIG. 5. The discussion starts with a description of the common shared components, and then for each solution the components (common or specific) for the circuits are described.

Shared Components

| Listing for: MULX/INV/S0/S1/8XOR4: Shared components. | |
|---|---|
| # File: mulx.a | Y1 = XOR(T6, NOR(T1, X3)) |
| T20 = NAND(Q6, Q12) | |
| T21 = NAND(Q3, Q14) | |
| T22 = NAND(Q1, Q16) | |
| T10 = (NOR(Q3, Q14) ^ NAND(Q0, Q7)) | |
| T11 = (NOR(Q4, Q13) ^ NAND(Q10, Q11)) | |
| T12 = (NOR(Q2, Q17) ^ NAND(Q5, Q9)) | |
| T13 = (NOR(Q8, Q15) ^ NAND(Q2, Q17)) | |
| X0 = T10 ^ (T20 ^ T22) | |
| X1 = T11 ^ (T21 ^ T20) | |
| X2 = T12 ^ (T21 ^ T22) | |
| X3 = T13 ^ (T21 ^ NAND(Q4, Q13)) | |
| # File: inv.a | |
| T0 = XOR(X2, X3) | |
| T1 = AND(X0, X2) | |
| T2 = XOR(X0, X1) | |
| T3 = NAND(X0, X3) | |
| T4 = NAND(X3, T2) | |
| T5 = NAND(X1, X2) | |
| T6 = NAND(X1, T0) | |
| T7 = NAND(T5, T0) | |
| T8 = NAND(T2, T3) | |
| Y0 = XNOR(T1, T7) | |
| Y2 = XNOR(T1, T8) | Y02 = Y2 ^ Y0 |
| Y3 = XOR(T4, NOR(T1, X1)) | Y13 = Y3 ^ Y1 |
| | Y00 = Y01 ^ Y23 |
| # File: s0.a | |
| Y02 = Y2 ^ Y0 | # File: 8xor4.d |
| Y13 = Y3 ^ Y1 | R0 = (K0 ^ K1) ^ (K2 ^ K3) |
| Y23 = Y3 ^ Y2 | R1 = (K4 ^ K5) ^ (K6 ^ K7) |
| Y01 = Y1 ^ Y0 | R2 = (K8 ^ K9) ^ (K10 ^ K11) |
| Y00 = Y02 ^ Y13 | R3 = (K12 ^ K13) ^ (K14 ^ K15) |
| | R4 = (K16 ^ K17) ^ (K18 ^ K19) |
| # File: s1.a | R5 = (K20 ^ K21) ^ (K22 ^ K23) |
| Y01 = NAND(T6, NAND(X2, T3)) | R6 = (K24 ^ K25) ^ (K26 ^ K27) |
| Y23 = NAND(T4, NAND(X0, T5)) | R7 = (K28 ^ K29) ^ (K30 ^ K31) |

| Listing for: MULN/MULL: Shared components. | | |
|---|---|---|
| # File: muln.a | K20 = NAND(Y0, L20) | K15 = NAND(Y3, L15) |
| N0 = NAND(Y01, Q11) | | K19 = NAND(Y3, L19) |
| N1 = NAND(Y0, Q12) | K1 = NAND(Y1, L1) | K23 = NAND(Y3, L23) |
| N2 = NAND(Y1, Q0) | K5 = NAND(Y1, L5) | K27 = NAND(Y3, L27) |
| N3 = NAND(Y23, Q17) | K9 = NAND(Y1, L9) | K31 = NAND(Y3, L31) |
| N4 = NAND(Y2, Q5) | K13 = NAND(Y1, L13) | |
| N5 = NAND(Y3, Q15) | K17 = NAND(Y1, L17) | # File: mull.f |
| N6 = NAND(Y13, Q14) | K21 = NAND(Y1, L21) | K4 = AND(Y0, L4) |
| N7 = NAND(Y00, Q16) | K25 = NAND(Y1, L25) | K8 = AND(Y0, L8) |
| N8 = NAND(Y02, Q13) | K29 = NAND(Y1, L29) | K24 = AND(Y0, L24) |
| N9 = NAND(Y01, Q7) | | K28 = AND(Y0, L28) |
| N10 = NAND(Y0, Q10) | K2 = NAND(Y2, L2) | |
| N11 = NAND(Y1,Q6) | K6 = NAND(Y2, L6) | # File: mull.i |
| N12 = NAND(Y23, Q2) | K10 = NAND(Y2, L10) | K4 = NAND(Y0, L4) |
| N13 = NAND(Y2, Q9) | K14 = NAND(Y2, L14) | K8 = NAND(Y0, L8) |
| N14 = NAND(Y3, Q8) | K18 = NAND(Y2, L18) | K24 = NAND(Y0, L24) |

| Listing for: MULN/MULL: Shared components. | | |
|---|---|---|
| N15 = NAND(Y13, Q3) | K22 = NAND(Y2, L22) | K28 = NAND(Y0, L28) |
| N16 = NAND(Y00, Q1) | K26 = NAND(Y2, L26) | |
| N17 = NAND(Y02, Q4) | K30 = NAND(Y2, L30) | # File: mull.c |
| | | K4 = NAND(Y0, L4) ^ ZF |
| # File: mull.d | K3 = NAND(Y3, L3) | K8 = NAND(Y0, L8) ^ ZF |
| K0 = NAND(Y0, L0) | K7 = NAND(Y3, L7) | K24 = NAND(Y0, L24) ^ ZF |
| K12 = NAND(Y0, L12) | K11 = NAND(Y3, L11) | K28 = NAND(Y0, L28) ^ ZF |
| K16 = NAND(Y0, L16) | | |

| Listing for: Forward SBox with the smallest delay (fast) Forward SBox (fast) | | |
|---|---|---|
| # Forward (fast) | Q4 = Q16 ^ U4 | L13 = U3 ^ Q8 |
| @ftop.d | Q5 = Z18 ^ Z160 | L17 = U4 ^ L10 |
| @mulx.a | Z10 = U1 ^ U3 | L29 = Z96 ^ L10 |
| @inv.a | Q6 = Z10 ^ Q2 | L14 = Q11 ^ L10 |
| @mull.f | Q7 = U0 ^ U7 | L26 = Q11 ^ Q5 |
| @mull.d | Z36 = U2 ^ U5 | L30 = Q11 ^ U6 |
| @8xor4.d | Q8 = Z36 ^ Q5 | L7 = Q12 ^ Q1 |
| | L19 = U2 ^ Z96 | L11 = Q12 ^ L15 |
| # File: ftop.d | Q9 = Z18 ^ L19 | L27 = L30 ^ L10 |
| # Exhaustive | Q10 = Z10 ^ Q1 | L17 = U0 |
| → search | Q12 = U3 ^ L28 | L0 = Q10 |
| Z18 = U1 ^ U4 | Q13 = U3 ^ Q2 | L4 = U6 |
| L28 = Z18 ^ U6 | L10 = Z36 ^ Q7 | L20 = Q0 |
| Q0 = U2 ^ L28 | Q14 = U6 ^ L10 | L24 = Q16 |
| Z96 = U5 ^ U6 | Q15 = U0 ^ Q5 | L1 = Q6 |
| Q1 = U0 ^ Z96 | L8 = U3 ^ Q5 | L9 = U5 |
| Z160= U5 ^ U7 | L12 = Q16 ^ Q2 | L21 = Q11 |
| Q2 = U6 ^ Z160 | L16 = U2 ^ Q4 | L25 = Q13 |
| Q11 = U2 ^ U3 | L15 = U1 ^ Z96 | L2 = Q9 |
| L6 = U4 ^ Z96 | L31 = Q16 ^ L15 | L18 = U1 |
| Q3 = Q11 ^ L6 | L5 = Q12 ^ L31 | L22 = Q15 |
| Q16 = U0 ^ Q11 | | L3 = Q8 |
| | | L23 = U0 |

| Listing for: Forward SBox circuit with the smallest number of gates (bonus) | | |
|---|---|---|
| # Forward (bonus) | # File: fbot.b | Q0 = Z0 ^ Q16 |
| @ftop.b | H0 = N1 ^ N5 | Z1 = U1 ^ U6 |
| @mulx.a | H1 = N4 ^ H0 | Q7 = Z0 ^ Z1 |
| @inv.a | R2 = XNOR(N2, H1) | Q2 = U2 ^ Q0 |
| Q1 = Q7 ^ Q2 | H2 = N9 ^ N15 | H13 = H4 ^ H12 |
| Q3 = U0 ^ Q7 | H3 = N11 ^ N17 | R4 = N1 ^ H13 |
| Q4 = U0 ^ Q2 | R6 = XNOR(H2, H3) | H14 = XNOR(N0, R7) |
| Q5 = U1 ^ Q4 | H4 = N11 ^ N14 | H15 = H9 ^ H14 |
| Q6 = U2 ^ U3 | | H16 = H7 ^ H15 |
| Q10 = Q6 ^ Q7 | # File: ftop.b | R1 = XNOR(N6, H16) |
| Q8 = U0 ^ Q10 | Z0 = U3 ^ U4 | H17 = N4 ^ H14 |
| Q9 = Q8 ^ Q2 | Q17 = U1 ^ U7 | H18 = N3 ^ H17 |
| Q12 = Z0 ^ Q17 | Q16 = U5 ^ Q17 | R0 = H13 ^ H18 |
| Q15 = U7 ^ Q4 | H5 = N9 ^ N12 | |
| Q13 = Z0 ^ Q15 | R5 = H4 ^ H5 | |
| | H6 = N16 ^ H2 | |
| @s0.a | H7 = R2 ^ R6 | |
| @muln.a | H8 = N10 ^ H7 | |
| @fbot.b | R7 = XNOR(H6, H8) | |
| | H9 = N8 ^ H1 | |
| Q14 = Q0 ^ Q15 | H10 = N13 ^ H8 | |
| Q11 = U5 | R3 = H5 ^ H10 | |
| | H11 = H9 ^ H10 | |
| | H12 = N7 ^ H11 | |

| Listing for: Forward SBox circuit with area/depth trade-off (optimal) Forward SBox (optimal) | | |
|---|---|---|
| # Forward | Z66 = U1 ^ U6 | H9 = N3 ^ H7 |
| → (optimal) | Z114 = Q11 ^ Z66 | H10 = N15 ^ N17 |
| @ftop.a | Q6 = U7 ^ Z114 | H11 = N9 ^ N11 |
| @mulx.a | Q8 = Q1 ^ Z114 | H12 = N12 ^ N14 |
| @inv.a | Q9 = Q7 ^ Z114 | H13 = N1 ^ N2 |
| @s1.a | Q10 = U2 ^ Q13 | H14 = N5 ^ N16 |
| @muln.a | Q16 = Z9 ^ Z66 | H15 = N7 ^ H11 |
| @fbot.a | Q14 = Q16 ^ Q13 | H16 = H10 ^ H11 |
| | Q15 = U0 ^ U2 | H17 = N16 ^ H8 |
| # File: ftop.a | Q17 = Z9 ^ Z114 | H18 = H6 ^ H8 |
| # Exhaustive | Q4 = U7 | H19 = H10 ^ H12 |
| → search | | H20 = N2 ^ H3 |
| Z6 = U1 ^ U2 | # File: fbot.a | H21 = H6 ^ H14 |
| Q12 = Z6 ^ U3 | # Probabilistic | H22 = N8 ^ H12 |
| Q11 = U4 ^ U5 | → heuristic | H23 = H13 ^ H15 |
| Q0 = Q12 ^ Q11 | H0 = N3 ^ N8 | |
| Z9 = U0 ^ U3 | H1 = N5 ^ N6 | R0 = XNOR(H16, H2) |
| Z80 = U4 ^ U6 | H2 = XNOR(H0, H1) | R1 = H2 |
| Q1 = Z9 ^ Z80 | H3 = N1 ^ N4 | R2 = XNOR(H20, H21) |
| Q7 = Z6 ^ U7 | H4 = N9 ^ N10 | R3 = XNOR(H17, H2) |
| Q2 = Q1 ^ Q7 | H5 = N13 ^ N14 | R4 = XNOR(H18, H2) |
| Q3 = Q1 ^ U7 | H6 = N15 ^ H4 | R5 = H22 ^ H23 |
| Q13 = U5 ^ Z80 | H7 = N0 ^ H3 | R6 = XNOR(H19, H9) |
| Q5 = Q12 ^ Q13 | H8 = N17 ^ H5 | R7 = XNOR(H9, H18) |

The following bonus circuits are included to update the world record for the smallest SBox.

The new record is 108 gates with depth 24.

| Listing for: Inverse SBox with the smallest delay (fast) Inverse SBox (fast) | | |
|---|---|---|
| # Inverse (fast) | Q9 = Q10 ^ Q4 | L5 = L27 ^ Q2 |
| @itop.d | L12 = U4 ^ U5 | L19 = Q14 ^ U5 |
| @mulx.a | Z132= U2 ^ U7 | L26 = Q3 ^ L3 |
| @inv.a | Q11 = L12 ^ Z132 | L13 = L19 ^ L26 |
| @mull.i | Q12 = Q0 ^ Q11 | L17 = L12 ^ U0 |
| @mull.d | L27 = U3 ^ Z132 | L21 = XNOR(U1, Q1) |
| @8xor4.d | Q13 = U0 ^ L27 | L25 = Q5 ^ L3 |
| | Q14 = XNOR(Q10, U2) | L14 = U3 ^ Q12 |
| # File: itop.d | Q15 = U2 ^ Q14 | L18 = U0 ^ Q1 |
| # Exhaustive | Q16 = XNOR(Q8, U7) | L22 = XNOR(Q5, U6) |
| → search | Q17 = Q16 ^ Q11 | L8 = Q11 |
| Q8 = XNOR(U1, U3) | L23 = Q15 ^ Z132 | L28 = Q7 |
| Q0 = Q8 ^ U5 | L0 = U0 ^ L23 | L9 = Q12 |
| Q1 = U6 ^ U7 | L3 = Q2 ^ Q11 | L29 = Q10 |
| Q7 = U3 ^ U4 | L4 = Q6 ^ L3 | L2 = U5 |
| Q2 = Q7 ^ Q1 | L16 = Q3 ^ L27 | L10 = Q17 |
| Q3 = U0 ^ U4 | L1 = XNOR(U2, U3) | L30 = Q2 |
| Q4 = Q3 ^ Q1 | L6 = L1 ^ Q0 | L7 = U4 |
| Q5 = XNOR(U1, Q3) | L20 = L6 ^ Q2 | L11 = Q5 |
| Q10 = XNOR(U0, U1) | L15 = XNOR(U2, Q6) | L31 = Q9 |
| Q6 = Q10 ^ Q7 | L24 = L15 ^ U0 | |

| Listing for: Inverse SBox circuit with area/depth trade-off (optimal) Inverse SBox (optimal) | | |
|---|---|---|
| # Inverse | Q5 = U0 ^ Q6 | H6 = N4 ^ H1 |
| → (optimal) | Q7 = U3 ^ Q0 | H7 = N0 ^ H4 |
| @itop.a | Q17 = Z66 ^ Z132 | H8 = N15 ^ N16 |

| Listing for: Inverse SBox circuit with area/depth trade-off (optimal) Inverse SBox (optimal) | | |
|---|---|---|
| @mulx.a | Q8 = U5 ^ Q17 | H9 = N9 ^ N10 |
| @inv.a | Z33 = U0 ^ U5 | H10 = N6 ^ N8 |
| @s1.a | Q10 = U4 ^ Z33 | H11 = H3 ^ H6 |
| @muln.a | Q9 = Q4 ^ Q10 | H12 = N7 ^ N12 |
| @ibot.a | Q12 = XNOR(U4, Z129) | H13 = N8 ^ H0 |
|  | Q13 = XNOR(Z20, Z40) | H14 = N3 ^ N5 |
| # File: itop.a | Q16 = XNOR(Z66, U7) | H15 = H5 ^ H8 |
| # Exhaustive | Q14 = Q13 ^ Q16 | H16 = N6 ^ N7 |
| → search | Q15 = Z33 ^ Q3 | H17 = H12 ^ H13 |
| Z20 = U2 ^ U4 | Q11 = NOT(U2) | H18 = H5 ^ H16 |
| Z129 = U0 ^ U7 |  | H19 = H3 ^ H10 |
| Q0 = Z20 ^ Z129 | # File: ibot.a | H20 = H10 ^ H14 |
| Q4 = U1 ^ Z20 | # Probabilistic | R0 = H7 ^ H18 |
| Z66 = U1 ^ U6 | → heuristic | R1 = H7 ^ H19 |
| Q3 = U3 ^ Z66 | H0 = N2 ^ N14 | R2 = H2 ^ H11 |
| Q1 = Q4 ^ Q3 | H1 = N1 ^ N5 | R4 = H8 ^ H9 |
| Q2 = U6 ^ Z129 | H2 = N10 ^ N11 | R3 = R4 ^ H20 |
| Z40 = U3 ^ U5 | H3 = N13 ^ H0 | R5 = N2 ^ H6 |
| Z132 = U2 ^ U7 | H4 = N16 ^ N17 | R6 = H15 ^ H17 |
| Q6 = Z40 ^ Z132 | H5 = N1 ^ H2 | R7 = H4 ^ H11 |

Note:
the above 'NOT(U2)' in the file 'itop.a' is removable by setting Q11 = U2 and accurately negating some of the gates and variables downwards where Q11 is involved. For example, the variable Y01 should be negated as well due to: N0 = NAND(Y01, Q11) consequently, all gates involving Y01 s.b. negated which leads to negate other Q variables, etc . . .

| Listing for: Inverse SBox circuit with the smallest number of gates (bonus) Inverse SBox (bonus) | | |
|---|---|---|
| # Inverse (bonus) | Q2 = Q8 ^ Q9 | R3 = H3 ^ H6 |
| @itop.b | Q7 = Q1 ^ Q2 | H7 = N9 ^ H5 |
| @mulx.a | Q0 = Z33 ^ Q7 | R5 = N10 ^ H7 |
| @inv.a | Q5 = Q17 ^ Q15 | H8 = N8 ^ H0 |
| @s0.a | Q6 = Q3 ^ Q8 | H9 = N6 ^ H8 |
| @muln.a | Q12 = XNOR(U1, Q0) | H10 = N7 ^ R3 |
| @ibot.b | Q14 = Q15 ^ Q0 | H11 = N1 ^ R0 |
|  | Q13 = Q16 ^ Q14 | H12 = N0 ^ H11 |
| # File: itop.b | Q11 = NOT(U1) | R2 = H9 ^ H12 |
| Z33 = U0 ^ U5 |  | H13 = H8 ^ H10 |
| Z3 = U0 ^ U1 | # File: ibot.b | R1 = R2 ^ H13 |
| Q1 = XNOR(Z3, U3) | H0 = N4 ^ N5 | H14 = H5 ^ H13 |
| Q16 = XNOR(Z33, U6) | H1 = N1 ^ N2 | H15 = N13 ^ H14 |
| Q17 = XNOR(U1, Q16) | R6 = H0 ^ H1 | R7 = N12 ^ H15 |
| Q8 = U4 ^ Q17 | H2 = N13 ^ N14 | H16 = N4 ^ H9 |
| Q3 = XNOR(U2, Z33) | H3 = R6 ^ H2 | H17 = R5 ^ H16 |
| Q4 = Q1 ^ Q3 | H4 = N17 ^ H3 | R4 = N3 ^ H17 |
| Q15 = XNOR(U4, U7) | R0 = N16 ^ H4 |  |
| Q10 = U3 ^ Q15 | H5 = N15 ^ H4 |  |
| Q9 = Q4 ^ Q10 | H6 = N10 ^ N11 |  |

| Listing for: Combined SBox circuits with the smallest delay (fast/-S) Combined SBox (fast) | | |
|---|---|---|
| # Combined (fast) | Q15 = U0 ^ Q5 | Q2 = A20 ^ A22 |
| @ctop.d or @ctop.ds | A11 = U2 ^ U3 | Q6 = XNOR(A4, A22) |
| @mulx.a | A12 = NMUX(ZF, A2, A11) | Q8 = XNOR(A16, A22) |
| @inv.a | Q13 = A6 ^ A12 | A23 = XNOR(Q5, Q9) |
| @mull.c | Q12 = Q5 ^ Q13 | L10 = XNOR(Q1, A23) |
| @mull.d | A13 = A5 ^ A12 | L4 = Q14 ^ L10 |
| @8xor4.d | Q0 = Q5 ^ A13 | A24 = NMUX(ZF, Q2, L4) |
|  | Q14 = U0 ^ A13 | L12 = XNOR(Q16, A24) |
| # File: ctop.d | A14 = XNOR(U3, A3) | L25 = XNOR(U3, A24) |
| # Floating multiplexers | A15 = NMUX(ZF, A0, U3) | A25 = MUX(ZF, L10, A3) |
| A0 = XNOR(U2, U4) | A16 = XNOR(U5, A15) | L17 = U4 ^ A25 |
| A1 = XNOR(U1, A0) | Q3 = A4 ^ A16 | A26 = MUX(ZF, A10, Q4) |
| A2 = XNOR(U5, U7) | L6 = Q11 ^ Q3 | L14 = L24 ^ A26 |
| A3 = U0 ^ U5 | A17 = U2 ^ A10 | L23 = A25 ^ A26 |
| A4 = XNOR(U3, U6) | Q7 = XNOR(A8, A17) | A27 = MUX(ZF, A1, U5) |
| A5 = U2 ^ U6 | A18 = NMUX(ZF, A14, A2) | L30 = Q12 ^ A27 |
| A6 = NMUX(ZF, A4, U1) | Q1 = XNOR(A4, A18) | A28 = NMUX(ZF, L10, L5) |
| Q11 = A5 ^ A6 | Q4 = XNOR(A16, A18) | L21 = XNOR(L14, A28) |
| Q16 = U0 ^ Q11 | L7 = Q12 ^ Q1 | L27 = XNOR(L30, A28) |
| A7 = U3 ^ A1 | L8 = Q7 ^ L7 | A29 = XNOR(U5, L4) |
| L24 = MUX(ZF, Q16, A7) | A19 = NMUX(ZF, U1, A4) | L29 = A28 ^ A29 |
| A8 = NMUX(ZF, A3, U6) | A20 = XNOR(U6, A19) | L15 = A19 ^ A29 |
| L5 = A0 ^ A8 | Q9 = XNOR(A16, A20) | A30 = XNOR(A3, A10) |
| L11 = Q16 ^ L5 | Q10 = A18 ^ A20 | L18 = NMUX(ZF, A19, A30) |
| A9 = MUX(ZF, U2, U6) | L9 = Q0 ^ Q9 | A31 = XNOR(A7, A21) |
| A10 = XNOR(A2, A9) | A21 = U1 ^ A2 | L16 = A25 ^ A31 |
| Q5 = A1 ^ A10 | A22 = NMUX(ZF, A21, A5) | L26 = L18 ^ A31 |
| A32 = MUX(ZF, U7, A5) | A7 = XNOR(U2, U3) |  |
| L13 = A32 ^ A7 | Q8 = ZF ^ A7 |  |
| A33 = NMUX(ZF, A15, U0) | A8 = XNOR(A0, A2) |  |
| L19 = XNOR(L6, A33) | L25 = NMUX(ZF, A8, U1) |  |
| A34 = NOR(ZF, U6) | A9 = U2 ^ A1 |  |
| L20 = A34 ^ Q0 | Q2 = NMUX(ZF, A8, A9) |  |
| A35 = XNOR(A4, A8) | Q7 = Q1 ^ Q2 |  |
| L28 = XNOR(L7, A35) | Q9 = Q8 ^ Q2 |  |
| A36 = NMUX(ZF, Q6, L11) | A10 = XNOR(U0, A7) |  |
| L31 = A30 ^ A36 | A11 = XNOR(U5, U6) |  |
| A37 = MUX(ZF, L26, A0) | Q3 = MUX(ZF, A10, A11) |  |
| L22 = Q16 ^ A37 |  |  |
| Q17 = U0 |  |  |
| L0 = Q10 |  |  |
| L1 = Q6 |  |  |
| L2 = Q9 |  |  |
| L3 = Q8 |  |  |
| # File: ctop.ds |  |  |

Listing for: Combined SBox circuits with the smallest delay (fast/-S)
Combined SBox (fast)

```
# Floating multiplexers
A0 = U3 ^ U6
A1 = XNOR(U5, U7)
Q1 = XNOR(A0, A1)
A2 = U1 ^ U4
A3 = U0 ^ U5
Q17 = MUX(ZF, U5, A3)
A4 = U7 ^ A2
Q5 = U3 ^ A4
Q15 = Q17 ^ Q5
A5 = XNOR(U0, U2)
A6 = U1 ^ A5
Q4 = Q1 ^ Q3                L15 = Q8 ^ L11
Q6 = Q8 ^ Q3                A20 = XNOR(Q17, L6)         L4 = Q11 ^ A29
A12 = XNOR(U5, A6)          L31 = XNOR(A16, A20)        L3 = MUX(ZF, A29, Q6)
L9 = MUX(ZF, A12, A1)       L0 = XNOR(A17, L31)         A30 = XNOR(L25, Q7)
L19 = MUX(ZF, U1, A12)      A21 = MUX(ZF, U4, Q12)      L30 = XNOR(L14, A30)
L13 = Q6 ^ L9               L8 = Q7 ^ A21               A31 = L22 ^ A30
A13 = U2 ^ U4               L12 = Q6 ^ A21              L21 = XNOR(L27, A31)
A14 = MUX(ZF, A7, A11)      A22 = MUX(ZF, L8, U4)       L26 = XNOR(Q3, A31)
Q16 = XNOR(A13, A14)        L28 = L25 ^ A22             A32 = MUX(ZF, A4, A3)
Q11 = Q17 ^ Q16             L23 = L12 ^ A22             L16 = XNOR(A8, A32)
A15 = OR(ZF, A0)            L23 = L25 ^ A16             A33 = MUX(ZF, A3, U0)
Q13 = A6 ^ A15              L17 = L19 ^ A23             Q10 = A32 ^ A33
Q12 = Q5 ^ Q13              L29 = Q8 ^ A23              A34 = MUX(ZF, Q11, A7)
Q14 = Q16 ^ Q13             A24 = OR(ZI, A11)           L1 = Q10 ^ A34
A16 = MUX(ZF, A12, Q12)     L7 = XNOR(U4, A24)          A35 = MUX(ZF, U0, A4)
A17 = A8 ^ Q6               A25 = NMUX(ZF, U6, U7)      Q0 = A19 ^ A35
L20 = NMUX(ZF, A17, U2)     L2 = A1 ^ A25               A36 = MUX(ZF, L14, Q7)
L6 = XNOR(U4, A17)          A26 = Q1 ^ A6               L5 = A18 ^ A36
L27 = Q4 ^ L20              L24 = NMUX(ZF, A7, A26)
A18 = Q5 ^ Q2               A27 = MUX(ZF, U3, Q1)
L10 = MUX(ZF, Q12, A18)     L22 = Q15 ^ A27
L14 = Q9 ^ L10              A28 = MUX(ZF, A25, A10)
A19 = NMUX(ZF, A9, A2)      L18 = XNOR(L13, A28)
L11 = U0 ^ A19              A29 = A21 ^ L18
```

Listing for: Combined SBox circuit with area/depth trade-off (optimal)
Combined SBox (optimal)

```
# Combined (optimal)       Q7 = XNOR(Q9, A10)
@ctop.a                    Q8 = XNOR(Q1, A10)           # File: cbot.a
@mulx.a                    A11 = XNOR(U0, U2)           # Probabilistic heuristic
@inv.a                     Q0 = ZF ^ A11                H1 = N1 ^ N3
@s1.a                      A12 = U1 ^ U3                H3 = N15 ^ N17
@muln.a                    A13 = A1 ^ A12               H4 = N12 ^ N13
@cbot.a                    A14 = MUX(ZF, A13,           H5 = N0 ^ H1
                               A11)                     H6 = N7 ^ N8
# File: ctop.a             Q15 = U4 ^ A14               H8 = N10 ^ N11
# Floating multiplexers    A15 = NMUX(ZF, U5,           H9 = H4 ^ H8
A0 = XNOR(U0, U6)              A0)                      S4 = H3 ^ H9
Q1 = XNOR(U1, ZF)          Q5 = XNOR(A14, A15)          H10 = N12 ^ N14
A1 = U2 ^ U5               Q17 = XNOR(U4, A15)          H11 = N16 ^ H8
A2 = XNOR(U3, U4)          A16 = MUX(ZF, A5, A2)        S14 = N17 ^ H11
A3 = XNOR(U3, U7)          Q16 = XNOR(A13, A16)         H12 = N1 ^ N2
A4 = MUX(ZF, A2, U2)       A17 = A3 ^ A8                H13 = N3 ^ N5
A5 = A0 ^ A1               Q2 = XNOR(A10, A17)          H14 = N4 ^ N5
Q6 = A4 ^ A5               A18 = U4 ^ U6                H15 = N9 ^ N11
A6 = XNOR(Q1, A1)          A19 = U1 ^ U2                H16 = N6 ^ H13
A7 = NMUX(ZF, U0, A3)      Q11 = Q6 ^ A19               H17 = H6 ^ H14
Q4 = A5 ^ A7               A20 = MUX(ZF, A18,           H18 = N4 ^ H5
Q3 = Q1 ^ Q4                   A19)                     H30 = H18 ^ ZF
A8 = NMUX(ZF, U6, A2)      Q13 = U5 ^ A20               S1 = H17 ^ H30
A9 = Q1 ^ A3               A21 = XNOR(U4, Q0)           H19 = H3 ^ H15
Q9 = A8 ^ A9               Q14 = XNOR(A14, A21)         S6 = XNOR(H18, H19)
Q10 = Q4 ^ Q9              A22 = XNOR(A4, A6)           S11 = H17 ^ H19
A10 = XNOR(A4, A7)         Q12 = XNOR(U6, A22)          H20 = H10 ^ H15
S0 = XNOR(S6, H20)         H26 = H12 ^ H14              R1 = S1
S5 = H17 ^ H20             S7 = XNOR(S4, H26)           R2 = S2
H21 = N7 ^ H12             H27 = H4 ^ H23               R3 = MUX(ZF, S3, S11)
H22 = H16 ^ H21            S2 = H30 ^ H27               R4 = MUX(ZF, S4, S12)
S12 = H20 ^ H22            H28 = N8 ^ H16               R5 = MUX(ZF, S5, S13)
S13 = S4 ^ H22             S3 = S14 ^ H28               R6 = MUX(ZF, S6, S14)
```

-continued

Listing for: Combined SBox circuit with area/depth trade-off (optimal)
Combined SBox (optimal)

| | | |
|---|---|---|
| H23 = N15 ^ N16 | H29 = H21 ^ H25 | R7 = MUX(ZF, S7, S15) |
| H24 = N9 ^ N10 | S15 = H23 ^ H29 | |
| H25 = N8 ^ H24 | R0 = S0 | |

Listing for: Combined SBox circuit with the smallest number of gates (bonus)
Combined SBox (bonus)

```
# Combined (bonus)           A8 = MUX(ZF, Q1, A4)    Q9 = U6 ^ A8
@ctop.b                                              Q2 = Q8 ^ Q9
@mulx.a                                              Q10 = Q4 ^ Q9
@inv.a                                               Q7 = Q6 ^ Q10
@s0.a                                                A9 = MUX(ZF, A0, U4)
@muln.a                                              Q12 = XNOR(U7, A9)
@cbot.b                                              Q11 = Q0 ^ Q12
                                                     A10 = MUX(ZF, A6, Q12)
# File: ctop.b                                       A11 = A2 ^ A10
# Floating multiplexers                              A12 = A4 ^ A11
A0 = XNOR(U3, U6)                                    Q5 = Q0 ^ A12
Q15 = XNOR(U1, ZF)                                   Q13 = Q11 ^ A12
A1 = U5 ^ Q15                                        Q17 = Q14 ^ A12
A2 = U2 ^ A0                                         Q16 = Q14 ^ Q13
A3 = U4 ^ A1
A4 = U4 ^ U6                                         # File: cbot.b
A5 = MUX(ZF, A2, A4)                                 H0 = N9 ^ N10
Q4 = XNOR(A3, A5)                                    H1 = N16 ^ H0
Q0 = U0 ^ Q4                                         H2 = N4 ^ N5
Q14 = Q15 ^ Q0                                       S4 = N7 ^ (N8 ^ H2)
A6 = XNOR(U0, U2)                                    H4 = N0 ^ N2
Q3 = ZF ^ A6                                         H6 = N15 ^ H1
Q1 = Q4 ^ Q3                                         H7 = H4 ^ (N3 ^ N5)
A7 = MUX(ZF, U1, Q0)                                 H20 = H6 ^ ZF
Q6 = XNOR(A5, A7)                                    S2 = H20 ^ H7
Q8 = Q3 ^ Q6                                         S14 = S4 ^ H7
H8 = N13 ^ H0
                             H9 = N12 ^ H8
                             S1 = H20 ^ H9
                             H10 = N17 ^ H1
                             H12 = H2 ^ (N1 ^ N2)
                             S0 = H6 ^ H12
                             H21 = N8 ^ H4
                             S5 = N6 ^ (H9 ^ H21)
                             S11 = H12 ^ S5
                             S6 = S1 ^ S11
                             H15 = N14 ^ H10
                             H16 = H8 ^ H15
                             S12 = S5 ^ H16
                             H22 = N9 ^ N11
                             S7 = XNOR(S4,
                             H10 ^ H22)
                             H19 = XNOR(H7, S7)
                             S3 = H16 ^ H19
                             S15 = S11 ^ H19
                             S13 = S4 ^ (N12 ^ H15)
                             R0 = S0
                             R1 = S1
                             R2 = S2
                             R3 = MUX(ZF, S3, S11)
                             R4 = MUX(ZF, S4, S12)
                             R5 = MUX(ZF, S5, S13)
                             R6 = MUX(ZF, S6, S14)
                             R7 = MUX(ZF, S7, S15)
```

Advantages of the Invention

Having a design for a fast SBox is very important for certain classes of applications, for example AES hardware support in CPUs. In such a scenario it is likely that the SBox design is placed-and-routed with extreme care for the critical path. Having a very short critical path might speed up the possible clocking frequency considerably. Also in an FPGA where it is more difficult (than in an ASIC) to reach high clocking frequencies, it is important to have as few gates in the critical path as possible.

The tables from the Background section have been extended to now also include results of the new Architecture D described here. Note how the critical path has been substantially reduced compared to conventional SBox circuits.

1. Forward SBox

| Reference | Area Size/Gates | | Critical Path/Depth | |
|---|---|---|---|---|
| | Std. gates | Tech. GE | Std. gates | Tech. XORs |
| Canright[4] (most used result) | 80XO + 34ND + 6NR<br>120 | 226.40 | 19XO + 3ND + 1NR<br>23 | 20.796 |
| Boyar et al.[8] | 94XO + 34AD<br>128 | 264.24 | 13XO + 3AD<br>16 | 14.932 |
| Boyar et al.[9] Record smallest | 81XO + 32AD<br>113 | 231.29 | 21XO + 6AD<br>27 | 24.864 |
| Ueno et al.[5] Record fastest | 91XO + 38AD + 16OR (+4IV)<br>145 (+4) | 286.53 | 11XO + 3AD + 1OR<br>15 | 13.772 |
| Reyhani[12] | 69XO + 43ND + 7NR (+4IV)<br>119 (+4) | 213.45 | 16XO + 4ND (+1IV)<br>20 (+1) | 18.031 |
| Reyhani[12] | 79XO + 43ND + 7NR (+4IV)<br>129 (+4) | 236.75 | 11XO + 5ND (+1IV)<br>16 (+1) | 13.449 |

Results of New Architecture D

| | Area Size/Gates | | Critical Path/Depth | |
|---|---|---|---|---|
| This work | 81XO + 2XN + 5AD +<br>42ND + 6NR | | 8XO + 1XN + 1AD +<br>1ND + 1NR | |
| New record fastest | 136 | 248.04 | 12 | 10.597 |

2. Combined SBox

| Reference | Area Size/Gates | | Critical Path/Depth | |
|---|---|---|---|---|
| | Std. gates | Tech. GE | Std. gates | Tech. XORs |
| Previous Results | | | | |
| Canright[4] (most used result) | 94XO + 34ND + 6NR + 16MX (+2IV)<br>150(+2) | 297.64 | 20XO + 3ND + 2OR + 5NR<br>30 | 25.644 |
| Reyhani[6] (previous best result) | 81XO + 32ND + 4OR + 16NR + 16MI (+8IV)<br>149(+8) | 290.13 | 17XO + 2ND + 3OR + 6NR<br>28 | 23.608 |
| Our results | | | | |
| This work A (internal fast2) | 86XO + 22XN + 1AD + 46ND + 2OR + 6NR +<br>17MX + 6MI<br>186 | 363.26 | 10XO + 1XN + 2ND + 1NR<br>14 | 12.371 |
| This work B (internal fast10) | 81XO + 28XN + 1AD + 46ND + 7NR + 7MX +<br>12MI<br>182 | 356.65 | 8XO + 2XN + 2ND + 1NR +<br>1MI<br>14 | 12.420 |

A synthesis of the results has been performed and compared with other recent academic work.

The technology process is GlobalFoundries 22 nm CSC20L [Glo19], and synthesis has been performed using Design Compiler 2017 from Synopsys in topological mode with the compile_ultra command. Also, the flag compile_timing_high_effort was turned on in order to force the compiler to make as fast circuits as possible. In the following graphs, the X axis is the clock period (in ps) and the Y axis is the resulting topology estimated area (in µm²). The number of available gates was not restricted in any way, so the compiler was free to use non-standard gates e.g., a 3 input AND-OR gate. To get the graphs in the following subsections, the clock period was started at a 1200 ps clock period (~833 MHz) and was then reduced by 20 ps until the timing constraints could not be met. It is noted that that the area estimates by the compiler fluctuate heavily, and this is believed to be a result of the many different strategies the compiler had to minimize the depth of. One strategy might be successful for say a 700 ps clock period, but a different strategy (which results in a significantly larger area) could be successful for 720 ps. There is also an element of randomness involved in the strategies for the compiler.

Figure 6:
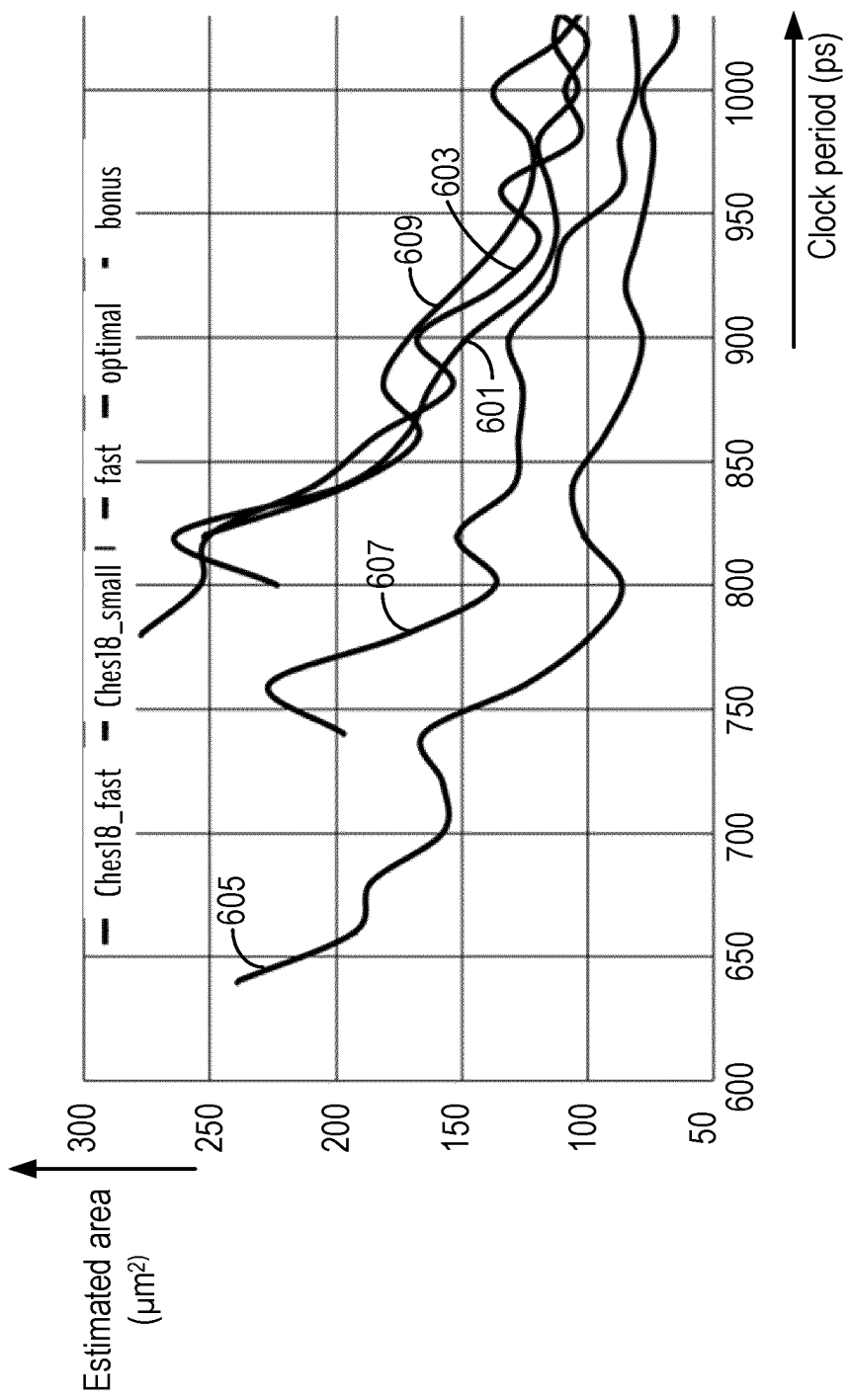
FIG. 6 depicts a set of graphs illustrating synthesis results for different embodiments of a forward SBox.
Figure 7:
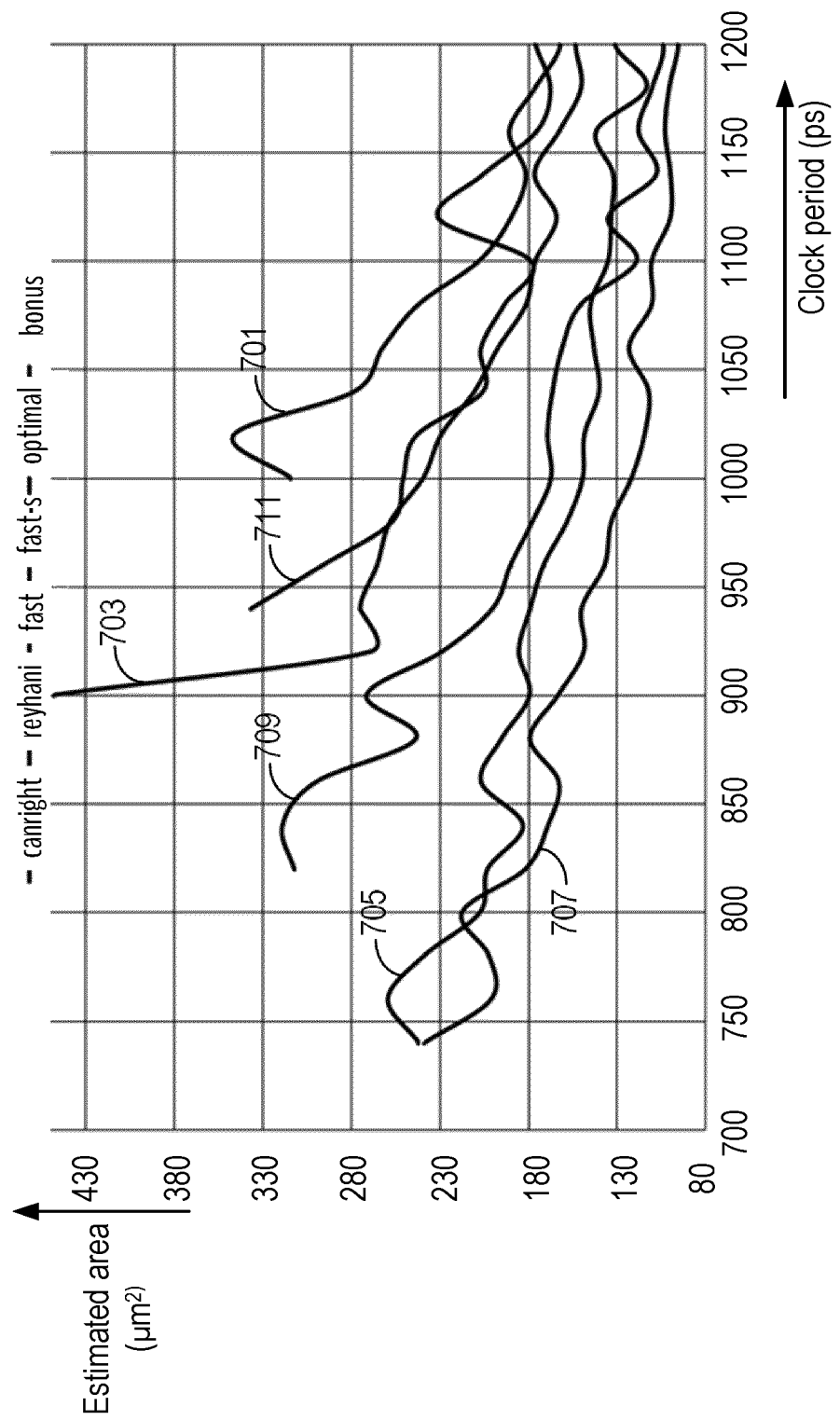
FIG. 7 depicts a set of graphs illustrating synthesis results for different embodiments of a combined SBox.

The synthesis results for the forward SBox are shown in FIG. 6, and for the combined SBox in FIG. 7. To enable comparison, FIG. 6 shows graphs of synthesis results for the architectures of:

Ches18_fast 601

Ches18_small 603

"fast" circuit 605, as described herein

"optimal" circuit 607, as described herein

"bonus" circuit 609, as described herein.

(The terms "Ches18_fast" and "Ches18_small" refer to the results in [12].)

In FIG. 6:

The curve 605 depicting the herein-described "fast" circuit is shown ranging from just under 650 ps up to approximately 1075 ps.

The curve 603 depicting "ches18_small" ranges from approximately 780 ps up to approximately 1075.

The curve 601 depicting "ches18_fast" ranges from approximately 800 up to approximately 1075.

To enable further comparison, FIG. 7 shows graphs of synthesis results for the architectures of:

canright 701.
reyhani 703.
"fast" circuit 705, as described herein.
"fast-s" circuit 707, as described herein.
"optimal" circuit 709, as described herein.
"bonus" circuit 711, as described herein.

(The term "Canright" refers to the results in [4] and the term "reyhani" refers to the results in [6].)

In FIG. 7:

The curve 707 depicting " "fast-s" is shown closest to the x-axis, and ranges from approximately 740 up to 1200.

The curve 705 depicting "fast" is shown second-closest to the x-axis, and ranges from approximately 740 up to 1200.

The curve 703 depicting "reyhani" ranges from approximately 900 up to 1200.

The curve 701 depicting "canright" ranges from approximately 1000 up to approximately 1200.

In each of FIGS. 6 and 7, the closer the curve is to the axes, the better the result in terms of area/speed trade-off.

Figure 8:
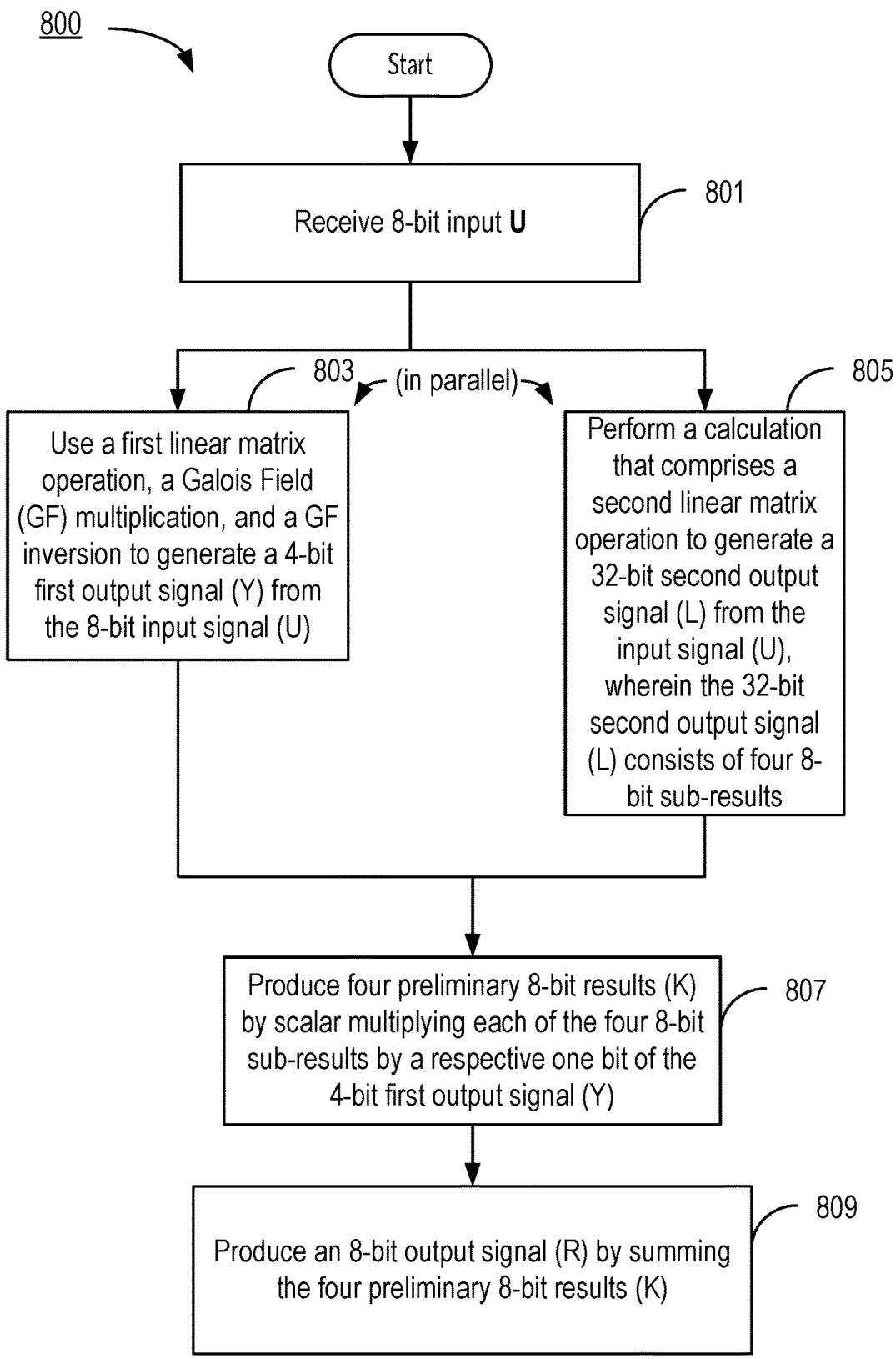
FIG. 8 is, in one respect, a flowchart of actions performed by embodiments consistent with the invention.

Further aspects of the herein-described technology are now described with reference to FIG. 8, which is in one respect a flowchart of actions performed by embodiments consistent with the invention. In another respect, FIG. 8 can also be considered a block diagram of means 800 for performing SBox functionality, comprising the various component parts (801, 803, 805, 807, and 809) for mapping an input to an output in accordance with SBox functionality.

Actions begin with receiving an 8-bit input, U (step 801). The 8-bit input is supplied as an input to two further actions that operate in parallel with one another. A first of these is using a first linear matrix operation, a Galois Field (GF) multiplication, and a GF inversion to generate a 4-bit first output signal (Y) from the 8-bit input signal (U) (step 803).

And in parallel, a calculation is performed (step 805) that comprises a second linear matrix operation to generate a 32-bit second output signal (L) from the input signal (U), wherein the 32-bit second output signal (L) consists of four 8-bit sub-results.

Next, four preliminary 8-bit results (K) are produced by scalar multiplying each of the four-8-bit sub-results of the 32-bit second output signal (L) by a respective one bit of the 4-bit first output signal (Y) (step 807).

Then, an 8-bit output signal (R) is produced by summing the four preliminary 8-bit results (K).

Figure 9:
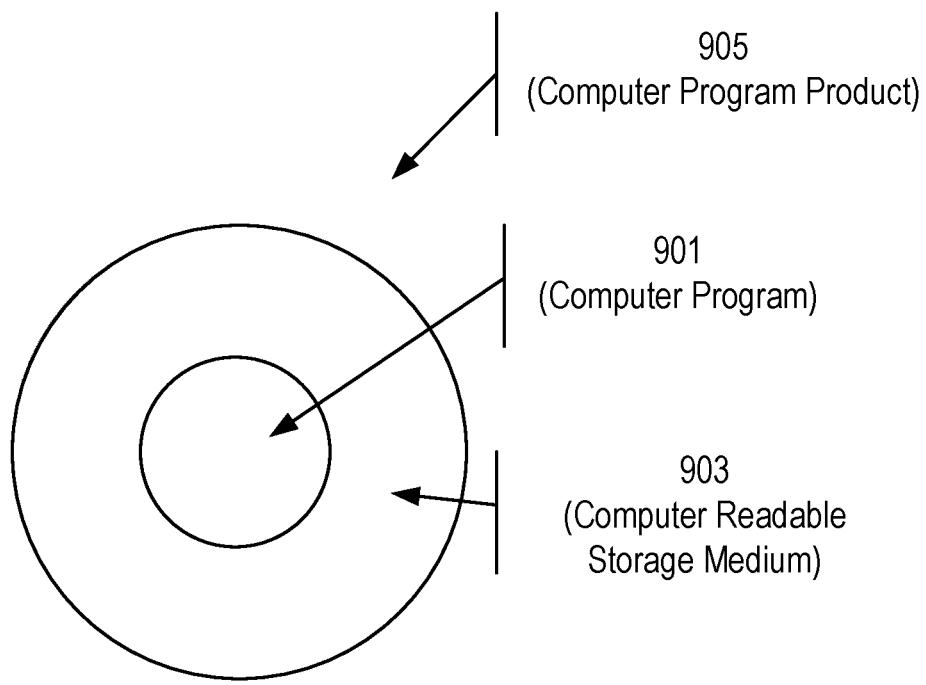
FIG. 9 depicts a computer program, a computer readable storage medium, and a computer program product, each consistent with aspects of the invention.

In other aspects of embodiments consistent with the invention, as illustrated in FIG. 9, the architectures of the improved SBox as described herein can also be embodied in a number of other forms including a computer program 901 comprising a set of program instructions configured to cause one or processors to perform a series of actions such as those depicted in any of FIGS. 3A, 3B, 5, and 8 (for example, the computer program 901 when run on a processing device causes operation in accordance with the various embodiments described herein). Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Some other embodiments take the form of a computer readable storage medium 903 (or equivalently a set of media) comprising a computer program 901 as described above. A computer-readable medium 901 may include removable and non-removable storage devices including, but not limited to, Read Only Memory (ROM), Random Access Memory (RAM), compact discs (CDs), digital versatile discs (DVD), and the like.

Still other embodiments can take the form of a computer program product 905, embodied in a computer-readable medium 903, including computer-executable instructions, such as program code, executed by computers in networked environments.

Throughout this disclosure, the blocks in the various diagrams may refer to a combination of analog and digital circuits, and/or one or more controller units, configured with software and/or firmware, e.g. stored in the storage units (data base), that when executed by the one or more controller units perform as described above. One or more of these controller units, as well as any other combination of analog and digital circuits, may be included in a single application-specific integrated circuitry (ASIC), or several controller units and various digital hardware may be distributed among several separate components, whether individually packaged or assembled into a system-on-a-chip (SoC). The one or more controller units may be any one of, or a combination of a central processing unit (CPU), graphical processing unit (GPU), programmable logic array (PAL) or any other similar type of circuit or logical arrangement.

Advantages

A new architecture is disclosed herein that is faster (having shorter critical depth) than previously known results. In this new architecture, the bottom linear matrix that is present in conventional solutions (see, e.g., FIG. 2) has been removed, with most of the calculations instead being performed in the top linear matrix, parallel to the inversion circuit (see, e.g., FIGS. 3A and 3B). In this way the depth of the circuit is reduced by roughly 25%-30%. The resulting SBoxes are the fastest known.

Abbreviations

AES: Advanced Encryption Standard
ASIC: Application Specific Integrated Circuit
FPGA: Field Programmable Gate Array

REFERENCES

[1] NIST: Specification for the ADVANCED ENCRYPTION STANDARD (AES). Technical Report FIPS PUB 197, National Institute of Standards and Technology (NIST) (2001)

[2] Vincent Rijmen. Efficient implementation of the Rijndael S-box. available at www.esat.kuleuven.ac.be.

[3] Akashi Satoh, Sumio Morioka, Kohji Takano, and Seiji Munetoh. A compact Rijndael hardware architecture with S-box optimization. In Colin Boyd, editor, Advances in Cryptology—ASIACRYPT 2001, 7th International Conference on the Theory and Application of Cryptology and Information Security, Gold Coast, Australia, Dec. 9-13, 2001, Proceedings, volume 2248 of Lecture Notes in Computer Science, pages 239-254. Springer, 2001.

[4] D. Canright. A Very Compact S-Box for AES. In Josyula R. Rao and Berk Sunar, editors, Cryptographic Hardware and Embedded Systems—CHES 2005, pages 441-455, Berlin, Heidelberg, 2005. Springer Berlin Heidelberg.

[5] Rei Ueno, Naofumi Homma, Yukihiro Sugawara, Yasuyuki Nogami, and Taka-fumi Aoki. Highly efficient GF(28) inversion circuit based on redundant GF arithmetic and its application to AES design. In Tim Güneysu and Helena Handschuh, editors, Cryptographic Hardware and Embedded Systems-CHES 2015-17th International Workshop, Saint-Malo, France, Sep. 13-16, 2015, Proceedings, volume 9293 of Lecture Notes in Computer Science, pages 63-80. Springer, 2015.

[6] Reyhani-Masoleh, A., Taha, M., & Ashmawy, D. (2018). New Area Record for the AES Combined S-box/Inverse S-box. In 2018 IEEE 25th Symposium on Computer Arithmetic (ARITH), pages 145-152, 2018.

[7] Samsung Electronics Co., Ltd. STD90/MDL90 0.35 μm 3.3V CMOS Standard Cell Library for Pure Logic/MDL Products Databook, 2000.

[8] Joan Boyar and René Peralta. A New Combinational Logic Minimization Technique with Applications to Cryptology. In Paola Festa, editor, *Experimental Algorithms*, pages 178-189, Berlin, Heidelberg, 2010. Springer Berlin Heidelberg. URL: eprint.iacr.org.

[9] Joan Boyar and René Peralta. A new combinational logic minimization technique with applications to cryptology. In of *Lecture Notes in Computer Science*, pages 178-189. Springer, 2010.

[10] Joan Boyar and René Peralta. A small depth-16 circuit for the AES S-Box. In Dimitris Gritzalis, Steven Furnell, and Marianthi Theoharidou, editors, *SEC*, volume 376 of *IFIP Advances in Information and Communication Technology*, pages 287-298. Springer, 2012. URL: link.springer.com.

[11] J. Boyar and R. Peralta. Patent application number 61089998 filed with the U.S. Patent and Trademark Office. A new technique for combinational circuit optimization and a new circuit for the S-Box for AES, 2009.

[12] Arash Reyhani-Masoleh, Mostafa Taha, and Doaa Ashmawy. Smashing the implementation records of AES S-Box. *IACR Transactions on Cryptographic Hardware and Embedded Systems*, 2018(2):298-336, May 2018.

The embodiments disclosed herein may be implemented through combination of analog and digital circuits, and one or more controller units, together with computer program code for performing the functions and actions of the embodiments described herein. The program code mentioned above may also be provided as a computer program product, for instance in the form of a data carrier carrying computer program code for performing the embodiments herein when being loaded into the mobile communications device. One such carrier may be in the form of a CD ROM disc. It is however feasible with other data carriers such as a memory stick. The computer program code may furthermore be provided as pure program code on a server and downloaded to the mobile communications device at production, and/or during software updates.

When using the word "comprise" or "comprising" it shall be interpreted as non-limiting, i.e. meaning "consist at least of".

The inventive concept has mainly been described above with reference to a few embodiments. However, as is readily appreciated by a person skilled in the art, embodiments other than the ones disclosed above are equally possible within the scope of the inventive concept, as disclosed herein.

Key aspects of the technology described herein will be appreciated by those of skill in the art as comprising various combinations and sub-combinations of technical features discussed above with respect to, and depicted in, FIGS. 3A, 3B, 5, 8, and 9 ("architecture D") in Part A of this disclosure, and in the Architectural Improvements disclosed in Section 5 of Part B of this disclosure.

Other key aspects of the technology described herein will be appreciated by those of skill in the art as comprising various combinations and sub-combinations of technical features discussed above with respect to the methodology for resolving linear systems with multiplexers as discussed in Section 4 of Part B of this disclosure, which follows.

PART B OF THE DISCLOSURE

Smallest, Optimal, and Fastest AES SBoxes

1 Introduction

Efficient hardware design of the AES SBox is a well-studied subject. If you want the absolute maximum speed, you'd probably use a straight forward table-lookup implementation, which naturally lead to a large area. In many practical situations the area of the cryptographic subsystem is limited, and the designer cannot afford to implement table-lookup for the 16 SBoxes involved in an AES round, especially when implemented in an FPGA. For these situations, we need to study how to implement the AES SBox with logical gates only, focusing on both area and maximum clocking speed. The maximum clocking speed of a circuit is determined by the critical path or depth of the circuit; the worst case time it takes to get stable output signals from a change in input signals.

Another aspect when implementing AES is the need for the inverse cipher. Many modes of operation for a block cipher only use the encryption functionality and hence there is no need for the inverse cipher. In case you need both the forward and inverse SBox, it is often beneficial to combine the two circuits. This is because the main operation of the AES SBox is inverting a field element, which naturally is its own inverse, and we expect that many gates of the two circuits can be shared.

From a mathematical perspective, the forward AES SBox is defined as the composition of a non-linear function $I(g)$ and an affine function $A(g)$, such that $SBox(g)=A(I(g))$. The non-linear function $I(g)=g^{-1}$ is the multiplicative inverse of an element g in the finite field $GF(2^8)$ defined by the irreducible polynomial $x^8+x^4+x^3+x+1$. We will assume that the reader is familiar with the AES SBox, and refer to [oST01] for a more comprehensive description.

The first step towards a small area implementation was described by Rijmen [Rij00], where results from [IT88] was used. The idea is that the inverse calculation in $GF(2^8)$ can be reduced to a much simpler inverse calculation in the subfield $GF(2^4)$ by doing a base change to $GF((2^4)^2)$. In 2001, Satoh et al [SMTM01] took this idea further and reduced the inverse calculation to the subfield $GF(2^2)$. In 2005, Canright [Can05] built on the work of Satoh et al and investigated the importance of the representation of the subfield, testing many different isomorphisms that led to the smallest area design. This construction is perhaps the most cited and used to implementation of an area constraint combined AES SBox.

In a series of papers, Boyar, Peralta et al presented some very interesting ideas for both the subfield inverter as well as new heuristics for minimizing the area of logical circuits [BP10a, BP10b, BP12, BFP18]. They derived an inverter over $GF(2^4)$ with depth 4 and a gate count of only 17. The construction in [BP12] is the starting point for this disclosure.

After Boyar, several other papers followed focusing on low depth implementations [JKL10, NNT+10, UHS+15]. In 2018 two papers by Reyhani et al [RMTA18a, RMTA18b] presented the best known implementation (up until now) of both the forward SBox as well as the combined SBox. As pointed out in [RMTA18a], there are misalignment between researchers in how to present and compare implementations of combinatorial circuits. One way is to simply count the total number of standard gates in the design and find the path through the circuit that contains the critical path to determine and compare the speed. In practice it is much more complicated than that. For this paper, we present both the simple measure using only the number of gates, as well as giving a Gate Equivalent (GE) number based on the typical area required for the gate compared to the NAND gate. So for example the NAND gate will have GE=1, while the XOR gate will have a GE=2.33. The relative numbers for the GE are dependent on the specific ASIC process technology used, as well as the drive strength needed from the gate. We have used the GE values obtained from the Samsung's STD90/MDL90 0.35 μm 3.3V CMOS technology [Sam00]. A comprehensive discussion on our choices for circuits comparison can be found in Appendix A. Additionally, we propose to count technological depth of a circuit normalized in terms of the delays of a XOR gate, which makes it possible to compare depths and the speed of various academic results.

In the following disclosure, various new techniques to minimize a circuit realization of a linear matrix are presented and analyzed. Also, a novel approach to include multiplexers in the minimization is introduced, which is relevant for the combined SBox construction. Also, a new architecture is provided in which the bottom linear matrix (present in conventional circuits) is removed in order to get as small circuit depth as possible. These new techniques result in smaller and faster AES SBoxes than previously presented.

2 Preliminaries

We will follow the notation used in both [Can05] and [BP12] when we now construct our tower field representation. The irreducible polynomials, roots, and normal basis can be found in Table 1.

TABLE 1

Definition of the subfields used to construct $GF(2^8)$.

| Target Field | Irreducible Poly. | Root | Coefficients in Field | Normal Base |
|---|---|---|---|---|
| $GF(2^2)$ | $x^2 + x + 1$ | W | $GF(2)$ | $[W, W^2]$ |
| $GF(2^4)$ | $x^2 + x + W^2$ | Z | $GF(2^2)$ | $[Z^2, Z^8]$ |
| $GF(2^8)$ | $x^2 + x + WZ$ | Y | $GF(2^4)$ | $[Y, Y^{16}]$ |

Following [Can05] and [BP12], we can now derive the expression for inverting a general element $A = a_0 Y + a_1 Y^{16}$ in $GF(2^8)$ as $$A^{-1} = (AA^{16})^{-1} A^{16}$$
$$= ((a_0 Y + a_1 Y^{16})(a_1 Y + a_0 Y^{16}))^{-1} (a_1 Y + a_0 Y^{16})$$
$$= ((a_0^2 + a_1^2) Y^{17} + a_0 a_1 (Y^2 + Y^{32}))^{-1} (a_1 Y + a_0 Y^{16})$$
$$= ((a_0 + a_1)^2 Y^{17} + a_0 a_1 (Y + Y^{16})^2)^{-1} (a_1 Y + a_0 Y^{16})$$
$$= ((a_0 + a_1)^2 WZ + a_0 a_1)^{-1} (a_1 Y + a_0 Y^{16}).$$

And the element inversion in $GF(2^8)$ can be done in $GF(2^4)$ according to

| | | | |
|---|---|---|---|
| $T_1 = (a_0 + a_1)$ | $T_2 = (WZ) T^2_1$ | $T_3 = a_0 a_1$ | $T_4 = T_2 + T_3$ |
| $T_5 = T_4^{-1}$ | $T_6 = T_5 a_1$ | $T_7 = T_5 a_0$ | | where the result is obtained as $A^{-1} = T_6 Y + T_7 Y^{16}$. In these equations we utilize several operations (addition, multiplication, scaling, and squaring) but only two of them are nonlinear over GF(2); multiplication and inversion. Furthermore, the standard multiplication operation also contains some linear operations. If we separate all the linear operations from the non-linear and bundle them together with the linear equations needed to do the base change for the AES SBox input, which is represented in polynomial base using the AES SBox irreducible polynomial $x^8 + x^4 + x^3 + x + 1$, we will end up with an architecture of the SBox according to FIG. 2.

In case we are dealing with the inverse SBox, we naturally need to apply the inverse affine transform to the top linear matrix instead of the bottom.

This architecture will be our starting point, and we will now provide a set of new or enhanced algorithms for minimizing both the area and the depth of the two linear top and bottom matrices.

3 Circuits for Binary Linear System of Equations

In this section, we will recapitulate the known techniques for linear circuit minimization and propose a few improvements. We start by clearly stating the objectives.

3.1 Basic Problem Statement

Given a binary matrix $M_{m \times n}$ and the maximum allowed depth maxD, find the circuit of depth D≤maxD with the minimum number of XOR gates such that it computes $Y = M \cdot X$. In other words, given n bits of input $X = (x_0 \ldots x_{n-1})$ the circuit should compute m linear combinations $Y = (y_0 \ldots y_{m-1})$. Any circuit realization that implements a given system of linear expressions is called a solution.

The above problem is NP complete, and we have seen various heuristic approaches that help finding a sub-optimal solution in the literature. In all previous work we have studied, the assumption is that all input signals arrive in the same time, and all output signals are "ready" with delays at most maxD. In this paper we extend the problem with AIR and AOR defined as follows.

Additional Input Requirement (AIR). The problem may be extended with an additional requirement on input signals X, such that each input bit $x_i$ arrives with its own delay $d_i$, in terms of XOR-gates delays. The resulting depth D≤maxD then includes input delays. For example, if some input $x_i$ has the delay $d_i$>maxD then no solution exists. The AIR is useful while deriving the bottom matrix as described in Section 2, since after the non-linear part, the signals entering the bottom matrix will have different delays.

Additional Output Requirement (AOR). The problem may be extended by an additional requirement on the output signals. Each output signal $y_i$ may be required to be "ready" at depth at most $e_i$≤maxD. This is useful when some output signals continue to propagate in the critical path and other signals may be computed with larger delays, but still at most maxD. The AOR is used while deriving the top matrix as described in Section 2, since when we introduce multiplexers for the combined SBox, the output signals of the top matrix will be required to have different delays.

3.2 Cancellation-Free Heuristics

Cancellation-free heuristics is an algorithm that produces linear expression $z = a \oplus b$, where both a and b are Boolean linear expressions in the input variables, and a and b share no common terms. In other words, as we add a and b we will not cancel out any term.

Paar [Paa97] suggested a greedy approach to solving the Basic Problem in 3.1. That solution starts with the matrix M and considers all pairs of columns (i, j) in M. Then a metric is defined (on the pairs of columns) as the number of rows where $M_{r,i}=M_{r,j}=1$, i.e. where the input variables $x_i$ and $x_j$ both occur. For the column pair with the highest metric, we form a new variable $x_n=x_i \oplus x_j$ and add that to the matrix (which now is of size m×(n+1)), and set positions $M_{r,i}=M_{r,j}=0$, and $M_{r,n+1}=1$.

Also Canright [Can05] used this technique but instead of using the metric function, he performed an exhaustive search over all possible column pairs. This was possible due to the fact that the target matrix in his case was the base conversion matrix only of size 8×8. As we saw in Section 2, our bottom matrix will be considerably larger, and hence we need to take another approach. We also need to consider the AIR and the AOR.

Solving the AIR. When performing the algorithm we should keep track of the depth of the newly added XOR gates. This is done by having a vector $D=(d_0 \ldots d_{n-1})$ with the current depth of all inputs and newly added signals $x_i$. When the new signal $x_n=x_i \oplus x_j$ is added, the delay of $x_n$ is trivially $d_n=\max(d_i, d_j)+1$. We then also restrict the algorithm such that if $d_n>\text{maxD}$ then we are not allowed to add $x_n$ as a new input signal. The AIR is hereby solved automatically.

Solving the AOR. Similarly, when adding a new input variable $x_n$, we need to check if a solution is theoretically possible. We may do that using the function CircuitDepth (detailed as Algorithm 2 in Appendix B.1). If CircuitDepth returns a larger delay than $e_i$ we know that no solution exists, and that particular $x_n$ should be avoided.

Probabilistic heuristic approach. Since we cannot perform a full exhaustive search on the bottom matrix due to its size, we need to confine the number of pairs to keep and further evaluate. We have found that keeping the K best candidates (based on the original metric by Paar) and then randomly select which one to pick for the next XOR gate is a good strategy. In our simulations, this probabilistic approach gave us much smaller circuits than only considering the best metric candidates. Naturally, the execution time will be too long if we pick a too large K, and conversely picking a too small K decreases the chances of deriving a good circuit. In practice we found that K=2 . . . 6 is a reasonable number of candidates to keep and try.

3.3 Cancellation-Allowed Heuristic

Cancellation-free approaches are sub-optimal, as it was shown by Boyar and Peralta in [BP10a], where they also introduced a new algorithm that allows cancellations. This was later improved by Reyhani et al in [RMTA18a]. Next, we briefly describe the basic idea of that heuristic.

3.3.1 Basic Cancellation-Allowed Algorithm [BP10a]

Every row of M is an n-bit vector of 0s and 1s. That vector can be seen as a n-bit integer value. We define that integer value as a target point. Thus, the matrix M can be seen as the column vector of m target points. The input signals $\{x_0, \ldots, x_{n-1}\}$ can also be represented as integer values $x_i=2^i$, for i=0 . . . n−1.

Let the base set $S=\{s_0, \ldots, s_{n-1}\}=\{1, 2, 4, \ldots, 2^n\}$ initially represent the input signals. The key function of the algorithm is the distance function $\delta_i(S,y_i)$ that returns the smallest number of XOR gates needed to compute a target point $y_i$ from the set of known points S. The algorithm keeps a vector $\Delta=[\delta_0, \delta_1, \ldots, \delta_{n-1}]$ which is initially set to the Hamming weight minus one of the rows of M, which would be the number of XOR gates needed without any sharing.

The algorithm then proceeds by combining two base points $s_i$ and $s_j$ in the base set S, and XOR them together producing a candidate point $c=s_i \oplus s_j$. The selection of $s_i$ and $s_j$ is performed by an exhaustive search over all distinct pairs, and then for each candidate point, the sum of the distance vector $\Sigma \delta_i$, for i∈[0,n−1], is calculated. Note that the distance functions $\delta_i$ now is computed over the set $S \cup \{c\}$. The pair which gives the smallest distance sum is picked and S is updated $S=S \cup \{c\}$. In case there is a tie, the algorithm picks the pair that maximizes the Euclidean norm $\sqrt{\Sigma \delta_i^2}$, for i∈[0,n−1]. If there is a tie after this step too, the authors in [BP10a] investigated different strategies and concluded that all strategies tested performed similarly, and hence a simple random selection can be used. The algorithm then repeats the step of picking two new base points and calculating the distance vector sum, until the distance vector is all-zeros and the targets are all found. In the original description, there is also a notion of "preemptive" choices. A preemptive choice is a candidate point c such that it directly fulfils a target row in the matrix M. If such a candidate is found, it is immediately used as the new point and added to S.

Reyhani et al [RMTA18a] improved the original algorithm by directly searching for preemptive candidates in each round and add them all to the set S before the "real" candidate is added and the distance vector recalculated. They also improved the tie resolution strategy and kept all the candidates that were equally good under the Euclidean norm and recursively tried them all, keeping the one that was best in the next round. In our experiments we concluded that keeping two different candidates and recursively evaluating them gave good results.

Our improvement to this algorithm is a faster evaluation of the 5 values for moderate sized n-values. It can be found in Appendix B.2.

3.3.2 when the Maximum Depth maxD is a Required Constraint

Although the AIR problem can be solved simply by adding the vector of delays D of all known signals alongside with S, the problem of finding a short circuit with a fixed maxD is still quite difficult. Even if we limit every newly added signals in S to be of depth≤maxD, the resulting circuit becomes very large in terms of XOR gates, in fact much larger than what we could achieve with cancellation-free heuristic.

One idea is that if there is a tie with respect to the shortest distances $\delta_i=\delta(S,y_i)$, then we should take c with the smallest delay. But in our simulations it didn't produce better results than the cancellation-free algorithm, even if we add a randomization factor to both algorithms. We must conclude that adoption of the additional maxD-constraint to that cancellation-allowed heuristic algorithm is still an open question.

3.4 Exhaustive Search Methods

In this section we present an algorithm for an efficient exhaustive search of the minimal circuit. The overall complexity is exponential in the number of input signals, and linear in the number of output signals. From our experiments we can conclude that this exhaustive search algorithm can be readily applied to circuits of approximately 10-bits input.

3.4.1 Notations and Data Representation

Using the same integer representation of the rows of M, and the input signals $x_i$ as in Section 3.3.1, we can re-phrase the basic problem statement: given the set of input points $x_i$ we want to find the sequence of XORs on those points such that we get all the m wanted target points $y_i$, the rows of the matrix M, with the maximum delay maxD. Input and output points may have different delays $d_i$ and $e_i$, respectively.

For data structures, we can store a set of $2^n$ points as either a normal set, and/or as a bit-vector. The set makes it possible to loop through the points while the bit-mask representation is efficient to test set membership.

3.4.2 Basic Idea

The exhaustive search algorithm is a recursive algorithm, running through the depths, starting at depth 1 and running down to maxD. At each depth D, we try to construct new points from the previous depths, thereby constructing circuits that are of exactly depth D. When all target points are found, we check the number of required XOR gates, keeping track of the smallest solution. We will need the following sets of points:

known[maxD+1]—the set of known points at certain depth D.

ignored[maxD+1]—the set of points that will be ignore at depth D.

targets—the set of target points.

candidates—the set of candidate points to be added to the set known at the current recursion step.

The initial set of known points is $x_i$, for i=0 . . . n−1, and the set of target points is $y_i$, for i=0 . . . m−1. AIR is solved by initially placing the input point $x_i$ to the known set at depth $d_i$. AOR is solved by setting the point $y_i$ with output delay $e_i$ to the ignore list on all depth levels that are larger than $e_i$.

We will now explain the steps executed at each depth of the recursion, assuming that we currently are at depth D.

Step 1—Preemptive points. Check the known[D] set to see if any pair can be combined (XOR:ed) to give a target point not yet found. If all targets are found, or if we have reached maxD, we return from this level of the recursion.

Step 2—Collect candidates. Form all possible pairs of points from the known[0 . . . D−1] sets, where at least one of the points is from known [D−1], and XOR the pair to derive a new point. If the derived point is in the set ignored[D] then we skip it, otherwise we add it to candidate set.

Step 3—In this step we try to add points from the candidate set to the known list, and call the algorithm recursively again. We start by trying to add 1 point and do the recursive call. If that's not solving the target points, we'll try to add 2 points, and so on until all combinations (or a maximum number of combinations) of the points in the candidate set have been tried.

3.4.3 Ignored Points and Other Optimizations

In step 2, we check the candidate against the ignored [D] set, the set of ignored points at depth D. The ignored set is constructed from a set of rules; Intersection: A candidate point p should be ignored if for all target points $w_i$ we get $(w_i \& p) \neq p$. This means that the point p covers too many of the input variables, and is not covered by any of the points in the targets set; Forward Propagation: We can calculate all possible points on each level starting from the top level D=0 with n known points and going down to D=maxD. Those points that can never appear on some level d are then included into the ignored [d] set. If some target point w has another desired maximum delay $e_i$<maxD, then that point on the following depths should be ignored, i.e., we add w to ignored [$e_i$+1 . . . maxD]; Sum of Direct Inputs: If any of the input signals $x_i$, $x_j$ give the point $p=x_i \oplus x_j$ on level d, then all consecutive levels >d must have the point p in the ignored list; Backward Propagation: As a last check, we can go backwards level by level, starting from d=maxD and ending at level d=1, and for each allowed (not ignored) point on the level d we check whether there is still a not-ignored pair a,b on the previous levels (one of a or b must be on the level d−1) such that it gives $p=a \oplus b$. If not, then the point p should be added to the ignore [d] set; Ignore Candidates: dynamically add a point w to the ignore [d] set if w has been one of the candidates on previous levels<d.

3.5 Conclusions

From our simulations we can conclude the following regarding searching for the minimum solution; the top matrix (with only 8 inputs) can be solved with the exhaustive cancellation-allowed search as in Section 3.4. The bottom matrix (with 18 inputs) is too large for a direct exhaustive search, and we should start with a probabilistic cancellation-free heuristic from Section 3.2, and then use a full exhaustive search for the ending part, when the Hamming weights of the remaining rows become small enough to perform the exhaustive search. This approach showed to give the best result.

4 System of Linear Circuits with Multiplexers

Assume we want to find a circuit for the combined SBox, where the top and the bottom linear matrixes need to be multiplexed based on the SBox direction. This means that the circuit for the combined linear expressions is basically doubled in size, plus the set of multiplexers. In this section we will show how to deal with multiplexed systems of linear expressions. We will show that the MUX and XOR gates can be resolved in a combined way in order to achieve a very compact circuit.

4.1 Floating Multiplexers

Consider that for some signal Y we have to compute two linear expressions $Y^F$ and $Y^I$ for the forward and the inverse SBoxes respectively. Then we apply a multiplexer so that only one of the signals continues as Y. Assume further that the signals $Y^F$ and $Y^I$ share some part of the expression. Then it may be better to push that shared part down under the multiplexer, and the resulting solution can be simplified.

For example, let $Y^F=X_0 \oplus X_1$ and $Y^I=X_0 \oplus X_2$, then normally we should spend 2 XOR gates and 1 multiplexer, so that we get $Y=MUX(select, X_0 \oplus X_1, X_0 \oplus X_2)$ with 3 gates. However, we can push the common part $X_0$ behind the multiplexer as follows:

$$Y = MUX(select, X_1, X_2) \oplus X_0,$$

then we get a circuit with only 2 gates. In general, one can pick any linear combination A on input signals and make a substitution:

$$Y = MUX(select, Y^F, Y^I) \rightarrow MUX(select, Y^F \oplus \Delta, Y^I \oplus \Delta) \oplus \Delta,$$

Where $\Delta$ is then added to the linear matrix as an additional target signal to compute. If that substitution leads to a shorter circuit then we keep it. We should also choose such $\Delta$ that the overall depth is not increased. Thus, various multiplexers will be "floating" over the depth of the circuit. Signals with $\Delta \neq 0$ should have their maximum depth decreased by 1.

4.1.1 Metrics and Linear Expressions to Solve

We have n input signals $X_1 \ldots X_n$ and m output signals $Y_1 \ldots Y_m$, where each $Y_i$ is represented in its most general form as a triple ($A_i$, $B_i$, $C_i$) such that $$Y_i = A_i \oplus MUX(select, B_i, C_i)$$

where $A_i$, $B_i$, and $C_i$ are linear expressions on the input signals. We are allowed to modify the above expression as $(A_i \oplus \Delta_i, B_i \oplus \Delta_i, C_i \oplus \Delta_i)$ for any $\Delta_i$, since the Boolean function of $Y_i$ would not change.

Let ABC represent the linear matrix that describes all the rows $A_i$, $B_i$, and $C_i$, for i=0 . . . m, such that $$ABC \times X$$

gives the wanted linear system to realize using minimal number of gates and a given maxD. By choosing favorable values of $\Delta_i$, one can shrink the number of total gates, since some of the target points of ABC may become equal to each other, and hence ABC can be reduced by at least one row. Also, some of the targets may become 0 or having only one bit—i.e., they equal to corresponding input signals. These targets are also removed from the linear system as they are trivial and cost zero gates. After the above reductions we get a system of linear expressions where all rows are distinct and have Hamming weight at least 2. As before, we interpret the rows of ABC as integers, and adding (XOR:ing) a $\Delta_i$ to the three rows $A_i$, $B_i$, and $C_i$ will change those three target points, but not the resulting $Y_i$.

Metric. Search for a good combination of $\Delta$s requires a lot of computation and it rapidly becomes infeasible to compute a minimal solution for each selection. Thus, we need to decide on a good metric that allows us to truncate the search space down to promising sets of $\Delta$s. We propose to adopt a metric that is based on the lower bound of the number of gates of a fixed system (when $\Delta$ values are selected), and define the metric to be the number of rows of the reduced ABC matrix, plus the minimum number of extra gates needed to complete the circuit, such as multiplexers.

In the following we present several heuristic approaches to find a good set of $\Delta$s while minimizing the metric.

4.1.2 Iterative Algorithms to Find $\Delta$s: Metric→Minimize

The below techniques only work for small n, but in our case it is readily applicable to the 8-input top matrix of the AES SBox.

Algorithm-A(k)—Select k triplets $(A_i, B_i, C_i)$ and try to find matching $\Delta_i$s that minimize the metric. If some choice results in a smaller metric, we keep that choice and continue searching with the updated ABC matrix. The algorithm runs in a loop until the metric is not decreasing any more. Algorithm-A(1) is quite fast, and Algorithm-A(2) also has acceptable speed. For larger ks it becomes infeasible. Algorithm-A(k) works fine for a very quick/brief analysis of the given system but the result is quite unstable since for a random initial values of $\Delta_i$s the resulting metric fluctuates heavily.

Algorithm-B—unlike Algorithm-A this algorithm is trying to construct a linear system of expressions, starting from an empty set of knowns S and then trying to add new points to S one by one, until all targets of ABC become included in the set S. While testing whether a new candidate C should be added to S we loop through all $(A_i, B_i, C_i)$ and for each one try to find a $\Delta_i$ that minimizes the overall metric. This heuristic algorithm is a lot more stable and gives quite good results.

But the smallest possible metric does not guarantee that the final solution will have the smallest number of gates, and the number of non-target intermediates needed is unclear. Thus, it would be a good idea to collect a number of promising systems whose metric is the smallest possible, then try to find the smallest solution amongst them. We will investigate this in the next section.

4.2 New Generic Heuristic Technique for Linear Systems with Floating Multiplexers If we generalize the idea of floating multiplexers and let them float even higher up in the circuit, and also sharing them wider, we could achieve better results. In this section we propose a generic heuristic algorithm that finds a nearly best circuit for such systems.

4.2.1 Problem Statement

We are given n-bit input signal $X_n$, binary matrices $M_{m \times n}^F$ and $M_{m \times n}^I$, binary vectors $A_n^F$, $A_n^I$, $B_m^F$, $B_m^I$, and vectors of delays $D_n^X$ and $D_m^Y$. We want to find a smallest and shortest solution that computes the m-bit output signal Y:

$$Y^F = M^F \cdot (X \oplus A^F)$$

$$Y^I = M^I \cdot (X \oplus A^I)$$

$$Y = MUX(ZF; Y^F \oplus B^F; Y^I \oplus B^I),$$

where each input signal $X_i$ has an input arrival delay $D_i^X$ and each output signal $Y_j$ must have the total delay at most $D_j^Y$. A* and B* are constant masking vectors for the input and output signals respectively (NOT-gates). ZF is the mux selector, when ZF=1 we pick the first ($Y^F$="forward") output otherwise the second ($Y^I$="inverse") output. We also assume there is a complement signal $ZI=ZF \oplus 1$ that is also available as an input control signal.

4.2.2 Preliminaries

Similar to our previous notation, we define a "point" to be tuple of a point value (.p) and a delay (.d):

$$\text{point} := \{.p = [f(1 \text{ bit}) IF(n \text{ bits}) | i(1 \text{ bit}) = I(n \text{ bits})], .d = \text{Delay}\}$$

which is then translated into a 1-bit signal circuit $$\text{signal} := MUX(ZF; F \cdot X \oplus f; I \cdot X \oplus i)$$

with a total output delay point.d. I.e., F and I are linear combinations on the n-bit input X, and f and I are negate bits applied to the result in case the selector is "forward" or "inverse", respectively. The n input points are then represented as:

$$\text{input point } X_k := \{.p = [A_k^F | 2^k | A_k^I | 2^k], .d = D_k^X\}, \text{ for } k=0, \ldots, n-1,$$

and the target m points are:

$$\text{target point } Y_k := \{.p = [B_k^F | Y_k^F | B_k^I | Y_k^I], D_k^Y\}, \text{ for } k=0, \ldots, m-1.$$

We should also include the following 4 trivial points to the set of inputs:

$$\text{signal } ZF := \{.p = [1|0|0|0], .d=0\} \quad \text{signal } 0 := \{.p = [0|0|0|0], .d=0\}$$

$$\text{signal } ZI := \{.p = [0|0|1|0], .d=0\} \quad \text{signal } 1 := \{.p = [1|101110], .d=0\}$$

Given any two (ordered) points v and w there are at most 6 possible new points that can be generated based on the following gates:

$$MUX(v;w) := \{.p = [v.f|v.F|w.i|w.I], .d = D_{new}\}$$

$$NMUX(v;w) := \{.p = [v.f \oplus 1 | v.F | w.i \oplus 1 | w.I], .d = D_{new}\}$$

$$MUX(w;v) := \{.p = [w.f|w.F|v.i|v.I], .d = D_{new}\}$$

$$NMUX(w;v) := \{.p = [w.f \oplus 1 | w.F | v.i \oplus 1 | v.I], .d = D_{new}\}$$

$$XOR(v;w) := \{.p = [w.f \oplus v.f | w.F \oplus v.F | w.i \oplus v.i | w.I \oplus v.I], .d = D_{new}\}$$

$$NXOR(v;w) := \{.p = [w.f \oplus v.f \oplus 1 | w.F \oplus v.F | w.i \oplus v.i \oplus 1 | w.I \oplus v.I], .d = D_{new}\}$$

where $D_{new} = \max\{v.d, w.d\} + 1$. Note that the inclusion of the 4 trivial points is important, since then we can limit the number of gate types to be considered. For example, a NOT-gate is then implemented as XOR(v; 1), AND gate with ZF can be implemented as MUX(v; 0), OR gate with ZI is MUX(v; 1), etc.

4.2.3 The Algorithm

We start with the set S of input points (of size n+4), and place all target points into the set T. At each step, we compute the set of candidate points C that is generated by applying the above 6 gates to any two points from the set S. Naturally, C should only contain unique points and exclude those already in S. We try to add one candidate point from C to S and compute the distances from S to each of the target points in T. Thereafter we compare metrics to decide which candidate point will be included into S at this step, and start over by calculating the possible candidates. The algorithm stops when the overall distance δ-metric is 0.

The metric consists of several values. The distance $\delta(S,t_i)$ is the minimum number of basic gates (the above 6) required to get the target point $t_i$ from the points in S, such that the delay is at most $D_i^Y$. Subsection 4.2.5 discusses how to compute $\delta(S,t_i)$. The applied metrics and their order of importance are then as follows:

$$\gamma = (|S| - n - 4) + \sum_{i=0}^{m-1} \delta(S, t_i) \to \min$$

$$\delta = \sum_{i=0}^{m-1} (\delta(S, t_i) - (\delta(S, t_i) == 1)) \to \max$$

$\tau$ = delay of the recent candidate point from C added to $S \to \min$ $$v^2 = \sum_{i=0}^{m-1} (\delta(S, t_i) - (\delta(S, t_i) == 1))^2 \to \max$$

The metric γ is the projected number of gates in case there will be no more shared gates; that metric we should definitely minimize. In case there are several candidates that give the same value, then we look into the second metric δ.

δ is the sum of distances excluding distances where only 1 gate is needed. Given the smallest γ, we must maximize δ. The larger δ the more opportunities to shrink γ. We exclude distances 1 because of the inclusion of the preemptive step that we will describe below. When we accept candidates to S one by one as described above, the metrics δ and γ are similar, but will become distinct when we, in the next subsection, introduce a search tree where the size of |S| may differ.

τ selects the candidate having the minimum depth in case the above two metrics showed the same values for two candidates. In case there are no maximum depth constraints for target points then this metric is not needed.

v is the Euclidean norm excluding the preemptive points (similar to δ). This is the last decision metric since it is not a very good predictor, a worse value may give a better result and vice versa. However, if there are two candidates with equal metrics δ, γ, and τ, then ordering of the two candidates may be done based on v. An alternative approach in case of tie-candidates is to choose one of them randomly.

Preemptive points. If some distance $\delta(S,t_i)=1$ then we accept the point $t_i$ into S immediately without the search through the candidates C. The inclusion of this step in the algorithm forces us to exclude such points from the metrics δ and v.

In [RMTA18a] preemptive points were included into the metric, and we believe it was not correct. E.g., when two distance vectors {1, 2, . . . } and {0, 2, . . . } have the same projected gates, then they show a totally equal situation in terms of possible shared gates, and they should result in the same δ, because of the distance 1 will be included immediately (preemptive point), so it does not give any advantage over the second choice where we have the distance 0. Thus, distance 1 should not be counted in δ and μ, but it is accounted in the projected gates γ, instead.

4.2.4 Search Tree

Additionally to the above algorithm, we propose to have a search tree where each node is a set S with metrics. Children of such a node are also nodes where S' is derived from S by adding one of the candidate point S ←C. Thus, every path from the root node to a leaf represents a sequence of accepted candidate points to the root set S. If, at some point, a leaf has metric δ=0 then that leaf represents a possible solution path.

We keep a number of children nodes (in our experiments we kept at least 20-50 best children) whose metrics are the best (they may even have different projected gates β). We also define the maximum depth TD of the search tree (in our experiments we tried TD=1 . . . 20). When the tree at depth TD is constructed, we then examine the leaves and see where we get the best metric over all leaves at all different branches. Tracking back to the root, we then choose to keep the top branch that leads to the best leaf(s). Other top branches from the root are removed. We then advance the root node to the first child of the selected branch and try to extend the tree's depth again from the remaining leafs, thus, keeping the search tree at a constant depth TD.

If, at every depth of the tree, each leaf is extended with additional 20-50 sub-branches, then the number of leaves will increase exponentially. However, we can apply a truncation algorithm to the leaves before extending the tree to the next depth. We simply keep no more than a certain number of promising leaves that will be expanded to the next depth, and other, less promising leaves we just remove from the tree (in our experiments the truncation level was up to 400 leaves overall for the whole tree). This type of truncation makes it possible to select the best top branch of the root node by "looking further" basically at any depth TD. Notably, the complexity does not depend on the depth TD, but it depends on the truncation level.

Truncation strategy. In brief, we keep those leafs with the best metrics, but try to distribute nearly equal leafs among different branches, so that we keep as many diverted solution paths as possible.

4.2.5 Computation of $\delta(S,t_i)$

The "heart" and the critical part of the algorithm is the algorithm to compute the distances $\delta(S,t_i)$, given a fresh S. There are many candidates to test at each step, and there are many branches to track, so we need to make this core algorithm as fast as possible.

Note that the length of a point (.p is an integer) is 2n+2 bits, plus the delay value. We will ignore the delay (.d) value when doing Boolean operations over two points. Let us assign the number of possible points as:

$$N=2^{2n+2}.$$

Let $V_k[\ ]$ be a vector of length N cells, each cell $V_k[p]$ corresponds to a (2n+2)-bit point p represented as an integer index, and the value stored in the cell will be the minimum delay p.d of that point such that it can be derived from S with exactly k gates.

Set the initial vector $V_0$ as $\forall p \to V_0[p]=p.d$, if $p \in S$, and $V_0[p]=\infty$, otherwise. Thereafter, the vector $V_{k+1}$ can be derived from the previously derived vectors $V_0 \ldots V_k$ by applying the allowed 6 gates to points from some level $0 \leq I < k$ ($V_I$) and the level $k-I$ ($V_{k-I}$), thus resulting in total $I+(k-I)+1=k+1$ gates. After a new $V_{k+1}$ is derived, we simply check if it contains new distance values for the targets from T, and we repeat the procedure until all distances $\delta(S,t_i)$ for all $t_i$ in T are found. A high-level description of the algorithm is given in Algorithm 1, and in Appendix B.3 we provide a more detailed description alongside multiple computational tricks that can be made.

Algorithm 1 Algorithm for computing $\delta(S,t_i)$

```
1:  function Distances(S, T, maxδ) → Δ = {δᵢ}, i = 0, ..., m - 1
2:     Init δᵢ = ∞ for i = 0, ..., m - 1
3:     Init ∀p : V₀[p] = p.d if p ∈ S, otherwise ∞
4:     Init k = 0
5:     while true do
6:        while ∃i: δᵢ = ∞ and Vₖ[tᵢ] ≤ tᵢ.d do
7:           δᵢ = k
8:        if ∀i : δi < ∞ then return OK
9:        if k ≥ maxδ then return FAIL
10:       k ← k + 1
11:       Init ∀p : Vₖ[p] = ∞
12:       for all a,b : do
13:          for p in {MUX(a,b),NMUX(a,b),MUX(b,a),NMUX(b,a),XOR(a,b),NXOR(a,b)} do
14:             for l ← ⌊k/2⌋ to k - 1 do
15:                d ← max(Vₖ₋ₗ₋₁[a], Vₗ[b]) + 1
16:                Vₖ[p] ← min(Vₖ[p],d)
```

5 Architectural Improvements

Most known AES SBox architectures look quite similar, consisting of the Top and Bottom linear parts, and the middle non-linear part, as previously described in Section 2. In this section, we take that classic design and propose a number of improvements, along with a completely new architecture that focuses on low depths solutions.

5.1 Two SBox Architectures—Area and Depth

Referring to FIG. 2, the architecture A (Area) is the classical one that implements designs based on tower and composite fields. It starts with the 8-bit input signal U to the Top linear matrix, which produces a 22-bit signal Q (as in [BP12]). We managed to reduce the number of needed Q-signals to 18, and refactored the multiplication and linear summation block Mul-Sum to 24 gates and depth 3. (See Appendix D.2 for equations). The output from the Mul-Sum block is the 4-bit signal X which is the input to the inversion over $GF(2^4)$. The output from the inversion, Y, is non-linearly mixed with the Q signals, derived in the top matrix, and produces 18-bit signal N. The final step is the Bottom linear matrix that takes 18-bit N and linearly derives the output 8-bit signal R. The top and bottom matrices incorporate the SBox's affine transformation that depends on the direction. The new architecture D (Depth) (shown in FIGS. 3A and 3B) is a new architecture where we tried to remove the bottom matrix and as a result shrinking the depth of the circuit as much as possible. The idea behind is that the bottom matrix only depends on the set of multiplications of the 4-bit signal Y and some linear combinations of the 8-bit input U. Thus, the result R can be achieved as follows:

$$R = Y_0 \cdot M_0 \cdot U \oplus \ldots \oplus Y_3 \cdot M_3 \cdot U$$

where each $M_i$ is a 8×8 matrix representing 8 linear equations on the 8-bit input U, to be scalar multiplied by the $Y_i$-bit. Those 4×8 linear circuits can be computed as a 32-bits signal L in parallel with the circuit for the 4-bits of Y. The result R is achieved by summing up four 8-bit sub-results. Therefore, in architecture D we get the depth 3 after the inversion step (critical path: MULL and 8XOR4 blocks), instead of the depth 5-6 in the architecture A. That new architecture D requires a bit more gates, since the assembling bottom circuit needs 56 gates: 32NAND2+ 8XOR4. The reward is the lower depth.

A more detailed sketch of the two architectures is given in FIGS. 4 and 5, respectively, that includes the components of the designs, delays and the number of gates.

5.2 Six Different Scenarios of MULN

In the MULN block, where the 18-bit N-signals are computed, we need as input the 18-bit Q-signals and the inversion result Y. But we also need the following additional linear combinations of Y: $Y_{02}=Y_0 \oplus Y_2$, $Y_{13}=Y_1 \oplus Y_3$; $Y_{23}=Y_2 \oplus Y_3$, $Y_{01}=Y_0 \oplus Y_1$, $Y_{00}=Y_{01} \oplus Y_{23}$—these correspond to the signals M41-M45 in [BP12]. Thus, the Y vector is actually extended to 9 bits, and the delays of N bits become different, depending on which of the $Y_i$ is used in the multiplication. For example, in the worst case, the delay of $Y_{00}$ is +2 compared to the delay of $Y_1$. Thus, the resulting signals N will have different output delays. However, it is possible to compute these 5 additional Ys in parallel with the base signals $Y_0, \ldots, Y_3$. This will cost some extra gates, but then the +2 delay can either shrink down to +1 or +0. In general one can consider the following 6 scenarios:

S0. We compute only the base signals $Y_0 \ldots Y_3$, and the remaining $\{Y_{01}, Y_{23}, Y_{02}, Y_{13}, Y_{00}\}$ we compute with XORs as above. The delay is +2 but it has the smallest number of gates.

S1. Compute $\{Y_{01}, Y_{23}\}$ in parallel, the delay is +1.

S2. Compute $\{Y_{02}, Y_{13}\}$ in parallel, the delay is +1.

S3. Compute $\{Y_{00}\}$ in parallel, the delay is +1.

S4. Compute $\{Y_{01}, Y_{23}, Y_{02}, Y_{13}\}$ in parallel, the delay is +1.

S5. Compute $\{Y_{01}, Y_{23}, Y_{02}, Y_{13}, Y_{00}\}$ in parallel, the delay is +0 as there is no signals left to compute afterwards.

In the next subsection we show how to find Boolean expressions for the above scenarios.

5.3 INV. Inversion Over $GF(2^4)$

The inversion formulae are as follows:

$$Y_0 = X_1 X_2 X_3 \oplus X_0 X_2 \oplus X_1 X_2 \oplus X_2 \oplus X_3$$

$$Y_1 = X_0 X_2 X_3 \oplus X_0 X_2 \oplus X_1 X_2 \oplus X_1 X_3 \oplus X_3$$

$$Y_2 = X_0 X_1 X_3 \oplus X_0 X_2 \oplus X_0 X_3 \oplus X_0 \oplus X_1$$

$$Y_3 = X_0 X_1 X_2 \oplus X_0 X_2 \oplus X_0 X_3 \oplus X_1 X_3 \oplus X_1$$

In [BP12] they found a circuit of depth 4 and 17 XORs, but we would like to shrink the depth ever further by utilizing a wider range of standard gates. Thus, we have considered each expression independently, using a general depth 3 expression:

$$Y_i=((X_a op_1 X_b) op_5 (X_c op_2 X_d)) op_7 ((X_e op_3 X_f) op_6 (X_g op_4 X_h)),$$

where $X_{a-h}$ are terms from $\{0, 1, X_0, X_1, X_2, X_3\}$ and $op_{1-7}$ are operators from the set of standard gates {AND, OR, XOR, NAND, NOR, XNOR}. Note that the above does not need to have all terms, for example, the expression AND(x, x) is simply x.

The exhaustive search can be organized as follows. Let us have an object Term which consists of a truth table TT of length 16 bits, based on the 4 bits $X_0 \ldots X_3$, and a Boolean function that is associated with the term. We start with the initial set of available terms $T^{(0)}=\{0, 1, X_0, \ldots, X_3\}$, and then construct an expression for a chosen $Y_i$ iteratively. Assume at some step k we have the set of available terms $T^{(k)}$, then the next set of terms and associated expressions can be obtained as:

$$T^{(k+1)}=\{T^{(k)}, T^{(k)} \text{ operator } T^{(k)}\},$$

taking care of unique terms. At some step k we will get one or more term(s) whose TTs are equal to target TTs ($Y_i$s).

Since we could actually get multiple Boolean functions for each $Y_i$ then we should select only the "best" functions following the criteria: there is no NOT gates (due to a better sharing capabilities), there is a maximum number of gates that can be shared between the 4 expressions for $Y_0 \ldots Y_3$, and the area/depth in terms of GE is small.

Using this technique, we have found a depth 3, 15 gates solution for the inversion. The equations are given below, where we also provide depth 3 solutions for the additional 5 signals $\{Y_{01}, Y_{23}, Y_{02}, Y_{13}, Y_{00}\}$ such that they can also share a lot of gates in the mentioned scenarios S0-S5.

$Y_0=(X_0 \text{ and } X_2) \text{ xnor } ((X_1 \text{ nand } X_2) \text{ nand } (X_2 \text{ xor } X_3))$ $Y_1((X_2 \text{ xor } X_3) \text{ nand } X_1) \text{ xor } ((X_0 \text{ and } X_2) \text{ nor } X_3)$ $Y_2=(X_0 \text{ and } X_2) \text{ xnor } ((X_0 \text{ xor } X_1) \text{ nand } (X_0 \text{ nand } X_3))$ $Y_3=((X_0 \text{ xor } X_1) \text{ nand } X_3) \text{ xor } ((X_0 \text{ and } X_2) \text{ nor } X_1)$ $Y_{01}=((X_2 \text{ xor } X_3) \text{ nand } X_1) \text{ nand } ((X_0 \text{ nand } X_3) \text{ nand } X_2)$ $Y_{23}=((X_0 \text{ xor } X_1) \text{ nand } X_3) \text{ nand } ((X_1 \text{ nand } X_2) \text{ nand } X_0)$ $Y_{13}=((X_0 \text{ and } X_2) \text{ nor } (X_1 \text{ xnor } X_3)) \text{ xor } ((X_0 \text{ nand } X_3) \text{ xor } (X_1 \text{ nand } X_2))$ $Y_{02}=((X_2 \text{ xor } X_3) \text{ nand } (X_1 \text{ nand } X_2)) \text{ xor } ((X_0 \text{ xor } X_1) \text{ nand } (X_0 \text{ nand } X_3))$ $Y_{00}=((X_0 \text{ and } X_2) \text{ nand } (X_1 \text{ xnor } X_3)) \text{ and } ((X_0 \text{ nor } X_2) \text{ nor } (X_1 \text{ and } X_3))$ When implementing the above circuits for the scenarios S0-S5, and to sharing the gates in a best possible way, we then got the following results:

TABLE 2

INV block for the scenarios S0-S5.

|  | S0 | S1 | S2 | S3 | S4 | S5 |
|---|---|---|---|---|---|---|
| Std. area (gates) | 15 | 19 | 20 | 21 | 24 | 29 |
| Std. depth (gates) | 3 | 3 | 3 | 3 | 3 | 3 |
| Tech. area (GE) | 23.31 | 27.31 | 33.63 | 31.30 | 37.63 | 43.29 |

TABLE 2-continued

INV block for the scenarios S0-S5.

|  | S0 | S1 | S2 | S3 | S4 | S5 |
|---|---|---|---|---|---|---|
| Tech. depth (XORs) | 2.42 | 2.42 | 2.54 | 2.42 | 2.54 | 2.54 |

In our optimal circuits we have used scenario S1, as it showed best results with respect to the area and depth. For the fast and bonus circuits, we used S0 as it has the smallest area.

5.4 Alpha-Beta Approach for the Top and Bottom Linear Matrices

We are solving the top matrices with exhaustive search and the bottom matrices with various heuristic techniques. The way those matrices look, naturally influence the final number of gates in the solution. Here we present a simple method to try different top and bottom matrices for the best solution.

Assume that the SBox is a black box and it performs the function (excluding the final addition of the constant):

$$SBox(x) = x^{-1} \cdot A_{8 \times 8},$$

where $x^{-1}$ is the inverse element in the Rijndael field $GF(2^8)$, and the matrix $A_{8 \times 8}$ is the affine transformation. In any field of characteristic 2: squaring, square root, and multiplication by a constant—are linear functions, thus for a non-trivial choice $(\alpha, \beta)$ we have:

$$Z(x) = \left(\alpha \cdot x^{2^\beta}\right)^{-1}$$

$$SBox(x) = \sqrt[2^\beta]{\alpha \cdot Z(x)} \cdot A_{8 \times 8},$$

If the initial Top and Bottom matrices for the forward and inverse SBoxes were $T_F$, $B_F$, $T_I$, $F_I$, respectively, then one can choose any $\alpha=1 \ldots 255$ and $\beta=0 \ldots 7$, and change the matrices as follows:

$$T'_F = T^F \cdot E \cdot C_\alpha \cdot P_\beta \cdot E$$

$$B'_F = E \cdot A \cdot P_\beta^{-1} \cdot C_\alpha \cdot A^{-1} \cdot E \cdot B_F$$

$$T'_I = T_I \cdot E \cdot A \cdot C_\alpha \cdot P_\beta \cdot A^{-1} \cdot E$$

$$B'_I = E \cdot P_\beta^{-1} \cdot C_\alpha \cdot E \cdot B_I,$$

where:
E—is the 8×8 matrix that switches bits endianness (in our circuits input and output bits are in Big Endian)
A—is the 8×8 matrix that performs the SBox's affine transformation
$C_\alpha$—is the 8×8 matrix that multiplies a field element by the selected constant $\alpha$
$P_\beta$—is the 8×8 matrix that raises an element of the Rijndael field to the power of $2^\beta$
$T_F/T_I$—are the original (without modifications) 18×8 matrixes for the top linear transformation of the Forward/Inverse SBoxes, respectively.
$B_F/B_I$ are the original (without modifications) 8×18 matrixes for the bottom linear transformation of the Forward/Inverse SBoxes, respectively.

There are 2040 choices for $(\alpha, \beta)$ pair and each choice gives new linear matrixes. It is easy to test all of them and find the best combination that gives the smallest SBox circuit. We have applied this idea to both the forward as well as the inverse SBox, for both architectures A and D.

5.4.1 Alpha-Beta Approach for the Combined SBox

For the combined SBoxes we can apply the alpha-beta approach to the forward and the inverse parts independently. This means that we have $2040^2=4{,}161{,}600$ variants of linear matrices to test. We have focused on the architecture D, since there is no bottom matrix and thus we can do a more extensive search. We searched through all those 4 million variants and applied the heuristic algorithm from the Section 4.1 as a quick analysis method to select a set of around 4000 promising cases. We then applied the algorithm given in Section 4.2 to find a solution with floating multiplexers. In our case we have n=8 bit input and thus each point is encoded with 18 bits, and the complexity of calculating the distance $\delta(S,t_i)$ is quadratic over $N=2^{18}$ points. In the search we used the search tree with the maximum depth TD≤20 and the truncation level of 400 leaves.

5.5 Q-Zero Points for the Top Matrices in the Combined SBox

The combined SBox needs to have a number of multiplexes for both the top and bottom linear transformations. The top linear matrixes of the forward and inverse SBoxes produce 18-bit signals $Q_F$ and $Q_I$, respectively. This means that normally we should apply 18 multiplexers to switch between the Q-signals, based on the selected direction signal ZF. However, there is a set of Q-triples that are always zero, which are valid for both the forward and the inverse SBoxes:

Listing 1: Q-Zero points, valid for both the Forward and the Inverse SBoxes.

| | | | |
|---|---|---|---|
| 0 = Q0 + Q11 + Q12 | 0 = Q1 + Q3 + Q4 | 0 = Q4 + Q9 + Q10 | 0 = Q6 + Q7 + Q10 |
| 0 = Q0 + Q14 + Q15 | 0 = Q2 + Q8 + Q9 | 0 = Q5 + Q12 + Q13 | 0 = Q11 + Q16 + Q17 |
| 0 = Q1 + Q2 + Q7 | 0 = Q3 + Q6 + Q8 | 0 = Q5 + Q15 + Q17 | 0 = Q13 + Q14 + Q16 |

We can use that knowledge to compute only a subset of Q-signals, then multiplex them and compute the remaining Q-signals using the above zero-points.

For example, we can compute 10 bits: {Q1, Q6, Q8, Q9, Q10, Q12, Q14, Q15, Q16, Q17} for both forward and inverse SBoxes, then apply 10 multiplexers and after that derive the remaining 8 signals as: Q0=Q14+Q15, Q2=Q8+Q9, Q3=Q6+Q8, Q4=Q9+Q10, Q5=Q15+Q17, Q7=Q6+Q10, Q11=Q16+Q17, Q13=Q14+Q16.

Thus, we could save 8 multiplexers and, 2×8 rows of the combined top matrix can be removed. However, we should make sure that exemption of the above 8 bits outside the multiplexers would not increase the depth of the top linear transformation. Note that some of the signals, Q1 and Q12 in the example above, do not participate in computing the final 8 signals, hence those two signals are allowed to have +1 extra depth. I.e., before applying the circuit solver algorithm, we should carefully derive individual maximum delays for each output signal as constraint for a search algorithm.

We have tested 59535 variants of utilizing Q-Zero points, in addition to the above mentioned 2040 choices of $(\alpha,\beta)$. We applied this method only to the architecture A.

6 Results and Comparisons

In this section we present our best solutions for the AES SBoxes, both forward and combined. The stand-alone inverse SBox is perhaps not as widely used, and those results can be found in Appendix C. We compare our area and depth using the techniques described in Appendix A and where possible, we have recalculated the corresponding GE for other academic results for easier comparison. We present three different solutions for each SBox (forward, inverse, and combined): "fast", "optimal", and "bonus". The fast one is the solution with the lowest critical path, the optimal is a well-balanced trade-off between area and speed, and the bonus solution is given to establish a new record in terms of the smallest number of gates. Exact circuit expressions for all the derived solutions can be found in Appendix D, where we also indicate which algorithm was used in deriving the solution.

6.0.1 Synthesis Results

We have performed a synthesis of the results and compared with other recent academic work. The technology process is GlobalFoundries 22 nm CSC20L [Glo19], and we have synthesized using Design Compiler 2017 from Synopsys in topological mode with the compile_ultra command. We also turned on the flag compile_timing_high_effort to force the compiler to make as fast circuits as possible. In those graphs, the X axis is the clock period (in ps) and the Y axis is the resulting topology estimated area (in $\mu m^2$). We have not restricted the available gates in any way, so the to compiler is free to use non-standard gates e.g., a 3 input AND-OR gate. To get the graphs in the following subsections, we have started at a 1200 ps clock period (~833 MHz) and reduced the clock period by 20 ps until the timing constraints could not be met. We note that the area estimate by the compiler fluctuate heavily, and we believe that this is a result the many different strategies the compiler has to minimize the depth. One strategy might be successful for say a 700 ps clock period, but a different strategy (which results in a significantly larger area) could be successful for 720 ps. There is also an element of randomness involved in the strategies for the compiler.

TABLE 3

Forward SBox: Comparison of the results.

| Reference | Area Size/Gates | | Critical Path/Depth | |
|---|---|---|---|---|
| | Std. gates | Tech. GE | Std. gates | Tech. XORs |
| Forward SBoxes: Previous Results | | | | |
| Canright [Can05] | 80XO + 34ND + 6NR | | 19XO + 3ND + 1NR | |
| most famous design | 120 | 226.40 | 23 | 20.796 |
| Boyar et al [BP12] | 94XO + 34AD | | 13XO + 3AD | |
| our starting point | 128 | 264.24 | 16 | 14.932 |
| Boyar et al [Boy] | 81XO + 32AD | | 21XO + 6AD | |
| record smallest | 113 | 231.29 | 27 | 24.864 |
| Ueno et al [UHS+15] | 91XO + 38AD + 16OR (+4IV) | | 11XO + 3AD + 1OR | |
| record fastest | 145(+4) | 286.53 | 15 | 13.772 |
| Reyhani-Light [RMTA18a] | 69XO + 43ND + 7NR (+4IV) | | 16XO + 4ND (+1IV) | |
| at CHES 2018 | 119(+4) | 213.45 | 20(+1) | 18.031 |
| Reyhani-Fast [RMTA18a] | 79XO + 43ND + 7NR (+4IV) | | 11XO + 5ND (+1IV) | |
| at CHES 2018 | 129(+4) | 236.75 | 16(+1) | 13.449 |
| Forward SBoxes: Our Results | | | | |
| Forward (fast) | 81XO + 2XN + 5AD + 42ND + 6NR | | 8XO + 1XN + 1AD + 1ND + 1NR | |
| fast with depth 12 | 136 | 248.04 | 12 | 10.597 |
| Forward (optimal) | 65XO + 9XN + 1AD + 36ND + 6NR | | 11XO + 2ND + 1NR | |
| area/speed optimal | 117 | 215.75 | 14 | 12.378 |
| Forward (bonus) | 62XO + 7XN + 1AD + 32ND + 6NR | | 20XO + 1XN + 2ND + 1NR | |
| new record smallest | 108 | 200.10 | 24 | 22.371 |

6.1 Forward S Boxes

We have included a number of interesting previous result for comparison in Table 3. The most famous design by Canright is widely used and cited. Our optimal SBox is both faster and smaller. We also included the work done by Boyar et al as their design was the starting point for our research. The two results from CHES'18 by Reyhani et al are the most recent, and our "optimal" SBox has a similar area as their "lightweight" version in terms of GE, but around 30% faster. The optimal SBox is both smaller and faster than their "fast" circuit. Also, our "fast" version is faster by 25% then their "fast" version, while maintaining a decent area increase. The currently fastest SBox done by Ueno has 286GE and 13.772XORs depth, while our fast version is only 248GE and depth 10.597XORs, outperforming the known fastest circuit by around 23%.

We also included the current world smallest circuit (in terms of standard gates) done by Boyar in 2016, which has 113 gates (231.29GE) and depth 27 gates. Our "bonus" circuit is even smaller with only 108 gates and depth 24, reaching as low as 200.10GE. Synthesize results are shown in FIG. 6.

TABLE 4

Combined SBox: Comparison of the results.

| Reference | Area Size/Gates | | Critical Path/Depth | |
|---|---|---|---|---|
| | Std. gates | Tech. GE | Std. gates | Tech. XORs |
| Combined SBoxes: Previous Results | | | | |
| Canright [Can05] | 94XO + 34ND + 6NR + 16MX (+21V) | | 20XO + 3ND + 2OR + 5NR | |
| most famous design | 150(+2) | 297.64 | 30 | 25.644 |
| Reyhani et al | 81XO + 32ND + 4OR + 16NR + 16MI | | 17XO + 2ND + 3OR + 6NR | |
| [RMTA18b] | (+8IV) | | | |
| recent results | 149(+8) | 290.13 | 28 | 23.608 |

TABLE 4-continued

Combined SBox: Comparison of the results.

| Reference | Area Size/Gates | | Critical Path/Depth | |
|---|---|---|---|---|
| | Std. gates | Tech. GE | Std. gates | Tech. XORs |
| Combined SBoxes: Our Results | | | | |
| Combined (fast) | 81XO + 28XN + 1AD + 46ND + 7NR + 7MX + 12MI | | 8XO + 2XN + 2ND + 1NR + 1MI | |
| fast with depth 14 | 182 | 356.65 | 14 | 12.420 |
| Combined-S (fast) | 86XO + 22XN + 1AD + 46ND + 2OR + 6NR + 17MX + 6MI | | 10XO + 1XN + 2ND + 1NR | |
| best synthesis results | 186 | 363.26 | 14 | 12.371 |
| Combined (optimal) | 74XO + 22XN + 1AD + 36ND + 6NR + 9MX + 3MI | | 9XO + 3XN + 2ND + 1NR + 1MI | |
| area/speed optimal | 151 | 295.99 | 16 | 14.413 |
| Combined (bonus) | 74XO + 10XN + 1AD + 32ND + 6NR + 10MX | | 17XO + 3XN + 2ND + 1NR + 2MX | |
| new record smallest | 133 | 258.35 | 25 | 22.907 |

6.2 Combined SBoxes

Table 4 shows our results compared to the two previously known best results. Our optimal combined SBox has a similar size to that of [Can05] and [RMTA18b], but the speed is a lot faster due to a much lower depth of the circuit. The optimal circuit has depth 16 (in reality only 14.413XORs) and 151 gates (296GE), while Canright's combined SBox is of size 150(+2) gates (298GE) and the depth 30 (25.644XORs). The bonus solution in this paper has slightly smaller depth than the most recent result [RMTA18b] but is significantly smaller in size (133 vs 149(+8) standard gates). Finally, the proposed "fast" designs using Architecture D has the best currently known depth, and we include also the one that provided the best synthesis results shown in the comparison in FIG. 7.

CONCLUSIONS

In this Appendix B we have introduced a number of heuristic and exhaustive search methods for minimizing the circuit realization of the AES SBox. We have proposed a novel idea on how to include the multiplexers of the combined SBox in the minimization algorithms, and derived smaller and faster circuit realizations for the forward, inverse, and combined AES SBox. We also introduced a new architecture where we remove the bottom linear matrix, in order to derive as fast solutions as possible.

REFERENCES

[Art01] Artisan Components, Inc. TSMC 0.18 μm Process 1.8-Volt SAGE-XTM Standard Cell Library Databook, 2001. URL: www.utdallas.edu.

[BFP18] Joan Boyar, Magnus Find, and René Peralta. Small low-depth circuits for cryptographic applications. *Cryptography and Communications*, 11, March 2018.

[BHWZ94] Michael Bussieck, Hannes Hassler, Gerhard J. Woeginger, and Uwe T. Zimmermann. Fast algorithms for the maximum convolution problem. *Oper. Res. Lett.*, 15(3):133-141, April 1994. URL: citeseerx.ist.psu.edu.

[Boy] Joan Boyar. Circuit minimization work. URL: www.cs.yale.edu.

[BP10a] Joan Boyar and René Peralta. A New Combinational Logic Minimization Technique with Applications to Cryptology. In Paola Festa, editor, *Experimental Algorithms*, pages 178-189, Berlin, Heidelberg, 2010. Springer Berlin Heidelberg. URL: eprint.iacr.org.

[BP10b] Joan Boyar and René Peralta. A new combinational logic minimization technique with applications to cryptology. In of *Lecture Notes in Computer Science*, pages 178-189. Springer, 2010.

[BP12] Joan Boyar and René Peralta. A small depth-16 circuit for the AES S-Box. In Dimitris Gritzalis, Steven Furnell, and Marianthi Theoharidou, editors, *SEC*, volume 376 of *IFIP Advances in Information and Communication Technology*, pages 287-298. Springer, 2012. URL: link.springer.com. 1007/978-3-642-30436-1_24.

[Bus01] Business Machines Corporation. ASIC SA-27E Databook, Part I Base Library and I/Os. Data Book, 2001. URL: people.csail.mit.edu.

[Can05] D. Canright. A Very Compact S-Box for AES. In Josyula R. Rao and Berk Sunar, editors, *Cryptographic Hardware and Embedded Systems—CHES* 2005, pages 441-455, Berlin, Heidelberg, 2005. Springer Berlin Heidelberg. URL: www.iacr.org.

[FAR06] FARADAY Technology Co. FSDOA_A 90 nm Logic SP-RVT (Low-K) Process, 2006. URL: www.cl.cam.ac.uk.

[Glo19] GlobalFoundries. 22 nm FDX process, 2019. URL: www.globalfoundries.com.

[IT88] Toshiya Itoh and Shigeo Tsujii. A fast algorithm for computing multiplicative inverses in GF(2M) using normal bases. *Inf. Comput.*, 78(3):171-177, September 1988. URL: dx.doi.org.

[JKL10] Yong-Sung Jeon, Young-Jin Kim, and Dong-Ho Lee. A compact memory-free architecture for the AES algorithm using resource sharing methods. *Journal of Circuits, Systems, and Computers*, 19:1109-1130, 2010.

[MNG00] Microelectronics Group, Carl F. Nielsen, and Samuel R. Girgis. WPI 0.5 mm CMOS Standard Cell Library Databook, 2000. URL: lsm.epfl.ch.

[NNT+10] Yasuyuki Nogami, Kenta Nekado, Tetsumi Toyota, Naoto Hongo, and Yoshitaka Morikawa. Mixed bases for efficient inversion in $F((2^2)^2)^2$ and conversion matrices of SubBytes of AES. pages 234-247, August 2010.

[oST01] National Institute of Standards and Technology. Advanced encryption standard. *NIST FIPS PUB* 197, 2001.

[Paa97] Christof Paar. Optimized arithmetic for Reed-Solomon encoders. April 1997.
[Pet] Graham Petley. Internet resource: VLSI and ASIC Technology Standard Cell Library Design. URL: www.vlsitechnology.org.
[Rij00] VincentRijmen. Efficient implementation of the Rijndael S-Box. 2000. URL: www.researchgate.net.
[RMTA18a] Arash Reyhani-Masoleh, Mostafa Taha, and Doaa Ashmawy. Smashing the implementation records of AES S-Box. *IACR Transactions on Cryptographic Hardware and Embedded Systems*, 2018(2):298-336, May 2018.
[RMTA18b] Arash Reyhani-Masoleh, Mostafa M. I. Taha, and Doaa Ashmawy. New area record for the AES combined S-Box/inverse S-Box. 2018 *IEEE 25th Symposium on Computer Arithmetic (ARITH)*, pages 145-152, 2018.
[Sam00] Samsung Electronics Co., Ltd. STD90/MDL90 0.35 µm 3.3V CMOS StandardCell Library for Pure Logic/MDL ProductsDatabook, 2000. URL: www.digchip.com
[SMTM01] Akashi Satoh, Sumio Morioka, Kohji Takano, and Seiji Munetoh.
A compact Rijndael hardware architecture with S-Box optimization. In Colin Boyd, editor, ASIA CRYPT, volume 2248 of *Lecture Notes in Computer Science*, pages 239-254. Springer, 2001. URL: antoanthongtin.vn.
[UHS+15] Rei Ueno, Naofumi Homma, Yukihiro Sugawara, Yasuyuki Nogami, and Takafumi Aoki. Highly efficient $GF(2^8)$ inversion circuit based on redundant GF arithmetic and its application to AES design. *IACR Cryptology ePrint Archive*, 2015:763, 2015. URL: eprint.iacr.org.

APPENDIXES TO PART B OF DISCLOSURE

A Area and Speed Measurement Methods

Firstly, we introduce some notations. Gate names are written in capital letters GATE (examples: AND, OR). The notation mGATEn means m gates of type GATE, each of which has n inputs (example: XOR4, 8XOR4, NAND3, 2AND2). When the number of inputs n is missing then the assumption is that the gate has minimum inputs, usually only 2 (3 for MUX).

Cells that are constructed as gates combination can be described as GATES1-GATE2, meaning that we first perform one or more gates on the first level GATES1, then the result goes to the gate on the second level 2. Example: NAND2-NOR2, means that the cell has 3 inputs (a, b, c) and the corresponding Boolean function is NOR2(a, NAND2(b, c)).

We present two different methods of comparing circuits; the standard method and the technology method.

A.1 Standard Method

Cells. The basic elements that are considered in the standard method are: {XOR, XNOR, AND, NAND, OR, NOR, MUX, NMUX, NOT}.

Negotiation of NOT gates. In some places of the circuit there is a need to use the inverted version of a signal. This can be done in several ways, without the explicit use of a NOT gate. Here we list a few of them.

Method 1. One way to implement a NOT gate is to change the previous gate that generates that signal to instead produce an inverted signal. For example, switch XOR into XNOR, AND into NAND, etc.

Method 2. In several technologies some gates can produce both the straight signal and the inverted version. For example, XOR gates in many implementations produce both signals simultaneously, and thus the inverted value is readily available.

Method 3. We can change the gates following the inverted signal such that the resulting scheme would produce the correct result given the inverted input, using e.g. De Morgans laws.

Summarizing the above, we believe that NOT gates may be ignored while evaluating a circuit with the standard method, since it can hardly be counted as a full gate. However, for completeness, we will printout the number of NOT gates in the resulting tables.

Area. For area comparisons the number of basic elements is counted without any size distinction between them. The NOT-gates are ignored.

Depth. The depth is counted in terms of the number of basic elements on the circuit path. The overall depth of a circuit is therefore the delay of the critical path. The NOT-gates are ignored.

A.2 Technology Method

Cells. Some papers complement the standard cells with a few extra combinatorial cells, often available in various technologies. For example, the gates NAND2-NAND2, NOR2-NOR2, 2AND2-NOR2, XOR4 could be highly useful to improve and speedup our SBox circuits in this paper. However, for comparison purposes with previous academic results, we will stay with the set of standard cells in order to make a more fair comparison. In this method we do count NOT gates in both the delay and the area.

Area. There exist many ASIC technologies (90 nm, 45 nm, 14 nm, etc) from different vendors (Intel, Samsung, GlobalFoundries, etc), with different specifics. In order to develop an ASIC one needs to get a "standard cells library" of a certain technology, and that library usually includes much more versatile cells than the basic elements listed above, so that the designer has a wider choice of building blocks.

However, even if we take a standard cell, for example XOR, then for different technologies that cell has different areas and delays. This makes it harder to compare two circuits of the same logic developed by two academic groups, when they chose to apply different technologies.

For a fair comparison of circuit area of various solutions in academia we usually utilize the term of gates equivalence (GE), where 1GE is the size of the smallest NAND gate. The size of a circuit in GE terms is then computed as Area (Circuit)/Area(NAND)→t GE. Knowing the estimated GE values for each standard or technology cell makes it possible to compute an estimated area size of a circuit in terms of GE. Although various technologies have slightly different GEs for standard cells, those GE numbers are still pretty close to each other.

We have studied several technologies, where data books are available, and came to the decision to utilize GE values given in the data book by the Samsung's STD90/MDL90 0.35 µm 3.3V CMOS technology [Sam00]. The cells to be used are without the speed x-factor.

We have also checked other data books of other technologies (e.g., IBM's 0.18 µm [Bus01], WPI 0.5 mm [MNG00], FARADAY's 90 µm [FAR06], TSMC 0.18 µm [Art01], Web resource [Pet], etc., and verified that GE numbers given in [Sam00] are quite fair and close to the reality. This makes it possible to have an approximated comparison of the effectiveness of different circuits, even though they may be developed for different technologies.

Depth. Different cells, like XOR and NAND, not only differ in terms of GEs but also differ in terms of the maximum delay of the gates.

Normally data books include the delays (e.g., in ns.) for each gate, and for each input-output combinations.

We propose to normalize the delays of all used gates by the delay of the XOR gate. I.e., we adopt the worst-case delay of the XOR gate as 1 unit in our measurements of the critical path. Then we look at each standard cell and pick the maximum of the switching characteristics for all in-out paths of the cell and divide it by the maximum delay of the XOR gate, so that we get the normalized delay-units for each of the gates utilized.

For multiplexers (MUX and NMUX), we ignore propagation delays for the select bit since in most cases, the select bit is the input to the circuit. For example, in the combined SBox the select bit says if we compute the forward or the inverse SBox, and that selection is ready as an input signal and not switching over the circuit signals propagation, so it is a stable signal.

The proposed above method is similar to the idea of GEs, but is adopted for computing the depth of a circuit, normalized in XOR delays. The reason to choose XOR as the base element for delay counting is that the circuits are often have a lot of XOR gates, and thus, it now becomes possible to compare the depths between the standard and the technology methods. For example, in our SBox the critical path contains 14 gates, most of which are XORs, but in reality the depth would be equivalent to only 12.38 XOR-delays, due to the critical path contains also faster gates.

A.3 Summary on the Technology Cells

The area and delays for the Samsung's STD90/MDL90 0.35 μm gates are summarized in Table 5.

Algorithm 2 The shortest linear circuit with input delays.

If bit i in iMask is set, then $x_i$ should be included.
Maximum number of variables is 64.
The maximum resulting depth cannot be larger than MAXDELAY.
Returns:
The total delay for the circuit, including the input delay.
1:     function CircuitDepth(int iDelay[64], uint64 iMask)
2:         int depth[MAXDELAY ] = {0};
3:         int c = 0;
4:         while iMask != 0 do
5:             if (iMask & 1) then
6:                 depth[iDelay[c]]++;
7:             iMask = iMask >> 1;
8:             c++;
9:         int i = 0;
10:        while i < MAXDELAY do
11:            if (depth[i] ≥ 2) then
12:                 depth[i + 1] += depth[i] >> 1;
13:            if (depth[i] & 1 == 1) then
14:                 i++;
15:                 continue;
16:            for (i++; i < MAXDELAY && !depth[i]; i++) do
17:                 ;
18:            if i == maxD then
19:                 break;
20:        depth[i]- -;
21:        depth[i + 1]++;
22:        mDep = MAXDELAY - 1;
23:        while mDep != 0 && depth[mDep] == 0 do
24:            mDep- -;
        return mDep;

B.2 on the Computation of $\delta(S, y_i)$ in 3.3.1

In each round the algorithm tests all pairs of the known points from S, and for each pair computes the distance.

TABLE 5

Technology gates' area and delays based on [Sam00].

| Std. cell | XOR | XNOR | AND | NAND | OR | NOR | MUX | NMUX | NOT | D-Flop/Q |
|---|---|---|---|---|---|---|---|---|---|---|
| Ref. in [Sam00] | [XO2] | [XN2] | [AD2] | [ND2] | [OR2] | [NR2] | [MX2] | [MX2I] | [IV] | [FD1Q] |
| Our short ref. | XO | XN | AD | ND | OR | NR | MX | MI | IV | FD |
| Area (GE) | 2.33 | 2.33 | 1.33 | 1.00 | 1.33 | 1.00 | 2.33 | 2.67 | 0.67 | 4.33 |
| Delay (XORs) | 1.000 | 0.993 | 0.644 | 0.418 | 0.840 | 0.542 | 0.775 | 1.056 | 0.359 | 1.242 |

B Algorithmic Details and Improvements

In this section we present some more details to various algorithms previously described in the paper.

B.1 The Shortest Circuit for a Single Output Bit.

This problem is a recurring objective in many of the algorithms. The problem statement is the following. Given k input signals $x_0, \ldots, x_{k-1}$ with corresponding input delays $d_0, \ldots, d_{k-1}$, compute $y = x_0 \oplus x_1 \oplus \ldots \oplus x_{k-1}$ with the minimum possible delay.

A solution to this problem without considering input delays was given in [RMTA18a]. In Algorithm 2 we extend the result to include input delays as well as removed the sorting step.

Algorithm 2 The shortest linear circuit with input delays.

Inputs:
iDelay : An array with input delays $d_i$.
iMask : A mask indicating which input $x_i$ should be included.

Straight-forward idea is to compute δ exhaustively, but when the input size n is not too big, there is a better approach.

Let V be a vector of $2^n$ entries, each entry V[t] is the minimum distance from the current S to t. Then, the single round of the algorithm is simplified a lot: the shortest distance is then:

$$\delta(V, y_i, c) = \min\{V[y_i], V[y_i \oplus c] + 1\},$$

where c is the candidate for adding to S (a XOR of other two known points from S), and $y_i$ is the target point. Assume that we now decided to add c to S, then the vector V is simply updated as $$V'[t] = \delta(V, t, c), \text{ for all } t = 0, \ldots, 2^n - 1.$$

The time complexity of updating V is $O(2^n)$, but it can, in certain cases, be much faster than computing δ exhaustively for each c and $y_i$ combination in a round, especially if vectorized CPU instructions such as AVX2 are utilized.

B.3 on the Computation of $\delta(S, t_i)$ in Section 4.2.5

In this section we give a more detailed presentation on how the computation of $\delta(S, t_i)$ can be done. A slightly re-organized set of algorithms for computing $\delta(S, t_i)$ is given by Algorithms 3, 4, and 5.

Algorithm 3 Computation of all distances

```
1:  function Distances2(S, T, maxδ) → Δ = {δ_i}, i = 0, . . . ,m − 1
2:    Init δ_i = ∞ for i = 0, . . . , m − 1
3:    Init ∀p : V_0[p] = p.d if p ∈ S, otherwise ∞
4:    Init k = 0
5:    while true do
6:      while ∃i : δ_i = ∞ and V_k[t_i] ≤ t_i.d do δ_i = k
7:      if ∀i : δ_i < ∞ then return OK
8:      if k ≥ maxδ then return FAIL
9:      k ← k + 1
10:     Init ∀p : V_k[p] = ∞
11:     for l ← ⌊k/2⌋ to k − 1 do
12:       ConvolutionXOR(V_k,V_{k-l-1},V_l)
13:       ConvolutionMUX(V_k,V_{k-l-1},V_l)
14:       ConvolutionMUX(V_k,V_l,V_{k-l-1})
```

Algorithm 4 Convolution of XOR gates

```
1:      function ConvolutionXOR(V,A,B)
2:        for a = 0 . . . 2^{2n+2} − 1 do
3:          for b = 0 . . . 2^{2n+2} − 1 do
4:            d = max{A[a],B[b]} + 1
5:            p = a ⊕ b
6:            if V[p] > d then V[p] = d
7:            p = a ⊕ b ⊕ (1;0..0;1;0..0)
8:            if V[p] > d then V[p] = d
```

Algorithm 5 Convolution of MUX gates

```
1:  function ConvolutionMUX(V,A,B)
2:    Set ∀i = 0..2^{n+1} − 1 : F[i] = I[i] = ∞
3:    for a = 0 . . . 2^{2n+2} − 1 do
4:      Set f = a ÷ 2^{n+1}         ▷ high half of a related to F part
5:      Set i = a mod 2^{n+1}       ▷ low half of a related to I part
6:      if F[f] > A[a] then thenF[f] = A[a]
7:      if I[i] > B[a] then thenI[i] = B[a]
8:    for f = 0 . . . 2^{n+1} − 1 do
9:      for i = 0 . . . 2^{n+1} − 1 do
10:       d = max{F[f],I[i]} + 1
11:       p = (f · 2^{n+1} + i)
12:       if V[p] > d then thenV[p] = d      ▷ MUX(ZF; f; i) gate
13:       p = p ⊕ (1;0..0;1;0..0)
14:       if V[p] > d then thenV[p] = d      ▷ NMUX(ZF; f; i) gate
```

There are two convolution algorithms, for XOR gates and for MUX gates, and they can be performed independently. The MUX-convolution can be done in linear time O(N). We first collect the smallest distances for all possible F-values and I-values (each of which has $\sqrt{N}$ possible indexes), then the gate MUX can be applied to any of the combinations, so the convolution is $O(\sqrt{N}^2=N)$. The XOR-convolution is more complicated, it has quadratic complexity $O(N^2)$ in general case.

Algorithmic improvements. Assume for some S we have already computed all distances $\delta_i=\delta(S,t_i)$. For each candidate c from C, we add it to S so that $S'=S \cup c$, then we need to compute all distances $\delta'_i=\delta(S', t_i)$ in order to compute the metrics and decide on which c is good. Note that adding a single candidate c implies $\delta'_i \leq \delta_i$ for every target $t_i$. Therefore, we should modify the algorithm Distances(S', T, maxδ) such that we set maxδ=max{$\delta_i$}−1, and check in the end that if $\delta'_i==\infty$ then $\delta'_i$=max δ. This simple trick helps to avoid the computation of the last vector $V_k$ and effectively speed up the computations by up to ×20 times.

Generation of the candidates C involves testing if a candidate is already in C or in S because those need to be ignored. To speed up this part we can use a temporary vector Z[N] of length N, where all cells are initialized to ∞, and then for each point s from S we set Z[s.p]=s.d. Then, when a new candidate c is generated we simply update the table Z[c.p]=min{c.d,Z[c.p]}. In the end we remove S points from Z, and generate C from Z as follows: for all i=0 . . . N−1, if Z[i]<∞ then add a candidate c={.p=i,.d=Z[i]} to C. This way we construct C with unique candidates and also having the smallest depths.

Architectural improvements. MUX(a, b) and MUX(b, a) can be combined in a single MUX-convolution function. In max{$d_1,d_2$}+1, move the +1 operation outside the convolution functions, and do it after the convolutions, instead. p⊕{.p=[1|0|1|0],..d=0} is done in order to include gates with negated output. Those can be moved outside the convolution functions as well and be performed in the main function Distances( ) in linear time. This helps to reduce the number of operations in the critical loop of the function convolutionXOR( ), basically this doubles the speed. When A=B, then in convolutionXOR( ) we only need to run b starting from a. When B is not equal to $V_0$, then the convolutionXOR can be done only on the half values of b, since we know that all vectors $V_k$ for k>0 are symmetric in regards to NOT-gates. When A[a]=∞ in convolutionXOR( ) then we do not need to enter the inner loop for b. The same check for B[b]≠∞ is not justified since it adds an unnecessary branching in the critical loop.

Attaching AVX. It is quite clear that convolutionMUX( ) can be easily refactored to use AVX vectorized instructions and utilize its 128-bit registers and intrinsics. However, it is a bit tricky to attach AVX to convolutionXOR( ) function. First of all, assume each cell A[a],B[b] are all of char type (byte), then we must start b aligned to 16 bytes, since our registers in AVX are 128-bit long. Secondly, the result of p=a⊕b for b=0 . . . 15 mod 16 will end up in a permuted location p, but that permutation would only happen in the low 4 bits. With the help of _mm_shuffle_epi8( ) we can make a permutation of the destination 16-byte block, where the permutation vector only depends on the value of a mod 16 (recall that b=0 mod 16). Those permutation vectors can be hard coded in a constant table. Other operations within that convolutionXOR are trivial to implement. One could also attach AVX2 with its 256-bit long registers, thus speeding up the algorithms even more.

B.3.1 More on ConvolutionXOR( )

One can notice that the convolutionXOR may be done with the help of the following convolution:

$$V[p] = \Sigma_{\alpha=0}^{N} A[a] \cdot B[p \oplus a],$$

where the operation $x \cdot y \mapsto \max\{a,b\}$, and $x+y \mapsto \min\{a,b\}$. Thus, we have a convolution to be done in the (min, max)-algebra. One could think of applying Hadamard transform in O(N logN) but the problem is that that algebra does not have an inverse element.

In [BHWZ94] there is an algorithm "MinConv" that can be converted into our convolution problem, and it is claimed to work "around and on average" O(N logN) time. The idea behind MinConv is to sort A and B vectors, then we get the smallest delays in the beginning of the vectors A and B. Thus, we can enumerate the max{A[a],B[b]} delays starting from the smallest. Also, we should take care of the indexes while sorting A and B, so that we can find the destination point p=a⊕b. Every point p hit the first time will receive the smallest possible delay, and thus can be skipped later on. The idea behind the algorithm is that the predicted number of hits to cover all N points of the result will be around N logN.

We have programmed that but it did not demonstrate a speedup on our input size (n=8, $N=2^{18}$) and actually performed slower than our AVX-improved quadratic algorithm, at least on our input size. Also, the above algorithm cannot be parallelized.

B.3.2 ConvolutionXOR( ) in $O(maxDelay^2 \cdot N \log N)$ Time

Usually the delay values stored in V vectors are small. We can rely on that fact in order to develop an algorithm that may be faster than $O(N^2)$.

The idea is simple. Construct two vectors $A_x[\ ]$ and $B_y[\ ]$ such that $A_x[p]=1$ if $A[p]=x$, otherwise $A_x[p]=0$, do the same for $B_y[\ ]$. Then compute the classical convolution of two Boolean vectors $A_x$ and $B_y$ through the classical Walsh-Hadamard transform in $O(N \log N)$. Let $C_d[\ ]$ be the result of that convolution with d=max{x,y}+1. Then we know that if $C_d[p] \neq 0$ then the point p may have the depth d. So we just make a linear loop over $C_d[p]$ and check if $C_d[p] \neq 0$ and V[p]>d then V[p]=d. We should repeat the above for all combinations of x,y=0 . . . maxD, each step of which has the complexity $O(N \log N)$. The value of maxDelay can also be determined in the beginning of the algorithm linearly. Also note that maxDelay may be different for A and B, so that x and y may have different ranges.

B.3.3 ConvolutionXOR( ) in $O(|S|^2)$ Time

When constructing the vector $V_1$ from the initial $V_0$ is it worth to do the classical way and run through pairs of points of S, instead of doing the full scale convolution over N points. However, the number of newly generated points grows very rapidly and this method can only be applied to the very first V s (in our experiments we have seen some "win" only in $V_1$, then for further $V_k$,k>1 we have used our optimized convolution algorithms).

C Inverse SBoxes

The stand-alone inverse SBox is as far as we know, not used very much. But we provide the comparison with previously known solutions in Table 6.

TABLE 6

Inverse SBox: Comparison of the results.

| Reference | Area Size/Gates | | Critical Path/Depth | |
|---|---|---|---|---|
| | Std. gates | Tech. GE | Std. gates | Tech. XORs |
| Inverse SBoxes: Previous Results | | | | |
| Canright [Can05]'05 most famous design | 81XO + 34ND + 6NR | | | |
| | 121 | 228.73 | 25? | ? |
| Boyar et al. [BP12]'12 our starting point | 93XO + 34AD | | 13XO + 3AD | |
| | 127 | 261.91 | 16 | 14.932 |
| Inverse SBoxes: Our Results | | | | |
| Inverse (fast) fast with depth 12 | 72XO + 11XN + 1AD + 46ND + 6NR | | 9XO + 2ND + 1NR | |
| | 136 | 246.72 | 12 | 10.378 |
| Inverse (optimal) area/speed optimal | 658XO + 5XN + 1AD + 36ND + 6NR (+1IV) | | 11XO + 2ND + 1NR | |
| | 116(+1) | 214.09 | 14 | 12.378 |
| Inverse (bonus) new record smallest | 60XO + 8XN + 1AD + 32ND + 6NR (+1IV) | | 21XO + 1XN + 2ND + 1NR | |
| | 107(+1) | 198.44 | 25 | 23.371 |

D Circuits

D.1 Preliminaries

In the below listings we present 6 circuits for the forward, inverse, and combined SBoxes in two architectures A(small) and D (fast). The used symbols are:

comment—a comment line

@filename—means that we should include the code from another file 'filename', the listing of which is then given in this section as well.

a^b—is the usual XOR gate, other gates are explicitly denoted and taken from the set of {XNOR, AND, NAND, OR, NOR, MUX, NMUX, NOT}

(a op b)—where the order of execution (the order of gates connections) is important we specify it by brackets.

The input to all SBoxes are the 8 signals {U0 ... U7} and the output are the 8 signals {R0 ... R7}. The input and output bits are represented in Big Endian bit order. For combined SBoxes the input has additional signals ZF and ZI where ZF=1 if we perform the forward SBox and ZF=0 if inverse, otherwise; the signal ZI is the compliment of ZF. We have tested all the proposed circuits and verified their correctness.

The circuits are divided into sub-programs, according to FIG. 5. In Section D.2 we describe the common shared components, and then for each solution we give components (common or specific) for the circuits.

D.2 Shared Components

Listing 2: MLTLX/INV/S0/S1/8XOR4: Shared components.

```
# File: mulx.a                              # File: s0.a
T20 = NAND(Q6, Q12)                         Y02 = Y2 ^ Y0
T21 = NAND(Q3, Q14)                         Y13 = Y3 ^ Y1
T22 = NAND(Q1, Q16)                         Y23 = Y3 ^ Y2
                                            Y01 = Y1 ^ Y0
T10 = (NOR(Q3, Q14) ^ NAND(Q0, Q7))         Y00 = Y02 ^ Y13
T11 = (NOR(Q4, Q13) ^ NAND(Q10, Q11))
T12 = (NOR(Q2, Q17) ^ NAND(Q5, Q9))         # File: s1.a
T13 = (NOR(Q8, Q15) ^ NAND(Q2, Q17))        Y01 = NAND(T6, NAND(X2, T3))
                                            Y23 = NAND(T4, NAND(X0, T5))
X0 = T10 ^ (T20 ^ T22)                      Y02 = Y2 ^ Y0
X1 = T11 ^ (T21 ^ T20)                      Y13 = Y3 ^ Y1
X2 = T12 ^ (T21 ^ T22)                      Y00 = Y01 ^ Y23
X3 = T13 ^ (T21 ^ NAND(Q4, Q13))
# File: inv.a                               # File: 8xor4.d
T0 = XOR(X2, X3)                            R0 = (K0 ^ K1) ^ (K2 ^ K3)
T1 = AND(X0, X2)                            R1 = (K4 ^ K5) ^ (K6 ^ K7)
T2 = XOR(X0, X1)                            R2 = (K8 ^ K9) ^ (K10 ^ K11)
T3 = NAND(X0, X3)                           R3 = (K12 ^ K13) ^ (K14 ^ K15)
T4 = NAND(X3, T2)                           R4 = (K16 ^ K17) ^ (K18 ^ K19)
T5 = NAND(X1, X2)                           R5 = (K20 ^ K21) ^ (K22 ^ K23)
T6 = NAND(X1, T0)                           R6 = (K24 ^ K25) ^ (K26 ^ K27)
T7 = NAND(T5, T0)                           R7 = (K28 ^ K29) ^ (K30 ^ K31)
T8 = NAND(T2, T3)
Y0 = XNOR(T1, T7)
Y1 = XOR(T6, NOR(T1, X3))
Y2 = XNOR(T1, T8)
Y3 = XOR(T4, NOR(T1, X1))
```

Listing 3: MULN/MULL: Shared components.

```
# File: muln.a          K20 = NAND(Y0, L20)     K15 = NAND(Y3, L15)
N0 = NAND(Y01, Q11)                             K19 = NAND(Y3, L19)
N1 = NAND(Y0 , Q12)    K1 = NAND(Y1, L1)       K23 = NAND(Y3, L23)
N2 = NAND(Y1 , Q0)     K5 = NAND(Y1, L5)       K27 = NAND(Y3, L27)
N3 = NAND(Y23, Q17)    K9 = NAND(Y1, L9)       K31 = NAND(Y3, L31)
N4 = NAND(Y2, Q5)      K13 = NAND(Y1, L13)
N5 = NAND(Y3 , Q15)    K17 = NAND(Y1, L17)     # File: mull.f
N6 = NAND(Y13, Q14)    K21 = NAND(Y1, L21)     K4 = AND(Y0, L4)
N7 = NAND(Y00, Q16)    K25 = NAND(Y1, L25)     K8 = AND(Y0, L8)
N8 = NAND(Y02, Q13)    K29 = NAND(Y1, L29)     K24 = AND(Y0, L24)
N9 = NAND(Y01, Q7)                             K28 = AND(Y0, L28)
N10 = NAND(Y0 , Q10)   K2 = NAND(Y2, L2)
N11 = NAND(Y1 , Q6)    K6 = NAND(Y2, L6)       # File: mull.i
N12 = NAND(Y23, Q2)    K10 = NAND(Y2, L10)     K4 = NAND(Y0, L4)
N13 = NAND(Y2, Q9)     K14 = NAND(Y2, L14)     K8 = NAND(Y0, L8)
N14 = NAND(Y3, Q8)     K18 = NAND(Y2, L18)     K24 = NAND(Y0, L24)
N15 = NAND(Y13, Q3)    K22 = NAND(Y2, L22)     K28 = NAND(Y0, L28)
N16 = NAND(Y00, Q1)    K26 = NAND(Y2, L26)
N17 = NAND(Y02, Q4)    K30 = NAND(Y2, L30)     # File: mull.c
                                               K4 = NAND(Y0, L4) ^ ZF
# File: mull.d          K3 = NAND(Y3, L3)      K8 = NAND(Y0, L8) ^ ZF
K0 = NAND(Y0, L0)      K7 = NAND(Y3, L7)       K24 = NAND(Y0, L24) ^ ZF
K12 = NAND(Y0, L12)    K11 = NAND(Y3, L11)     K28 = NAND(Y0, L28) ^ ZF
K16 = NAND(Y0, L16)
```

D.3 Forward SBox (Fast)

Listing 4: Forward SBox with the smallest delay (fast)

```
# Forward (fast)         Q4 = Q16 ^ U4        L13 = U3 ^ Q8
@ftop.d                  Q5 = Z18 ^ Z160      L17 = U4 ^ L10
@mulx.a                  Z10 = U1 ^ U3        L29 = Z96 ^ L10
@inv.a                   Q6 = Z10 ^ Q2        L14 = Q11 ^ L10
@mull.f                  Q7 = U0 ^ U7         L26 = Q11 ^ Q5
@mull.d                  Z36 = U2 ^ U5        L30 = Q11 ^ U6
@8xor4.d                 Q8 = Z36 ^ Q5        L7 = Q12 ^ Q1
                         L19 = U2 ^ Z96       L11 = Q12 ^ L15
# File: ftop.d           Q9 = Z18 ^ L19       L27 = L30 ^ L10
# Exhaustive             Q10 = Z10 ^ Q1       Q17 = U0
→ search                 Q12 = U3 ^ L28       L0 = Q10
Z18 = U1 ^ U4            Q13 = U3 ^ Q2        L4 = U6
L28 = Z18 ^ U6           L10 = Z36 ^ Q7       L20 = Q0
Q0 = U2 ^ L28            Q14 = U6 ^ L10       L24 = Q16
Z96 = U5 ^ U6            Q15 = U0 ^ Q5        L1 = Q6
Q1 = U0 ^ Z96            L8 = U3 ^ Q5         L9 = U5
Z160 = U5 ^ U7           L12 = Q16 ^ Q2       L21 = Q11
Q2 = U6 ^ Z160           L16 = U2 ^ Q4        L25 = Q13
Q11 = U2 ^ U3            L15 = U1 ^ Z96       L2 = Q9
L6 = U4 ^ Z96            L31 = Q16 ^ L15      L18 = U1
Q3 = Q11 ^ L6            L5 = Q12 ^ L31       L22 = Q15
Q16 = U0 ^ Q11                                L3 = Q8
                                              L23 = U0
```

D.4 Forward SBox (Optimal)

Listing 5: Forward SBox circuit with area/depth trade-off (optimal)

```
# Forward                Z66 = U1 ^ U6        H9 = N3 ^ H7
→ (optimal)              Z114 = Q11 ^ Z66     H10 = N15 ^ N17
@ftop.a                  Q6 = U7 ^ Z114       H11 = N9 ^ N11
@mulx.a                  Q8 = Q1 ^ Z114       H12 = N12 ^ N14
@inv.a                   Q9 = Q7 ^ Z114       H13 = N1 ^ N2
@s1.a                    Q10 = U2 ^ Q13       H14 = N5 ^ N16
@muln.a                  Q16 = Z9 ^ Z66       H15 = N7 ^ H11
@fbot.a                  Q14 = Q16 ^ Q13      H16 = H10 ^ H11
                         Q15 = U0 ^ U2        H17 = N16 ^ H8
# File: ftop.a           Q17 = Z9 ^ Z114      H18 = H6 ^ H8
# Exhaustive             Q4 = U7              H19 = H10 ^ H12
→ search                                      H20 = N2 ^ H3
Z6 = U1 ^ U2                                  H21 = H6 ^ H14
Q12 = Z6 ^ U3            # File: fbot.a       H22 = N8 ^ H12
Q11 = U4 ^ U5            # Probabilistic      H23 = H13 ^ H15
Q0 = Q12 ^ Q11           → heuristic
Z9 = U0 ^ U3             H0 = N3 ^ N8
Z80 = U4 ^ U6            H1 = N5 ^ N6         R0 = XNOR(H16, H2)
Q1 = Z9 ^ Z80            H2 = XNOR(H0, H1)    R1 = H2
Q7 = Z6 ^ U7             H3 = N1 ^ N4         R2 = XNOR(H20, H21)
Q2 = Q1 ^ Q7             H4 = N9 ^ N10        R3 = XNOR(H17, H2)
Q3 = Q1 ^ U7             H5 = N13 ^ N14       R4 = XNOR(H18, H2)
Q13 = U5 ^ Z80           H6 = N15 ^ H4        R5 = H22 ^ H23
Q5 = Q12 ^ Q13           H7 = N0 ^ H3         R6 = XNOR(H19, H9)
                         H8 = N17 ^ H5        R7 = XNOR(H9, H18)
```

D.5 Forward SBox (Bonus)

We include these bonus circuits just to update the world record for the smallest SBox.
The new record is 108 gates with depth 24.

Listing 6: Forward SBox circuit with the smallest number of gates (bonus)

```
# Forward (bonus)        # File: fbot.b       H11 = H9 ^ H10
@ftop.b                  H0 = N1 ^ N5         H12 = N7 ^ H11
@mulx.a                  H1 = N4 ^ H0         Q0 = Z0 ^ Q16
@inv.a                   R2 = XNOR(N2, H1)    Z1 = U1 ^ U6
Q1 = Q7 ^ Q2             H2 = N9 ^ N15        Q7 = Z0 ^ Z1
Q3 = U0 ^ Q7             H3 = N11 ^ N17       Q2 = U2 ^ Q0
Q4 = U0 ^ Q2             R6 = XNOR(H2, H3)    H13 = H4 ^ H12
Q5 = U1 ^ Q4             H4 = N11 ^ N14       R4 = N1 ^ H13
Q6 = U2 ^ U3             H14 = XNOR(N0, R7)
Q10 = Q6 ^ Q7            # File: ftop.b       H15 = H9 ^ H14
```

Listing 6: Forward SBox circuit with the smallest number of gates (bonus)

```
Q8 = U0 ^ Q10            Z0 = U3 ^ U4         H16 = H7 ^ H15
Q9 = Q8 ^ Q2             Q17 = U1 ^ U7        R1 = XNOR(N6, H16)
Q12 = Z0 ^ Q17           Q16 = U5 ^ Q17       H17 = N4 ^ H14
Q15 = U7 ^ Q4            H5 = N9 ^ N12        H18 = N3 ^ H17
Q13 = Z0 ^ Q15           R5 = H4 ^ H5         R0 = H13 ^ H18
                         H6 = N16 ^ H2
@s0.a                    H7 = R2 ^ R6
@muln.a                  H8 = N10 ^ H7
@fbot.b                  R7 = XNOR(H6, H8)
                         H9 = N8 ^ H1
Q14 = Q0 ^ Q15           H10 = N13 ^ H8
Q11 = U5                 R3 = H5 ^ H10
```

D.6 Inverse SBox (Fast)

Listing 7: Inverse SBox with the smallest delay (fast)

```
# Inverse (fast)         Q9 = Q10 ^ Q4        L5 = L27 ^ Q2
@itop.d                  L12 = U4 ^ U5        L19 = Q14 ^ U5
@mulx.a                  Z132= U2 ^ U7        L26 = Q3 ^ L3
@inv.a                   Q11 = L12 ^ Z132     L13 = L19 ^ L26
@mull.i                  Q12 = Q0 ^ Q11       L17 = L12 ^ U0
@mull.d                  L27 = U3 ^ Z132      L21 = XNOR(U1, Q1)
@8xor4.d                 Q13 = U0 ^ L27       L25 = Q5 ^ L3
                         Q14 = XNOR(Q10, U2)  L14 = U3 ^ Q12
# File: itop.d           Q15 = Q14 ^ Q0       L18 = U0 ^ Q1
# Exhaustive             Q16 = XNOR(Q8, U7)   L22 = XNOR(Q5, U6)
→ search                 Q17 = Q6 ^ Q11       L8 = Q11
Q8 = XNOR(U1, U3)        L23 = Q15 ^ Z132     L28 = Q7
Q0 = Q8 ^ U5             L0 = U0 ^ L23        L9 = Q12
Q1 = U6 ^ U7             L3 = Q2 ^ Q11        L29 = Q10
Q7 = U3 ^ U4             L4 = Q6 ^ L3         L2 = U5
Q2 = Q7 ^ Q1             L16 = Q3 ^ L27       L10 = Q17
Q3 = U0 ^ U4             L1 = XNOR(U2, U3)    L30 = Q2
Q4 = Q3 ^ Q1             L6 = L1 ^ Q0         L7 = U4
Q5 = XNOR(U1, Q3)        L20 = L6 ^ Q2        L11 = Q5
Q10 = XNOR(U0, U1)       L15 = XNOR(U2, Q6)   L31 = Q9
Q6 = Q10 ^ Q7            L24 = L15 ^ U0
```

D.7 Inverse SBox (Optimal)

Listing 8: Inverse SBox circuit with area/depth trade-off (optimal)

```
# Inverse                Q5 = U0 ^ Q6         H6 = N4 ^ H1
→ (optimal)              Q7 = U3 ^ Q0         H7 = N0 ^ H4
@itop.a                  Q17 = Z66 ^ Z132     H8 = N15 ^ N16
@mulx.a                  Q8 = U5 ^ Q17        H9 = N9 ^ N10
@inv.a                   Z33 = U0 ^ U5        H10 = N6 ^ N8
@s1.a                    Q10 = U4 ^ Z33       H11 = H3 ^ H6
@muln.a                  Q9 = Q4 ^ Q10        H12 = N7 ^ N12
@ibot.a                  Q12 = XNOR(U4, Z129) H13 = N8 ^ H0
                         Q13 = XNOR(Z20, Z40) H14 = N3 ^ N5
# File: itop.a           Q16 = XNOR(Z66, U7)  H15 = H5 ^ H8
# Exhaustive             Q14 = Q13 ^ Q16      H16 = N6 ^ N7
→ search                 Q15 = Z33 ^ Q3       H17 = H12 ^ H13
Z20 = U2 ^ U4            Q11 = NOT(U2)        H18 = H5 ^ H16
Z129 = U0 ^ U7                                H19 = H3 ^ H10
Q0 = Z20 ^ Z129          # File: ibot.a       H20 = H10 ^ H14
Q4 = U1 ^ Z20            # Probabilistic      R0 = H7 ^ H18
Z66 = U1 ^ U6            → heuristic          R1 = H7 ^ H19
Q3 = U3 ^ Z66            H0 = N2 ^ N14        R2 = H2 ^ H11
Q1 = Q4 ^ Q3             H1 = N1 ^ N5         R4 = H8 ^ H9
Q2 = U6 ^ Z129           H2 = N10 ^ N11       R3 = R4 ^ H20
Z40 = U3 ^ U5            H3 = N13 ^ H0        R5 = N2 ^ H6
Z132 = U2 ^ U7           H4 = N16 ^ N17       R6 = H15 ^ H17
Q6 = Z40 ^ Z132          H5 = N1 ^ H2         R7 = H4 ^ H11
```

Note:
the above 'NOT(U2)' in the file 'itop.a' is removable by setting Q11 = U2 and accurately negating some of the gates and variables downwards where Q11 is involved. For example, the variable Y01 should be negated as well due to: N0 = NAND(Y01, Q11) consequently, all gates involving Y01 s.b. negated which leads to negate other Q variables, etc . . .

D.8 Inverse SBox (Bonus)

Listing 9: Inverse SBox circuit with the smallest number of gates (bonus)

```
# Inverse (bonus)        Q2 = Q8 ^ Q9              R3 = H3 ^ H6
@itop.b                  Q7 = Q1 ^ Q2              H7 = N9 ^ H5
@mulx.a                  Q0 = Z33 ^ Q7             R5 = N10 ^ H7
@inv.a                   Q5 = Q17 ^ Q15            H8 = N8 ^ H0
@s0.a                    Q6 = Q3 ^ Q8              H9 = N6 ^ H8
@muln.a                  Q12 = XNOR(U1, Q0)        H10 = N7 ^ R3
@ibot.b                  Q14 = Q15 ^ Q0            H11 = N1 ^ R0
                         Q13 = Q16 ^ Q14           H12 = N0 ^ H11
# File: itop.b           Q11 = NOT(U1)             R2 = H9 ^ H12
Z33 = U0 ^ U5                                      H13 = H8 ^ H10
Z3 = U0 ^ U1             # File: ibot.b            R1 = R2 ^ H13
```

Listing 9: Inverse SBox circuit with the smallest number of gates (bonus) (continued)

```
Q1 = XNOR(Z3, U3)        H0 = N4 ^ N5              H14 = H5 ^ H13
Q16= XNOR(Z33, U6)       H1 = N1 ^ N2              H15 = N13 ^ H14
Q17= XNOR(U1, Q16)       R6 = H0 ^ H1              R7 = N12 ^ H15
Q8 = U4 ^ Q17            H2 = N13 ^ N14            H16 = N4 ^ H9
Q3 = XNOR(U2, Z33)       H3 = R6 ^ H2              H17 = R5 ^ H16
Q4 = Q1 ^ Q3             H4 = N17 ^ H3             R4 = N3 ^ H17
Q15= XNOR(U4, U7)        R0 = N16 ^ H4
Q10 = U3 ^ Q15           H5 = N15 ^ H4
Q9 = Q4 ^ Q10            H6 = N10 ^ N11
```

D.9 Combined SBox (Fast)

Listing 10: Combined SBox circuits with the smallest delay (fast/-S)

```
# Combined (fast)        L5 = A0 ^ A8              L7 = Q12 ^ Q1
@ctop.d or @ctop.ds      L11 = Q16 ^ L5            L8 = Q7 ^ L7
@mulx.a                  A9 = MUX(ZF, U2, U6)      A19 = NMUX(ZF, U1,
@inv.a                   A10 = XNOR(A2, A9)        A4)
@mull.c                  Q5 = A1 ^ A10             A20 = XNOR(U6, A19)
@mull.d                  Q15 = U0 ^ Q5             Q9 = XNOR(A16, A20)
@8xor4.d                 A11 = U2 ^ U3             Q10 = A18 ^ A20
                         A12 = NMUX(ZF, A2,        L9 = Q0 ^ Q9
# File: ctop.d           A11)                      A21 = U1 ^ A2
# Floating               Q13 = A6 ^ A12            A22 = NMUX(ZF, A21,
multiplexers             Q12 = Q5 ^ Q13            A5)
A0 = XNOR(U2, U4)        A13 = A5 ^ A12            Q2 = A20 ^ A22
A1 = XNOR(U1, A0)        Q0 = Q5 ^ A13             Q6 = XNOR(A4, A22)
A2 = XNOR(U5, U7)        Q14 = U0 ^ A13            Q8 = XNOR(A16, A22)
A3 = U0 ^ U5             A14 = XNOR(U3, A3)        A23 = XNOR(Q5, Q9)
A4 = XNOR(U3, U6)        A15 = NMUX(ZF, A0,        L10 = XNOR(Q1, A23)
A5 = U2 ^ U6             U3)                       L4 = Q14 ^ L10
A6 = NMUX(ZF, A4,        A16 = XNOR(U5, A15)       A24 = NMUX(ZF, Q2,
U1)                      Q3 = A4 ^ A16             L4)
Q11 = A5 ^ A6            L6 = Q11 ^ Q3             L12 = XNOR(Q16,
Q16 = U0 ^ Q11           A17 = U2 ^ A10            A24)
A7 = U3 ^ A1             Q7 = XNOR(A8, A17)        L25 = XNOR(U3, A24)
L24 = MUX(ZF, Q16,       A18 = NMUX(ZF, A14,       A25 = MUX(ZF, L10,
A7)                      A2)                       A3)
A8 = NMUX(ZF, A3,        Q1 = XNOR(A4, A18)        L17 = U4 ^ A25
U6)                      Q4 = XNOR(A16, A18)
A26 = MUX(ZF, A10,       L28 = XNOR(L7, A35)       Q8 = ZF ^ A7
Q4)                      A36 = NMUX(ZF, Q6,        A8 = XNOR(A0, A2)
L14 = L24 ^ A26          L11)                      L25 = NMUX(ZF, A8,
L23 = A25 ^ A26          L31 = A30 ^ A36           U1)
A27 = MUX(ZF, A1,        A37 = MUX(ZF, L26,        A9 = U2 ^ A1
U5)                      A0)                       Q2 = NMUX(ZF, A8,
L30 = Q12 ^ A27          L22 = Q16 ^ A37           A9)
A28 = NMUX(ZF, L10,      Q17 = U0                  Q7 = Q1 ^ Q2
L5)                      L0 = Q10                  Q9 = Q8 ^ Q2
L21 = XNOR(L14, A28)     L1 = Q6                   A10 = XNOR(U0, A7)
L27 = XNOR(L30, A28)     L2 = Q9                   A11 = XNOR(U5, U6)
A29 = XNOR(U5, L4)       L3 = Q8                   Q3 = MUX(ZF, A10,
L29 = A28 ^ A29                                    A11)
L15 = A19 ^ A29          # File: ctop.ds
A30 = XNOR(A3, A10)      # Floating
L18 = NMUX(ZF, A19,      multiplexers
A30)                     A0 = U3 ^ U6
A31 = XNOR(A7, A21)      A1 = XNOR(U5, U7)
L16 = A25 ^ A31          Q1 = XNOR(A0, A1)
L26 = L18 ^ A31          A2 = U1 ^ U4
A32 = MUX(ZF, U7,        A3 = U0 ^ U5
A5)                      Q17 = MUX(ZF, U5,
L13 = A32 ^ A7           A3)
A33 = NMUX(ZF, A15,      A4 = U7 ^ A2
U0)                      Q5 = U3 ^ A4
L19 = XNOR(L6, A33)      Q15 = Q17 ^ Q5
A34 = NOR(ZF, U6)        A5 = XNOR(U0, U2)
L20 = A34 ^ Q0           A6 = U1 ^ A5
A35 = XNOR(A4, A8)       A7 = XNOR(U2, U3)
Q4 = Q1 ^ Q3             A19 = NMUX(ZF, A9,        L15 = Q8 ^ L11
Q6 = Q8 ^ Q3             A2)                       A20 = XNOR(Q17, L6)
A12 = XNOR(U5, A6)       L11 = U0 ^ A19            L31 = XNOR(A16, A20)
L9 = MUX(ZF, A12, A1)                              L0 = XNOR(A17, L31)
```

| Listing 10: Combined SBox circuits with the smallest delay (fast/-S) |
|---|

L19 = MUX(ZF, U1, A12)
L13 = Q6 ^ L9
A13 = U2 ^ U4
A14 = MUX(ZF, A7, A11)
Q16 = XNOR(A13, A14)
Q11 = Q17 ^ Q16
A15 = OR(ZF, A0)
Q13 = A6 ^ A15
Q12 = Q5 ^ Q13
Q14 = Q16 ^ Q13
A16 = MUX(ZF, A12, Q12)
A17 = A8 ^ Q6
L20 = NMUX(ZF, A17, U2)
L6 = XNOR(U4, A17)
L27 = Q4 ^ L20
A18 = Q5 ^ Q2
L10 = MUX(ZF, Q12, A18)
L14 = Q9 ^ L10

L4 = Q11 ^ A29
L3 = MUX(ZF, A29, Q6)
A30 = XNOR(L25, Q7)
L30 = XNOR(L14, A30)
A31 = L22 ^ A30
L21 = XNOR(L27, A31)
L26 = XNOR(Q3, A31)
A32 = MUX(ZF, A4, A3)
L16 = XNOR(A8, A32)
A33 = MUX(ZF, A3, U0)
Q10 = A32 ^ A33
A34 = MUX(ZF, Q11, A7)
L1 = Q10 ^ A34
A35 = MUX(ZF, U0, A4)
Q0 = A19 ^ A35
A36 = MUX(ZF, L14, Q7)
L5 = A18 ^ A36

A21 = MUX(ZF, U4, Q12)
L8 = Q7 ^ A21
L12 = Q6 ^ A21
A22 = MUX(ZF, L8, U4)
L28 = L25 ^ A22
L23 = L12 ^ A22
A23 = L25 ^ A16
L17 = L19 ^ A23
L29 = Q8 ^ A23
A24 = OR(ZI, A11)
L7 = XNOR(U4, A24)
A25 = NMUX(ZF, U6, U7)
L2 = A1 ^ A25
A26 = Q1 ^ A6
L24 = NMUX(ZF, A7, A26)
A27 = MUX(ZF, U3, Q1)
L22 = Q15 ^ A27
A28 = MUX(ZF, A25, A10)
L18 = XNOR(L13, A28)
A29 = A21 ^ L18

D.10 Combined SBox (Optimal)

| Listing 11: Combined SBox circuit with area/depth trade-off (optimal) |
|---|

Combined (optimal)
@ctop.a
@mulx.a
@inv.a
@s1.a
@muln.a
@cbot.a

File: ctop.a
Floating multiplexers
A0 = XNOR(U0, U6)
Q1 = XNOR(U1, ZF)
A1 = U2 ^ U5
A2 = XNOR(U3, U4)
A3 = XNOR(U3, U7)
A4 = MUX(ZF, A2, U2)
A5 = A0 ^ A1
Q6 = A4 ^ A5
A6 = XNOR(Q1, A1)
A7 = NMUX(ZF, U0, A3)
Q4 = A5 ^ A7

Q8 = XNOR(Q1, A10)
A11 = XNOR(U0, U2)
Q0 = ZF ^ A11
A12 = U1 ^ U3
A13 = A1 ^ A12
A14 = MUX(ZF, A13, A11)
Q15 = U4 ^ A14
A15 = NMUX(ZF, U5, A0)
Q5 = XNOR(A14, A15)
Q17 = XNOR(U4, A15)
A16 = MUX(ZF, A5, A2)
Q16 = XNOR(A13, A16)
A17 = A3 ^ A8
Q2 = XNOR(A10, A17)
A18 = U4 ^ U6
A19 = U1 ^ U2
Q11 = Q6 ^ A19
A20 = MUX(ZF, A18, A19)

Probabilistic heuristic
H1 = N1 ^ N3
H3 = N15 ^ N17
H4 = N12 ^ N13
H5 = N0 ^ H1
H6 = N7 ^ N8
H8 = N10 ^ N11
H9 = H4 ^ H8
S4 = H3 ^ H9
H10 = N12 ^ N14
H11 = N16 ^ H8
S14 = N17 ^ H11
H12 = N1 ^ N2
H13 = N3 ^ N5
H14 = N4 ^ N5
H15 = N9 ^ N11
H16 = N6 ^ H13
H17 = H6 ^ H14
H18 = N4 ^ H5
H30 = H18 ^ ZF
S1 = H17 ^ H30

Listing 11: Combined SBox circuit with area/depth trade-off (optimal)

```
Q3 = Q1 ^ Q4                Q13 = U5 ^ A20              H19 = H3 ^ H15
A8 = NMUX(ZF, U6, A2)       A21 = XNOR(U4, Q0)          S6 = XNOR(H18, H19)
Q9 = Q1 ^ A3                Q14 = XNOR(A14, A21)        S11 = H17 ^ H19
Q10 = Q4 ^ Q9               A22 = XNOR(A4, A6)          H20 = H10 ^ H15
A10 = XNOR(A4, A7)          Q12 = XNOR(U6, A22)         S0 = XNOR(S6, H20)
Q7 = XNOR(Q9, A10)                                      S5 = H17 ^ H20
H22 = H16 ^ H21             # File: cbot.a              H21 = N7 ^ H12
S12 = H20 ^ H22
S13 = S4 ^ H22
H23 = N15 ^ N16
H24 = N9 ^ N10
H25 = N8 ^ H24
H26 = H12 ^ H14
S7 = XNOR(S4, H26)
H27 = H4 ^ H23
S2 = H30 ^ H27
H28 = N8 ^ H16
S3 = S14 ^ H28
H29 = H21 ^ H25
S15 = H23 ^ H29
R0 = S0
R1 = S1
R2 = S2
R3 = MUX(ZF, S3, S11)
R4 = MUX(ZF, S4, S12)
R5 = MUX(ZF, S5, S13)
R6 = MUX(ZF, S6, S14)
R7 = MUX(ZF, S7, S15)
```

D.11 Combined SBox (Bonus)

Listing 12: Combined SBox circuit with the smallest number of gates (bonus)

```
# Combined (bonus)          Q8 = Q3 ^ Q6
@ctop.b                                                 A8 = MUX(ZF, Q1, A4)
@mulx.a                                                 Q9 = U6 ^ A8
@inv.a                                                  Q2 = Q8 ^ Q9
@s0.a                                                   Q10 = Q4 ^ Q9
@muln.a                                                 Q7 = Q6 ^ Q10
@cbot.b                                                 A9 = MUX(ZF, A0, U4)
                                                        Q12 = XNOR(U7, A9)
# File: ctop.b                                          Q11 = Q0 ^ Q12
# Floating                                              A10 = MUX(ZF, A6,
multiplexers                                            Q12)
A0 = XNOR(U3, U6)                                       A11 = A2 ^ A10
Q15 = XNOR(U1, ZF)                                      A12 = A4 ^ A11
A1 = U5 ^ Q15                                           Q5 = Q0 ^ A12
A2 = U2 ^ A0                                            Q13 = Q11 ^ A12
A3 = U4 ^ A1                                            Q17 = Q14 ^ A12
A4 = U4 ^ U6                                            Q16 = Q14 ^ Q13
A5 = MUX(ZF, A2, A4)
Q4 = XNOR(A3, A5)                                       # File: cbot.b
Q0 = U0 ^ Q4                                            H0 = N9 ^ N10
Q14 = Q15 ^ Q0                                          H1 = N16 ^ H0
A6 = XNOR(U0, U2)                                       H2 = N4 ^ N5
Q3 = ZF ^ A6                                            S4 = N7 ^ (N8 ^ H2)
Q1 = Q4 ^ Q3                                            H4 = N0 ^ N2
A7 = MUX(ZF, U1, Q0)                                    H6 = N15 ^ H1
Q6 = XNOR(A5, A7)                                       H7 = H4 ^(N3 ^N5)
H20 = H6 ^ ZF               R5 = MUX(ZF, S5, S13)
S2 = H20 ^ H7               R6 = MUX(ZF, S6, S14)
S14 = S4 ^ H7               R7 = MUX(ZF, S7, S15)
H8 = N13 ^ H0
H9 = H12 ^ H8
S1 = H20 ^ H9
H10 = N17 ^ H1
H12 = H2 ^ (N1 ^ N2)
S0 = H6 ^ H12
H21 = N8 ^ H4
S5 = N6 ^ (H9 ^ H21)
S11 = H12 ^ S5
S6 = S1 ^ S11
H15 = N14 ^ H10
```

-continued

Listing 12: Combined SBox circuit with the smallest number of gates (bonus)

```
H16 = H8 ^ H15
S12 = S5 ^ H16
H22 = N9 ^ N11
S7 = XNOR(S4, H10 ^
H22)
H19 = XNOR(H7, S7)
S3 = H16 ^ H19
S15 = S11 ^ H19
S13 = S4 ^ (N12 ^
H15)
R0 = S0
R1 = S1
R2 = S2
R3 = MUX(ZF, S3, S11)
R4 = MUX(ZF, S4, S12)
```

PART C OF THE DISCLOSURE

The results from Part A and Part B can be further extended by a closer investigation of the inversion circuit. The resulting embodiments of the SBox are circuits having an even shorter critical path.

Inversion over $GF(2^4)$

The inversion formulae are as follows:

$$Y0 = X1X2X3 \oplus X0X2 \oplus X1X2 \oplus X2 \oplus X3,$$

$$Y1 = X0X2X3 \oplus X0X2 \oplus X1X2 \oplus X1X3 \oplus X3,$$

$$Y2 = X0X1X3 \oplus X1X2 \oplus X0X3 \oplus X0 \oplus X1,$$

$$Y3 = X0X1X2 \oplus X0X2 \oplus X0X3 \oplus X1X3 \oplus X1.$$

In [BP12] a circuit of depth 4 and 17 XORs was found, but it is desired to shrink the depth even further by utilizing a wider range of standard gates.

Accordingly, the algorithm from Part B, section 4.2 has been adapted to also find a small solution for the INV block. The idea is simple; each $Y_i$ is a truth table of length 16 bits, based on a 4-bit input $X_0, \ldots, X_3$. We define our "point" to be a 16-bit value. All standard gates, AND, OR, XOR, MUX, NOT, including their negate versions, can be applied to any combination of "known" points (S), and distances to target points T can be computed in a similar manner as before. Using this slightly modified algorithm for floating multiplexers, a solution was found having only 9 gates and depth 3. The results are shown in Equation 2 and the improved circuits are given in Appendix E.

| | | | |
|---|---|---|---|
| $T_0$ = AND(X0, X2) | T3 = MUX(X1, X2, 1) | Y1 = MUX(T2, X3, T3) | |
| T1 = NOR(X1, X3) | T4 = MUX(X3, X0, 1) | Y2 = MUX(X0, T2, X1) | (2) |
| T2 = XNOR(T0, T1) | Y0 = MUX(X2, T2, X3) | Y3 = MUX(T2, X1, T4) | |

In case it is desired to avoid multiplexers in the INV block then there is an alternative set of equations that are also presented in this section. Each expression has been considered independently, using a general depth 3 expression:

$$Y_i = ((X_a op_1 X_b) op_5 (X_c op_2 X_d)) op_7 ((X_e op_3 X_f) op_6 (X_g op_4 X_h)),$$

where $X_{a-h}$ are terms from $\{0, 1, X_0, X_1, X_2, X_3\}$ and $op_{1-7}$ are operators from the set of standard gates {AND, OR, XOR, NAND, NOR, XNOR}. Note that the above does not need to have all terms, for example, the expression AND(x, x) is simply x.

The exhaustive search can be organized as follows. Let there be an object Term which consists of a truth table TT of length 16 bits, based on the 4 bits $X_0, \ldots, X_3$, and a Boolean function that is associated with the term. Starting with the initial set of available terms $T(0) = \{0, 1, X_0, \ldots, X_3\}$, an expression for a chosen $Y_i$ is constructed iteratively. Assume at some step k one has the set of available terms T(k), then the next set of terms and associated expressions can be obtained as:

$$T(k+1) = \{T(k), T(k) \text{ operator } T(k)\},$$

taking care of unique terms. At some step k one will get one or more term(s) whose TTs are equal to target TTs ($Y_i$s).

Since it is possible to actually get multiple Boolean functions for each $Y_i$, one should select only the "best" functions following the criteria: there are no NOT gates (due to better sharing capabilities), there is a maximum number of gates that can be shared between the 4 expressions for $Y_0, \ldots, Y_3$, and the area/depth in terms of GE is small.

Using this technique, we have found a depth 3, 15 gates solution for the inversion. The equations are given below, where depth 3 solutions are also provided for the additional 5 signals $\{Y_{01}, Y_{23}, Y_{02}, Y_{13}, Y_{00}\}$ such that they can share a lot of gates in the mentioned scenarios S0-S5 in Part B.

$$Y0 = xnor\ (and(X0,X2),nand(nand(X1,X2),xor(X2,X3)))$$

$$Y1 = xor(nand(xor(X2,X3),X1),nor\ (and(X0,X2),X3))$$

$$Y2 = xnor\ (and(X0,X2),nand(xor(X0,X1),nand(X0,X3)))$$

$$Y3 = xor(nand(xor(X0,X1),X3),nor\ (and(X0,X2),X1))$$

$$Y01 = nand(nand(xor(X2,X3),X1),nand(nand(X0,X3),X2))$$

$$Y23 = nand(nand(xor(X0,X1),X3),nand(nand(X1,X2),X0))$$

$$Y13 = xor(nor\ (and(X0,X2),xnor(X1,X3)),xor(nand(X0,X3),nand(X1,X2)))$$

$$Y02 = xor(nand(xor(X2,X3),nand(X1\ nand(xor(X0,X1),nand(X0,X3))),X2))$$

Y00=and(nand(and(X0,X2),xnor(X1nor(nor(X0,X2), and(X1,X3)))X3))

APPENDIX E

In this section, circuits using the improved inversion formula presented in Part C are presented.
Preliminaries In the listings presented below, specifications for three circuits for the forward, inverse, and combined SBoxes in the novel architecture D (fast) are described. The symbols used in the following listings are as follows, and have the indicated meanings:

comment—a comment line

@filename—means that the code from another file called 'filename' should be included, the listing of which is then given in this section as well.

a^b—is the usual XOR gate; other gates are explicitly denoted and taken from the set of {XNOR, AND, NAND, OR, NOR, MUX, NMUX, NOT}

(a op b)—where the order of execution (the order of gates connections) is important we specify it by brackets.

The inputs to all SBoxes are the 8 signals {U0 . . . U7} and the outputs are the 8 signals {R0 . . . R7}. The input and output bits are represented in Big Endian bit order. For combined SBoxes the input has additional signals ZF and ZI where ZF=1 if one performs the forward SBox and ZF=0 if inverse, otherwise; the signal ZI is the compliment of ZF. All the proposed circuits have been tested and their correctness verified.

The circuits are divided into sub-programs that correspond, respectively, to the functions/layers shown in FIG. 5. The discussion starts with a description of the common shared components, and then for each solution the components (common or specific) for the circuits are described.

Shared Components

The shared components are used in several implementations in the following and thus described only once here.

Listing: MULX/8XOR4/INV: Shared components

```
# File: mulx.a              R2 = (K8 ^ K9) ^ (K10 ^ K11)
T20 = NAND(Q6, Q12)         R3 = (K12 ^ K13) ^ (K14 ^ K15)
T21 = NAND(Q3, Q14)         R4 = (K16 ^ K17) ^ (K18 ^ K19)
T22 = NAND(Q1, Q16)         R5 = (K20 ^ K21) ^ (K22 ^ K23)
                            R6 = (K24 ^ K25) ^ (K26 ^ K27)
T10 = (NOR(Q3, Q14) ^ NAND  R7 = (K28 ^ K29) ^ (K30 ^ K31)
(Q0, Q7))
T11 = (NOR(Q4, Q13) ^ NAND
(Q10, Q11))                 # File: inv.a
T12 = (NOR(Q2, Q17) ^ NAND  T0 = NAND(X0, X2)
(Q5, Q9))
T13 = (NOR(Q8, Q15) ^ NAND  T1 = NOR(X1, X3)
(Q2, Q17))                  T2 = XNOR(T0, T1)
                            Y0 = MUX(X2, T2, X3)
X0 = T10 ^ (T20 ^ T22)      Y2 = MUX(X0, T2, X1)
X1 = T11 ^ (T21 ^ T20)      T3 = MUX(X1, X2, 1)
X2 = T12 ^ (T21 ^ T22)      Y1 = MUX(T2, X3, T3)
X3 = T13 ^ (T21 ^ NAND      T4 = MUX(X3, X0, 1)
(Q4, Q13))                  Y3 = MUX(T2, X1, T4)
# File: 8xor4.d
R0 = (K0 ^ K1) ^ (K2 ^ K3)
R1 = (K4 ^ K5) ^ (K6 ^ K7)
```

Listing: MULN/MULL: Shared components.

```
# File: muln.a              K9 = NAND(Y1, L9)
N0 = NAND(Y01, Q11)         K13 = NAND(Y1, L13)
```

-continued

Listing: MULN/MULL: Shared components.

```
N1 = NAND(Y0, Q12)          K17 = NAND(Y1, L17)
N2 = NAND(Y1 , Q0)          K21 = NAND(Y1, L21)
N3 = NAND(Y23, Q17)         K25 = NAND(Y1, L25)
N4 = NAND(Y2, Q5)           K29 = NAND(Y1, L29)
N5 = NAND(Y3, Q15)
N6 = NAND(Y13, Q14)         K2 = NAND(Y2, L2)
N7 = NAND(Y00, Q16)         K6 = NAND(Y2, L6)
N8 = NAND(Y02, Q13)         K10 = NAND(Y2, L10)
N9 = NAND(Y01, Q7)          K14 = NAND(Y2, L14)
N10 = NAND(Y0 , Q10)        K18 = NAND(Y2, L18)
N11 = NAND(Y1 ,Q6)          K22 = NAND(Y2, L22)
N12 = NAND(Y23, Q2)         K26 = NAND(Y2, L26)
N13 = NAND(Y2, Q9)          K30 = NAND(Y2, L30)
N14 = NAND(Y3, Q8)
N15 = NAND(Y13, Q3)         K3 = NAND(Y3, L3)
N16 = NAND(Y00, Q1)         K7 = NAND(Y3, L7)
N17 = NAND(Y02, Q4)         K11 = NAND(Y3, L11)
                            K15 = NAND(Y3, L15)
# File: mull.d              K19 = NAND(Y3, L19)
K0 = NAND(Y0, L0)           K23 = NAND(Y3, L23)
K12 = NAND(Y0, L12)         K27 = NAND(Y3, L27)
K16 = NAND(Y0, L16)         K31 = NAND(Y3, L31)
K20 = NAND(Y0, L20)
K1 = NAND(Y1,L1)            #File: mull.f
K5 = NAND(Y1, L5)           K4 = AND(Y0, L4)
K8 = AND(Y0, L8)
K24 = AND(Y0, L24)
K28 = AND(Y0, L28)
# File: mull.i
K4 = NAND(Y0, L4)
K8 = NAND(Y0, L8)
K24 = NAND(Y0, L24)
K28 = NAND(Y0, L28)
# File: mull.c
K4 = NAND(Y0, L4) ^ ZF
K8 = NAND(Y0, L8) ^ ZF
K24 = NAND(Y0, L24) ^ ZF
K28 = NAND(Y0, L28) ^ ZF
```

Forward SBox (Fast)

Listing: Forward SBox with the smallest delay (fast)

```
# Forward (fast)     Q5 = Z18 ^ Z160    L29 = Z96 ^ L10
@ftop.d              Z10 = U1 ^ U3      L14 = Q11 ^ L10
@mulx.a              Q6 = Z10 ^ Q2      L26 = Q11 ^ Q5
@inv.a               Q7 = U0 ^ U7       L30 = Q11 ^ U6
@mull.f              Z36 = U2 ^ U5      L7 = Q12 ^ Q1
@mull.d              Q8 = Z36 ^ Q5      L11 = Q12 ^ L15
@8xor4.d             L19 = U2 ^ Z96     L27 = L30 ^ L10
                     Q9 = Z18 ^ L19     Q17 = U0
# File: ftop.d       Q10 = Z10 ^ Q1     L0 = Q10
# Exhaustive search  Q12 = U3 ^ L28     L4 = U6
Z18 = U1 ^ U4        Q13 = U3 ^ Q2      L20 = Q0
L28 = Z18 ^ U6       L10 = Z36 ^ Q7     L24 = Q16
Q0 = U2 ^ L28        Q14 = U6 ^ L10     L1 = Q6
Z96 = U5 ^ U6        Q15 = U0 ^ Q5      L9 = U5
Q1 = U0 ^ Z96        L8 = U3 ^ Q5       L21 = Q11
Z160 = U5 ^ U7       L12 = Q16 ^ Q2     L25 = Q13
Q2 = U6 ^ Z160       L16 = U2 ^ Q4      L2 = Q9
Q11 = U2 ^ U3        L15 = U1 ^ Z96     L18 = U1
L6 = U4 ^ Z96        L31 = Q16 ^ L15    L22 = Q15
Q3 = Q11 ^ L6        L5 = Q12 ^ L31     L3 = Q8
Q16 = U0 ^ Q11       L13 = U3 ^ Q8      L23 = U0
Q4 = Q16 ^ U4        L17 = U4 ^ L10
```

Combined SBox (Fast)

Listing: Combined SBox with the smallest delay

```
# Combined (fast)    A11 = U2 ^ U3
@ctop.d              A12 = NMUX(ZF, A2, A11)
@mulx.a              Q13 = A6 ^ A12
```

| Listing: Combined SBox with the smallest delay | |
|---|---|
| @inv.a | Q12 = Q5 ^ Q13 |
| @mull.c | A13 = A5 ^ A12 |
| @mull.d | Q0 = Q5 ^ A13 |
| @8xor4.d | Q14 = U0 ^ A13 |
|  | A14 = XNOR(U3, A3) |
| # File: ctop.d | A15 = NMUX(ZF, A0, U3) |
| # Floating multiplexers | A16 = XNOR(U5, A15) |
| A0 = XNOR(U2, U4) | Q3 = A4 ^ A16 |
| A1 = XNOR(U1, A0) | L6 = Q11 ^ Q3 |
| A2 = XNOR(U5, U7) | A17 = U2 ^ A10 |
| A3 = U0 ^ U5 | Q7 = XNOR(A8, A17) |
| A4 = XNOR(U3, U6) | A18 = NMUX(ZF, A14, A2) |
| A5 = U2 ^ U6 | Q1 = XNOR(A4, A18) |
| A6 = NMUX(ZF, A4, U1) | Q4 = XNOR(A16, A18) |
| Q11 = A5 ^ A6 | L7 = Q12 ^ Q1 |
| Q16 = U0 ^ Q11 | L8 = Q7 ^ L7 |
| A7 = U3 ^ A1 | A19 = NMUX(ZF, U1, A4) |
| L24 = MUX(ZF, Q16, A7) | A20 = XNOR(U6, A19) |
| A8 = NMUX(ZF, A3, U6) | Q9 = XNOR(A16, A20) |
| L5 = A0 ^ A8 | Q10 = A18 ^ A20 |
| L11 = Q16 ^ L5 | L9 = Q0 ^ Q9 |
| A9 = MUX(ZF, U2, U6) | A21 = U1 ^ A2 |
| A10 = XNOR(A2, A9) | A22 = NMUX(ZF, A21, A5) |
| Q5 = A1 ^ A10 | Q2 = A20 ^ A22 |
| Q15 = U0 ^ Q5 | Q6 = XNOR(A4, A22) |
| Q8 = XNOR(A16, A22) | L18 = NMUX(ZF, A19, A30) |
| A23 = XNOR(Q5, Q9) | A31 = XNOR(A7, A21) |
| L10 = XNOR(Q1, A23) | L16 = A25 ^ A31 |
| L4 = Q14 ^ L10 | L26 = L18 ^ A31 |
| A24 = NMUX(ZF, Q2, L4) | A32 = MUX(ZF, U7, A5) |
| L12 = XNOR(Q16, A24) | L13 = A7 ^ A32 |
| L25 = XNOR(U3, A24) | A33 = NMUX(ZF, A15, U0) |
| A25 = MUX(ZF, L10, A3) | L19 = XNOR(L6, A33) |
| L17 = U4 ^ A25 | A34 = NOR(ZF, U6) |
| A26 = MUX(ZF, A10, Q4) | L20 = Q0 ^ A34 |
| L14 = L24 ^ A26 | A35 = XNOR(A4, A8) |
| L23 = A25 ^ A26 | L28 = XNOR(L7, A35) |
| A27 = MUX(ZF, A1, U5) | A36 = NMUX(ZF, Q6, L11) |
| L30 = Q12 ^ A27 | L31 = A30 ^ A36 |
| A28 = NMUX(ZF, L10, L5) | A37 = MUX(ZF, L26, A0) |
| L21 = XNOR(L14, A28) | L22 = Q16 ^ A37 |
| L27 = XNOR(L30, A28) | Q17 = U0 |
| A29 = XNOR(U5, L4) | L0 = Q10 |
| L29 = A28 ^ A29 | L1 = Q6 |
| L15 = A19 ^ A29 | L2 = Q9 |
| A30 = XNOR(A3, A10) | L3 = Q8 |

Inverse SBox (Fast)

| Listing: Inverse SBox circuits with the smallest delay (fast) | |
|---|---|
| # Inverse (fast) | Q14 = XNOR(Q10, U2) |
| @itop.d | Q15 = Q14 ^ Q0 |
| @mulx.a | Q16 = XNOR(Q8, U7) |
| @inv.a | Q17 = Q16 ^ Q11 |
| @mull.i | L23 = Q15 ^ Z132 |
| @mull.d | L0 = U0 ^ L23 |
| @8xor4.d | L3 = Q11 ^ Q2 |
|  | L4 = Q6 ^ L3 |
| # File: itop.d | L16 = Q3 ^ L27 |
| # Exhaustive search | L1 = XNOR(U2, U3) |
| Q8 = XNOR(U1, U3) | L6 = L1 ^ Q0 |
| Q0 = Q8 ^ U5 | L20 = L6 ^ Q2 |
| Q1 = U6 ^ U7 | L15 = XNOR(U2, Q6) |
| Q7 = U3 ^ U4 | L24 = U0 ^ L15 |
| Q2 = Q7 ^ Q1 | L5 = L27 ^ Q2 |
| Q3 = U0 ^ U4 | L19 = Q14 ^ U5 |
| Q4 = Q3 ^ Q1 | L26 = Q3 ^ L3 |
| Q5 = XNOR(U1, Q3) | L13 = L19 ^ L26 |
| Q10 = XNOR(U0, U1) | L17 = U0 ^ L12 |
| Q6 = Q10 ^ Q7 | L21 = XNOR(U1, Q1) |
| Q9 = Q10 ^ Q4 | L25 = Q5 ^ L3 |
| L12 = U4 ^ U5 | L14 = U3 ^ Q12 |
| Z132 = U2 ^ U7 | L18 = U0 ^ Q1 |
| Q11 = L12 ^ Z132 | L22 = XNOR(Q5, U6) |

| Listing: Inverse SBox circuits with the smallest delay (fast) | |
|---|---|
| Q12 = Q0 ^ Q11 | L8 = Q11 |
| L27 = U3 ^ Z132 | L28 = Q7 |
| Q13 = U0 ^ L27 | L9 = Q12 |
| L29 = Q10 |  |
| L2 = U5 |  |
| L10 = Q17 |  |
| L30 = Q2 |  |
| L7 = U4 |  |
| L11 = Q5 |  |
| L31 = Q9 |  |

What is claimed is:

1. A substitution box (Sbox) circuit that performs an SBox computational step when comprised in cryptographic circuitry, the SBox circuit comprising:
a first circuit part comprising digital circuitry that generates a 4-bit first output signal (Y) from an 8-bit input signal (U);
a second circuit part, configured to operate in parallel with the first circuit part and to generate a 32-bit second output signal (L) from the 8-bit input signal (U), wherein the 32-bit second output signal (L) consists of four 8-bit sub-results; and
a third circuit part configured to produce four preliminary 8-bit results (K) by scalar multiplying each of the four 8-bit sub-results by a respective one bit of the 4-bit first output signal (Y), and to produce an 8-bit output signal (R) by summing the four preliminary 8-bit results (K), wherein:
the first circuit part is configured to generate the 4-bit first output signal (Y) from the input signal (U) by performing a calculation that comprises a first linear matrix operation, a Galois Field (GF) multiplication, and a GF inversion; and
the second circuit part is configured to generate the second output signal (L) from the input signal (U) by performing a calculation that comprises a second linear matrix operation.

2. The SBox circuit of claim 1, wherein the third circuit part comprises digital circuitry that performs a calculation according to:

$$R = Y_0 \cdot M_0 \cdot U \oplus \ldots \oplus Y_3 \cdot M_3 \cdot U,$$

wherein:
each $M_i$ is an 8×8 matrix representing 8 linear equations on the 8-bit input U,
i=0 . . . 3, $$L = M_0 \cdot U \| M_1 \cdot U \| M_2 \cdot U \| M_3 \cdot U,$$

$\oplus$ represents an exclusive OR, XOR, operation, and
$\|$ represents concatenation.

3. The SBox circuit according to claim 1, wherein each of the first, second and third circuit parts is configured from digital circuits selected from any one or more of:
an XOR gate;
an XNOR gate;
an AND gate;
a NAND gate;
an OR gate;
a NOR gate;
a multiplexor, MUX;
an NMUX gate;
a NOT gate;
an And-Or-Inverter (AOI); and
an OR-And-Inverter (OAI).

4. The SBox circuit according to claim 1, wherein first circuit part and the second circuit part are configured to generate the 4-bit first output signal (Y) and the 32-bit second output signal (L) in accordance with a forward SBox operation.

5. The SBox circuit according to claim 1, wherein the first circuit part and the second circuit part are configured to generate the 4-bit first output signal (Y) and the 32-bit second output signal (L) in accordance with an inverse SBox operation.

6. The SBox circuit according to claim 1, wherein:
the first circuit part and the second circuit part are configured to generate the 4-bit first output signal (Y) and the 32-bit second output signal (L) in accordance with a forward SBox operation; and
the SBox circuit further comprises:
a fourth circuit part comprising digital circuitry that generates an alternative 4-bit output signal ($Y_{alt}$) from the 8-bit input signal (U) for use in an inverse SBox operation;
a fifth circuit part, configured to operate in parallel with the fourth circuit part and to generate an alternative 32-bit second output signal ($L_{alt}$) from the 8-bit input signal (U) for use in the inverse SBox operation, wherein the alternative 32-bit second output signal ($L_{alt}$) consists of four 8-bit sub-results; and
a selection circuit that is controllable to engage the first and second circuit parts when a forward SBox operation is selected, and to engage the fourth and fifth circuit parts when an inverse SBox operation is selected.

7. A method of performing a substitution box (SBox) computational step in cryptographic circuitry, the method comprising:
generating a 4-bit first output signal (Y) from an 8-bit input signal (U);
generating, in parallel with generating the 4-bit first output signal (Y), generating a 32-bit second output signal (L) from the input signal (U), wherein the 32-bit second output signal (L) consists of four 8-bit sub-results;

producing four preliminary 8-bit results (K) by scalar multiplying each of the four 8-bit sub-results by a respective one bit of the 4-bit first output signal (Y); and
producing an 8-bit output signal (R) by summing the four preliminary 8-bit results (K),
wherein:
generating the 4-bit first output signal (Y) from the input signal (U) comprises performing a calculation that comprises a first linear matrix operation, a Galois Field (GF) multiplication, and a GF inversion; and
generating the second output signal (L) from the input signal (U) comprises performing a calculation that comprises a second linear matrix operation.

8. The method of claim 7, wherein producing four preliminary 8-bit results (K) by scalar multiplying each of the four 8-bit sub-results by the respective one bit of the 4-bit first output signal (Y) comprises performing a calculation according to:

$$R = K_0 \cdot U \oplus K_1 \cdot U \oplus K_2 \cdot U \cdot K_3 \cdot U,$$

wherein:
$K_i = Y_i * L_i$,
$i = 0 \ldots 3$,
each $Y_i$ is a 1-bit value,
each $L_i$ is an 8-bit value, that satisfies $L_i = M_i * U$,
each $M_i$ is an 8×8 matrix representing 8 linear equations, and
$\oplus$ represents an exclusive OR, XOR, operation.

9. The method according to claim 7, wherein the 4-bit first output signal (Y) and the 32-bit second output signal (L) are generated in accordance with a forward SBox operation.

10. The method according to claim 7, wherein the 4-bit first output signal (Y) and the 32-bit second output signal (L) are generated in accordance with an inverse SBox operation.

11. The method according to claim 7, further comprising:
receiving a selection control signal; and
generating the 4-bit first output signal (Y) and the 32-bit second output signal (L) in accordance with either a forward SBox operation or an inverse SBox operation in dependence on the control signal.

* * * * *